United States Patent [19]
Yabuki et al.

[11] Patent Number: 5,889,887
[45] Date of Patent: Mar. 30, 1999

[54] PATTERN EXTRACTING DEVICE AND METHOD TO EXTRACT A PATTERN FROM A COMBINATION AND VARIETY OF PATTERNS

[75] Inventors: Maki Yabuki; Satoshi Naoi, both of Kawasaki, Japan

[73] Assignee: Fujitsu Limited, Kawasaki, Japan

[21] Appl. No.: 609,280

[22] Filed: Mar. 1, 1996

[30] Foreign Application Priority Data

Mar. 6, 1995 [JP] Japan ................................. 7-045597
Aug. 11, 1995 [JP] Japan ................................. 7-205564

[51] Int. Cl.$^6$ ................................................. G06K 9/36
[52] U.S. Cl. ........................................ 382/178; 382/275
[58] Field of Search .................................. 382/173, 175, 382/177, 178, 275, 282, 292, 317

[56] References Cited

U.S. PATENT DOCUMENTS

| | | | |
|---|---|---|---|
| 3,201,752 | 8/1965 | Rabinow | 340/146.3 |
| 4,292,622 | 9/1981 | Henrichon, Jr. | 340/146.3 SG |
| 4,633,502 | 12/1986 | Namba | 382/9 |
| 4,741,045 | 4/1988 | Denning | 382/9 |

FOREIGN PATENT DOCUMENTS 3-160582  7/1991  Japan ...................................... 382/173

*Primary Examiner*—Andrew W. Johns
*Attorney, Agent, or Firm*—Staas & Halsey

[57] ABSTRACT

A character box extracting unit extracts a line forming a character box. Then, the character box intersection calculating unit calculates the intersection of the character box with a character pattern. An intersection corresponding unit associates intersections with each other based on the directional property of character lines, distance between the character lines, etc. An in-box character extracting unit extracts a virtual image according to the association information between the intersections. A character size evaluating unit obtains from an optional character string an average character size of a character including the virtual image, and extracts a true character pattern by removing a redundant virtual image based on the average character size. A character structure analyzing and evaluating unit obtains from a prepared table a true image corresponding to the virtual image and extracts a true character pattern, thereby correctly extracting the pattern from the image in which the line crosses the pattern.

22 Claims, 90 Drawing Sheets

BINARY IMAGE | REMOVING CHARACTER BOX | INTERPOLATING CHARACTER | RE-INTERPOLATING

LINE-TOUCHING CHARACTER     REMOVING CHARACTER BOX     MIS-INTERPOLATION

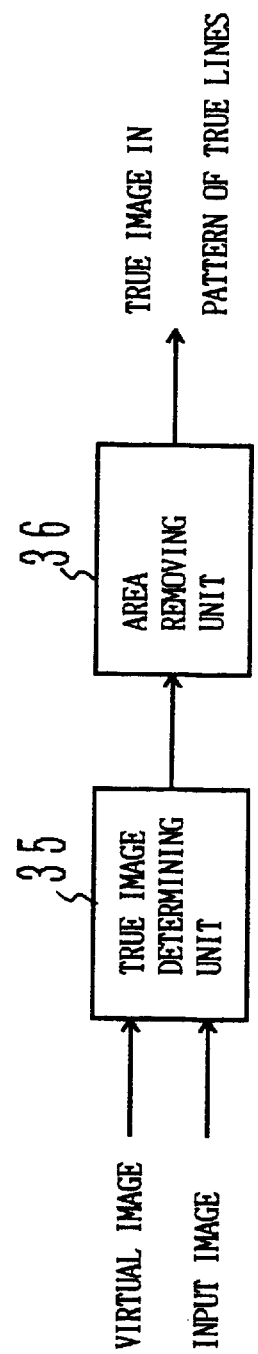
F I G. 9

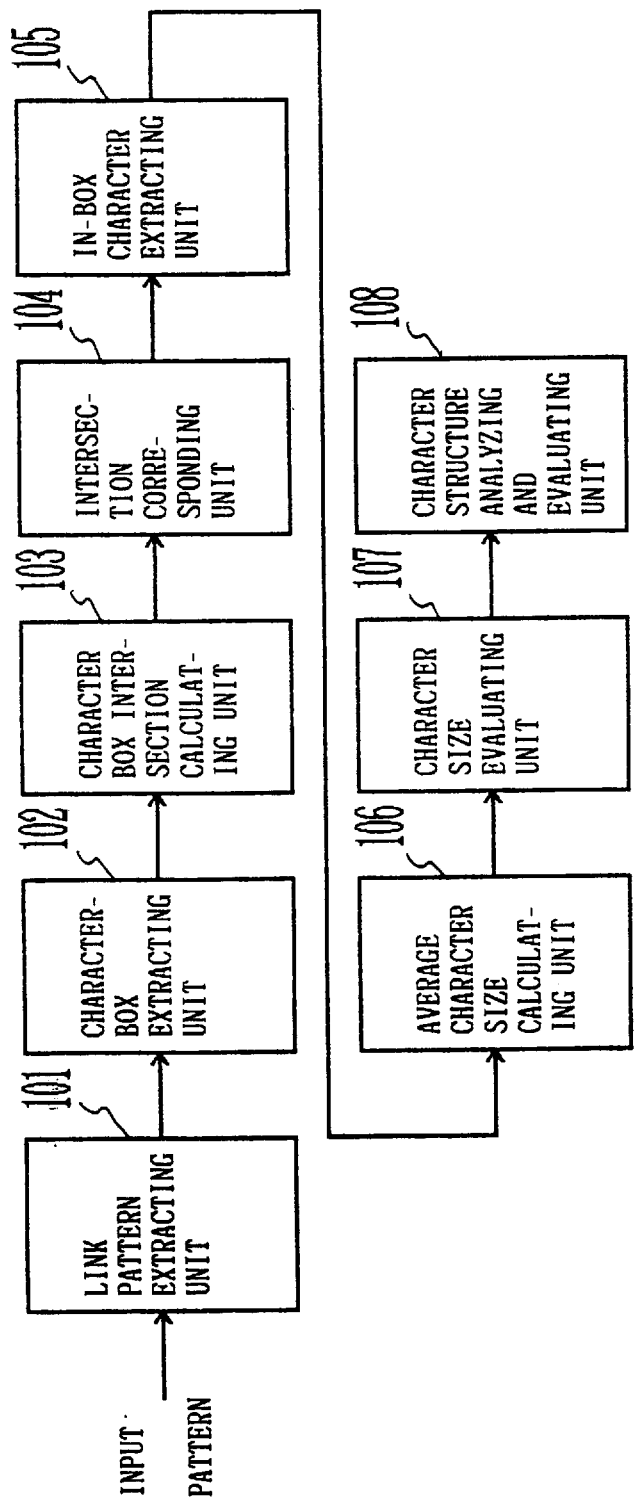
F I G. 22

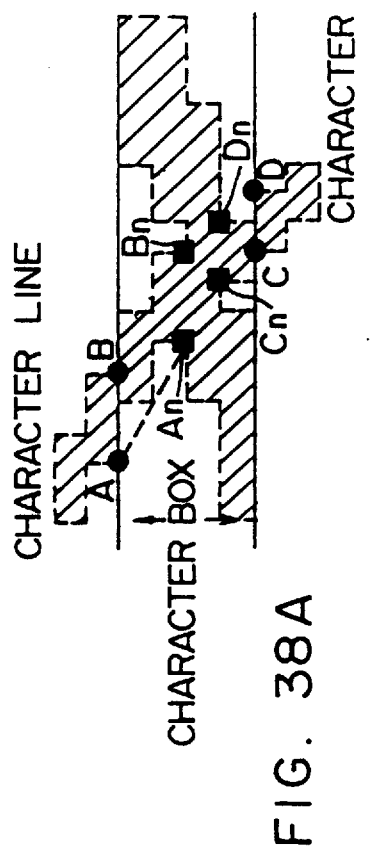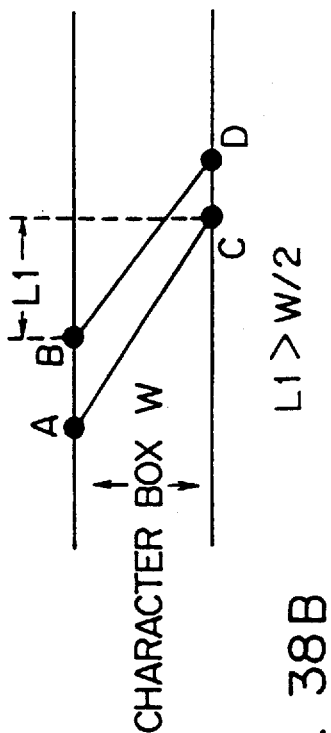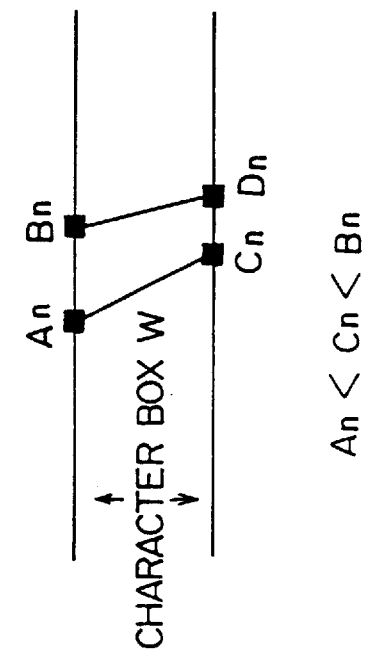
FIG. 38A
FIG. 38B
FIG. 38C

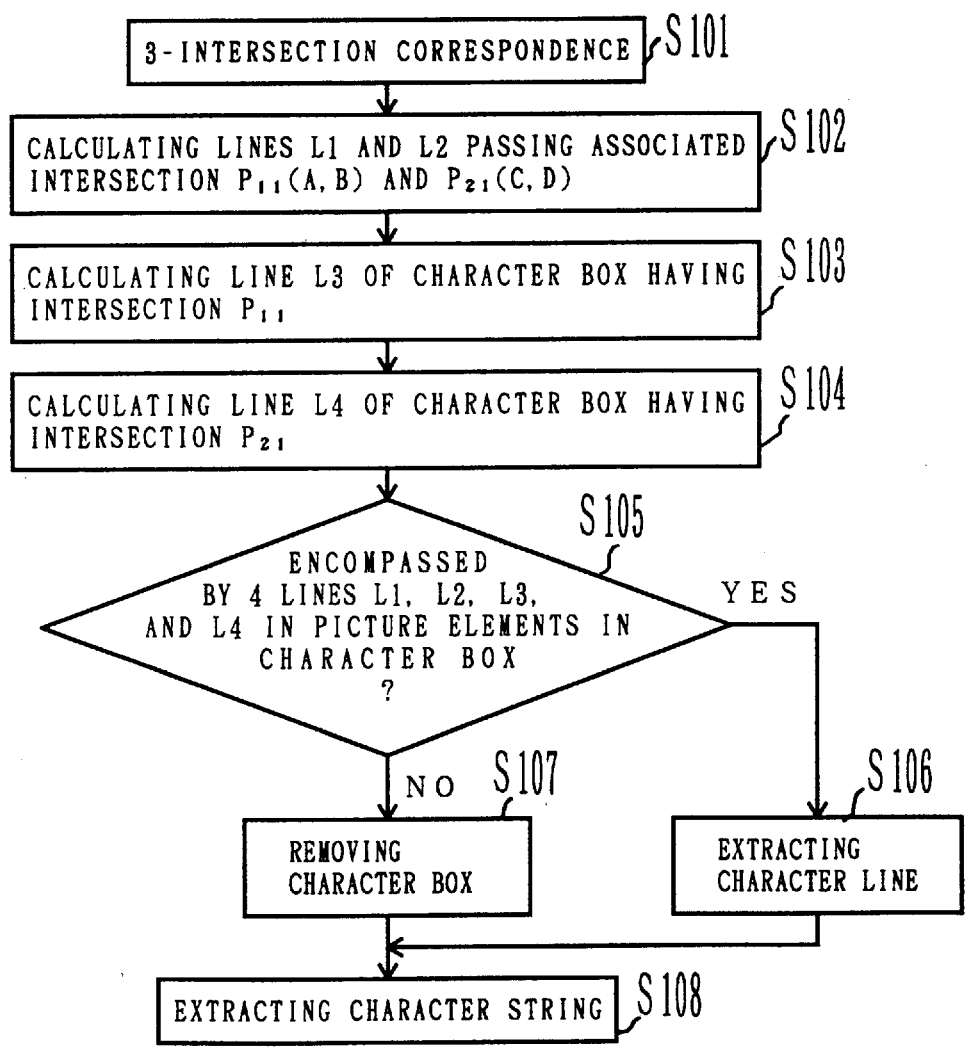
F I G. 4 2

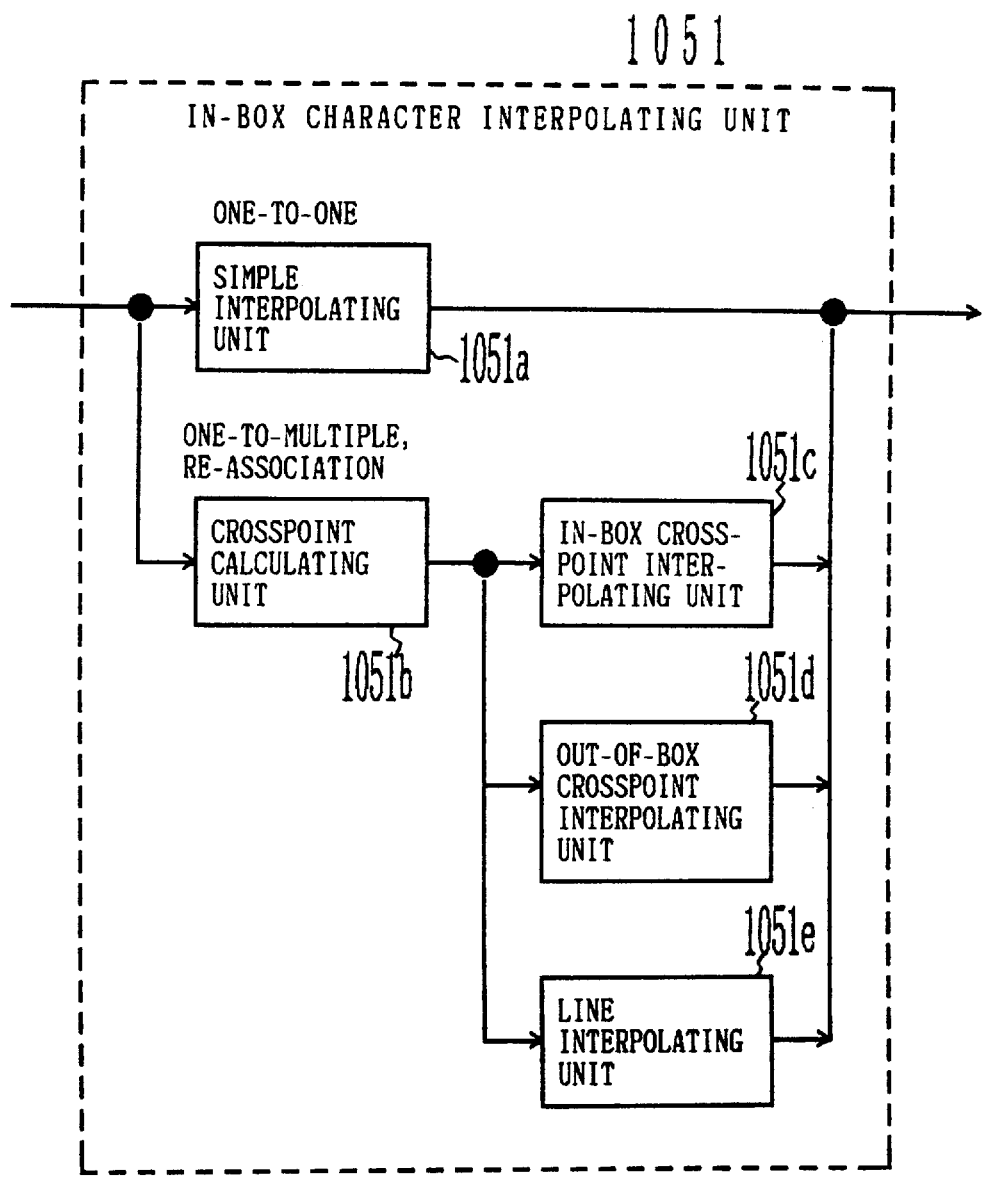
F I G. 4 3

--- MINIMUM CHARACTER SIZE THmin
= AVERAGE CHARACTER SIZE TH
— MAXIMUM CHARACTER SIZE THmax

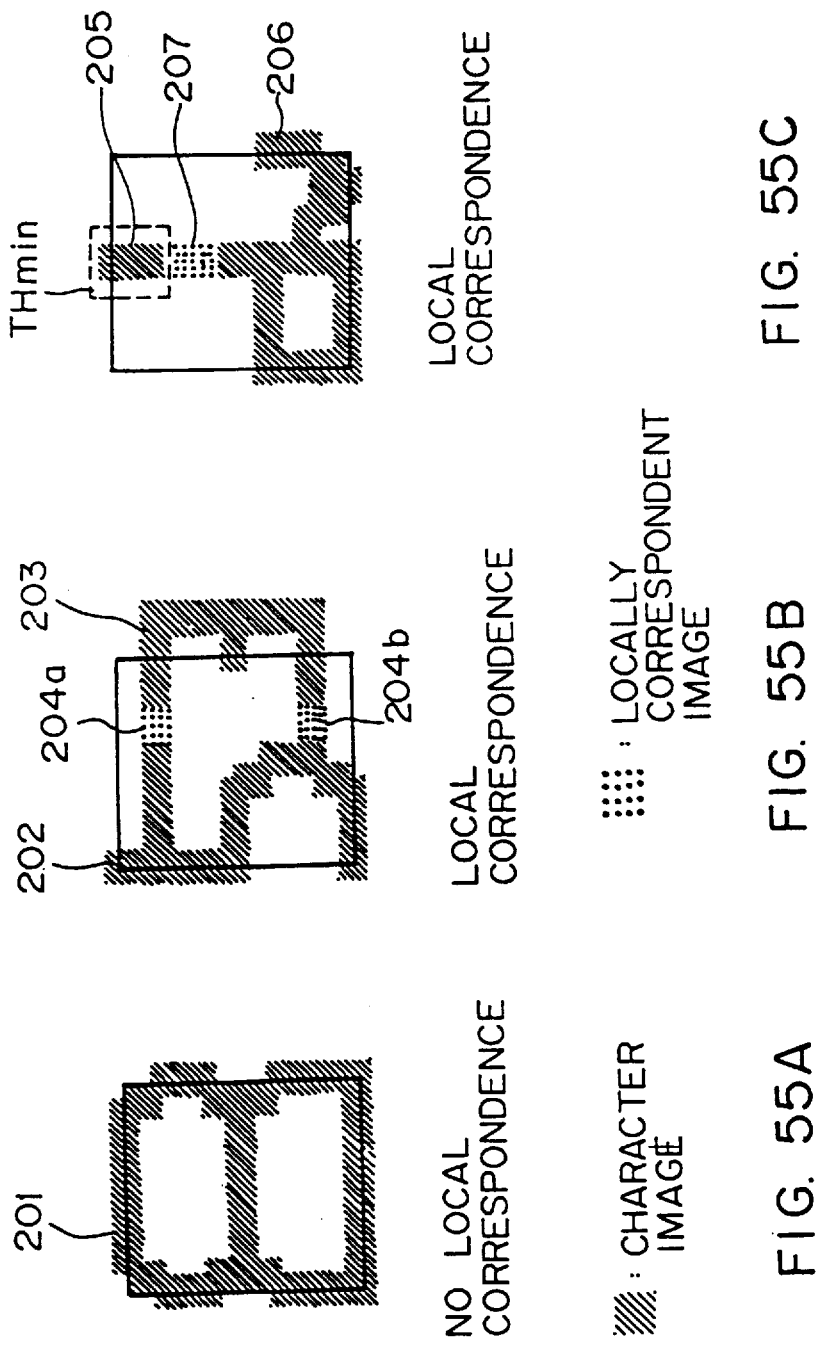

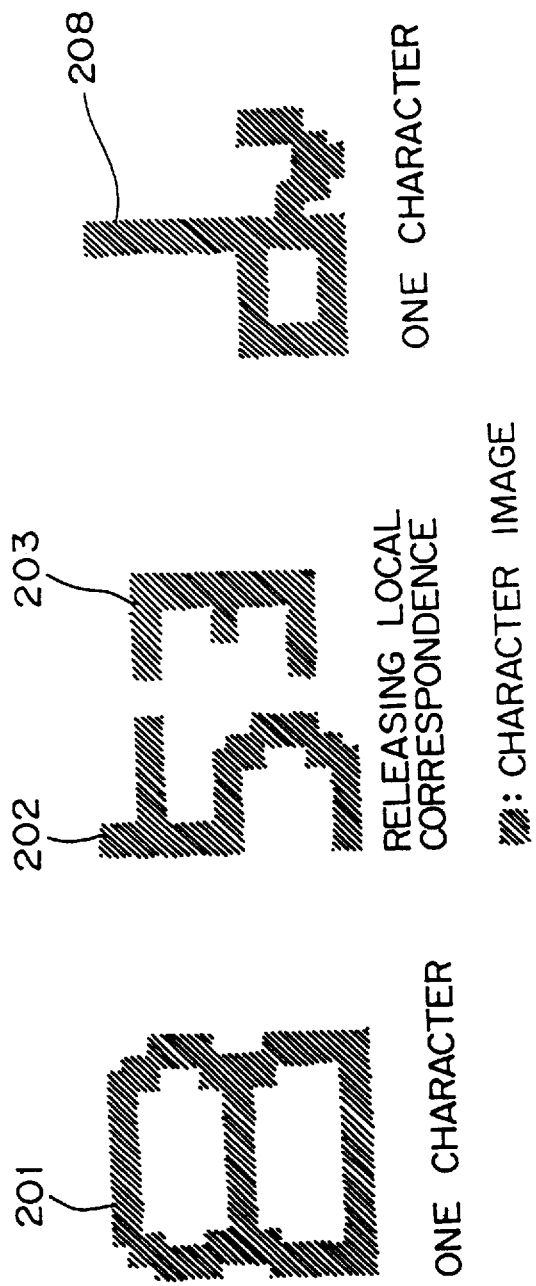

FIG. 59

TABLE (▓ : IN-BOX EXTRACTED IMAGE)

| TYPE | N-SHAPED | INVERTED-N-SHAPED | 8-SHAPED | |
|---|---|---|---|---|
| STRUCTURE OF VIRTUAL IMAGE | (N-shape) | (Inverted-N shape) | (hourglass) | (X-shape) |
| STRUCTURE OF TRUE IMAGE | (diagonal bar) | (diagonal bar) | (two horizontal bars) | |
| CONDITIONS FOR UNIQUELY DETERMINING PLURAL STRUCTURES | — | — | DIRECTIONAL PROPERTY CORRESPONDENCE IN VERTICAL AND HORIZONTAL DIRECTIONS | DIRECTIONAL PROPERTY CORRESPONDENCE IN DIAGONAL DIRECTION |

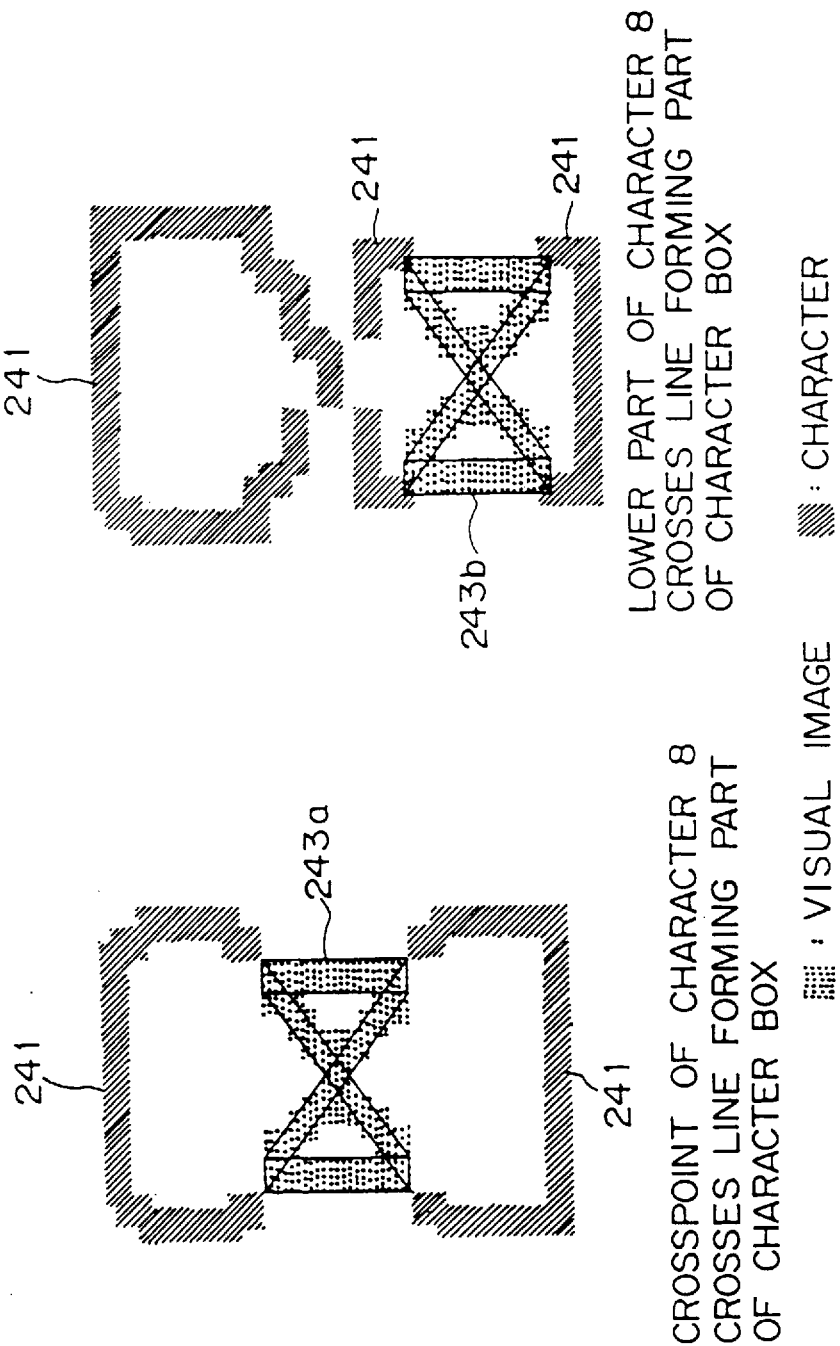

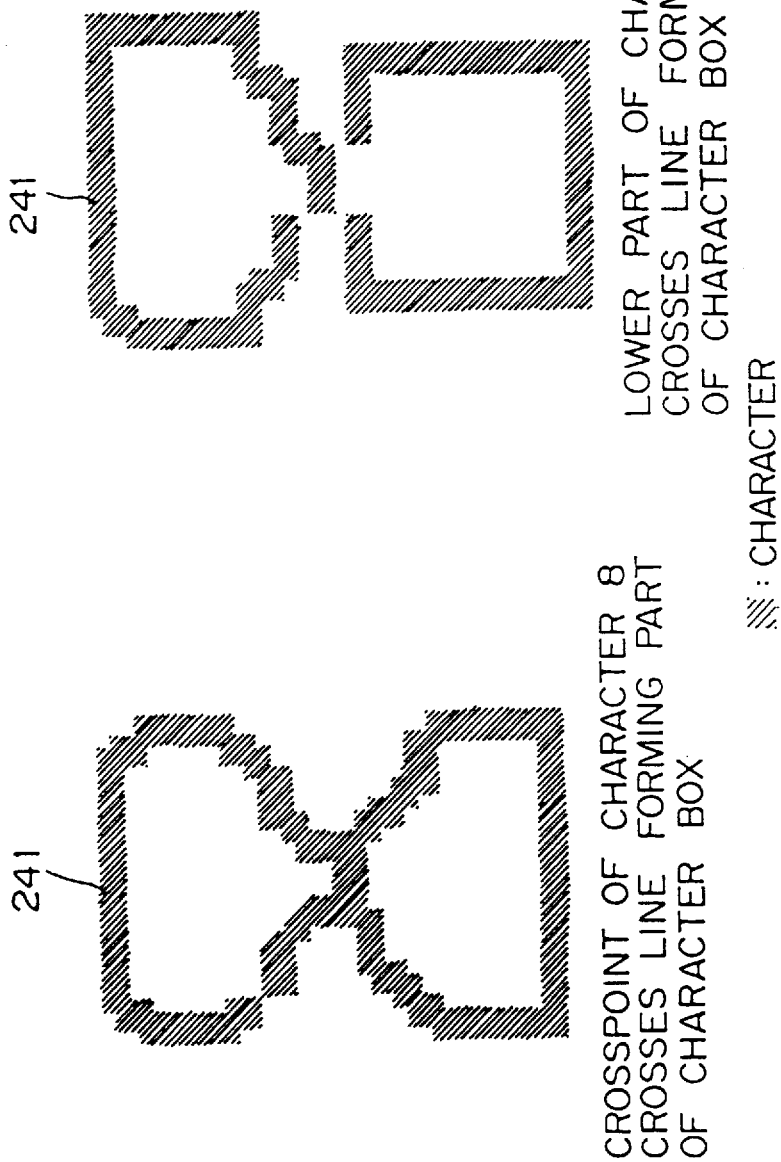

INVERTED – N – SHAPED (5 AND 1)

PROCESS RESULT
ACCORDING TO
PRESENT EMBODIMENT
(5 AND 1)

CONVENTIONAL
PROCESS RESULT
(3 AND 9)

N- SHAPED
(4 AND j)

PROCESS RESULT ACCORDING TO PRESENT EMBODIMENT

CONVENTIONAL PROCESS RESULT

CONVENTIONAL PROCESS RESULT

8-SHAPED
(5 AND T)

PROCESS RESULT
ACCORDING TO
PRESENT
EMBODIMENT

CONVENTIONAL
PROCESS RESULT

CONVENTIONAL
PROCESS RESULT

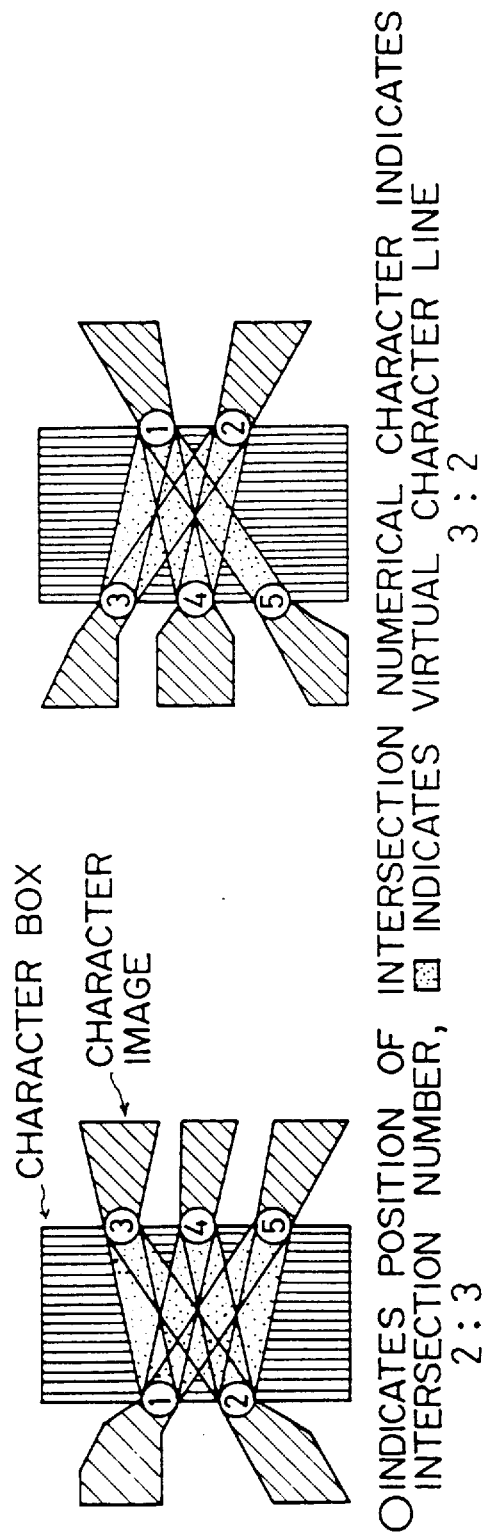

| TYPE | STRUCTURE OF VIRTUAL IMAGE | STRUCTURE OF TRUE CHARACTER LINE | | CONDITION FOR UNIQUE DETERMINATION ON PLURAL STRUCTURES |
|---|---|---|---|---|
| TYPE 1 | 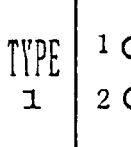 | 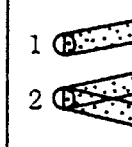 | 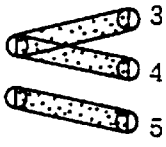 | |
| TYPE 2 | 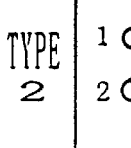 | 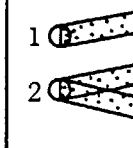 | | |
| TYPE 3 | 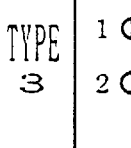 | 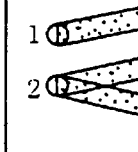 | | |
| TYPE 4 | 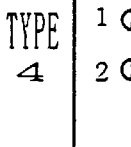 | 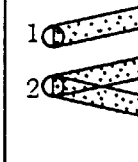 | 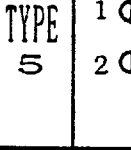 | LEFT STRUCTURE WHEN CHARACTER BOX SIZE IN HORIZONTAL DIRECTION IS LARGER AT ① : AND RIGHT STRUCTURE WHEN CHARACTER BOX SIZE IN HORIZONTAL DIRECTION IS LARGER AT ② |
| TYPE 5 | 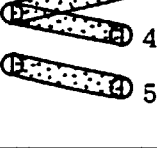 | | 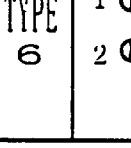 | |
| TYPE 6 | 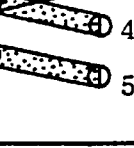 | | 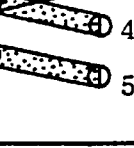 | |
F I G. 7 3

WHEN SIZE IS LARGER AT ①

WHEN SIZE IS LARGER AT ②

○ INDICATES POSITION OF INTERSECTION, NUMERICAL NUMBER INDICATES INTERSECTION NUMBER
▨ INDICATES VIRTUAL CHARACTER LINE

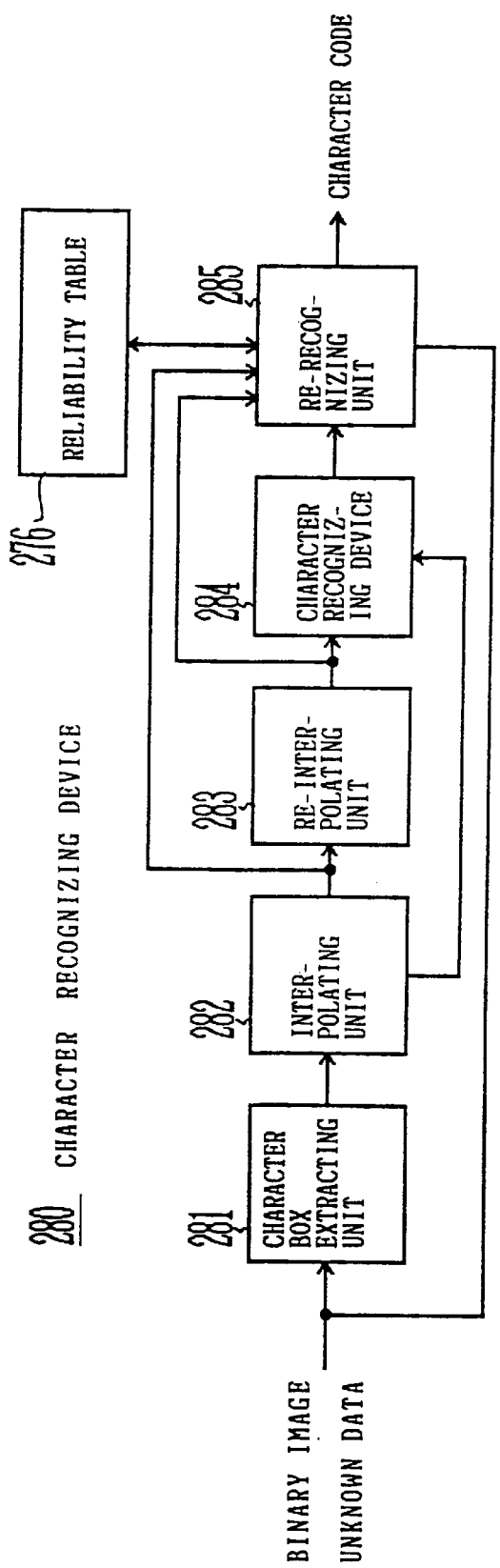
F I G. 80

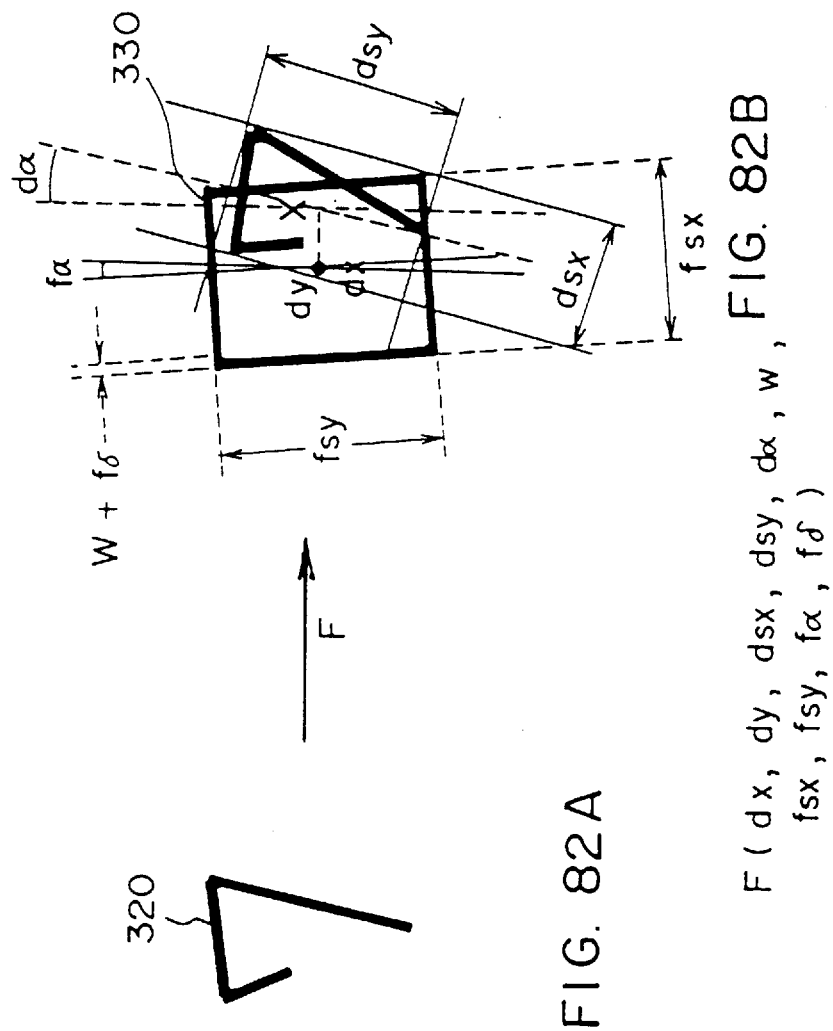

400 RELIABILITY TABLE

| VARIATION TYPE | AMOUNT OF VARIATION | | | WRONG-AND-CORRECT CHARACTER SET | RELIABIL-ITY | RE-RECOGNIZING METHOD | RE-RECOGNIZING AREA | RE-RECOGN-IZING RELIABILITY |
|---|---|---|---|---|---|---|---|---|
| POSITION ERROR OF DOWNWARD | dy=5 | w=5 | · | (2, 7) | 77% | EMPHASIZING AREA | m/2×n | 95% |
| · | · | · | · | · | · | | | · |
| POSITION ERROR OF UPWARD | · | · | · | · | · | | | · |
| · | · | · | · | · | · | | | · |
| POSITION ERROR OF RIGHTWARD | · | · | · | · | · | | | · |
| · | · | · | · | · | · | | | · |
| POSITION ERROR OF LEFTWARD | · | · | · | · | · | | | · |
| · | · | · | · | · | · | | | · |

FIG. 84

| VARIATION TYPE | AMOUNT OF VARIATION | | | | | |
|---|---|---|---|---|---|---|
| POSITION ERROR OF DOWNWARD | dx=-3~+3, dy=5, w=5 dsx=1 dsy=1 dα=-10~+10, fα=-10~+10 with no fδ | | | | | |
| VARIATION IN CHARACTER OBLIQUENESS (TOUCHING AT LEFT SIDE OF CHARACTER BOX) | dx=-3~+3, dy=-3~+3, w=5 dsx=1 dsy=1 dα=-20 -10, fα=-10~+10 with no fδ | | | | | |

FIG. 85

PATTERN EXTRACTING DEVICE AND METHOD TO EXTRACT A PATTERN FROM A COMBINATION AND VARIETY OF PATTERNS

BACKGROUND OF THE INVENTION

1. Field of the Invention

The present invention relates to a pattern extracting device, and more specifically to a pattern extracting device for extracting a pattern from a combination of various patterns such as straight lines, characters, drawings, etc. by retrieving characters and symbols stored not only in a hand-written character recognizing device but also in a printed character recognizing device and a figure recognizing device, and by separating a line from an object, drawings from characters, etc.

That is, the present invention relates to, for example, a pattern extracting device for extracting a pattern such as a character, figure, etc. from the touching character box, line, etc. stored in the hand-written character recognizing device, for example, an optical character reader, etc.

2. Description of the Related Art

Recently, hand-written character recognizing devices have been demanded as hand-written character input/output devices. To correctly recognize an individual character in such hand-written character recognizing devices, it is important to correctly retrieve the character as a preprocess for recognizing the character.

Characters are recognized in a document in which character positions, areas, etc. are initially specified in a list, table, etc. In such a document, boxes are initially printed to indicate the positions of letters not in drop-out color but in non-drop-out color such as the same color as that of the letters or deep color. As a result, in a document printed in non-drop-out color, characters can be automatically recognized at a high recognition rate only if they are written neatly so that they are contained wi the specified area of input characters identified by black-frame boxes. However, if they are written on or over the specified areas or touching the lines identifying input character positions, then the recognition rate is considerably lowered.

Therefore, to improve the recognition rate, only the characters, drawings, symbols, etc. should be extracted from the characters touching the lines, boxes, etc. for correct retrieval in list, table, etc. where character positions are identified by non-drop-out color.

The Applicant of the present invention disclosed the first image extracting system shown in FIG. 1 in Tokugan-hei 5-103257 filed with the Patent Office of Japan. The input pattern to be processed in this system is a binary image corrected to remove extreme obliqueness, turn, etc., and preprocessed to remove noises, low spots, etc. Thus, the character boxes are removed from, for example, the lists and tables with deep-color character boxes based on the input pattern. For example, a plurality of one-row character boxes are provided. Some of the boxes are not defined for size, position, or obliqueness. When characters are hand-written to these boxes, only the boxes can be removed even if the characters are touching the boxes or partially overlap the lines.

As shown in FIG. 1, the first image extracting system comprises a link pattern extracting unit 1, a line detecting unit 2, a straight line detecting unit 3, a box detecting unit 4, and a box separating unit 5. The link pattern extracting unit 1 extracts a link pattern in which picture elements are connected from an input pattern comprising a straight-line portion comprising boxes, lines, etc., and graphics, characters, or symbols. The line detecting unit 2 contains a fine-line process and detects a broken line or a part of a straight line for predetermined length in a link pattern. The straight line detecting unit 3 detects a long straight line by integrating the obtained broken lines or a part of the straight line. The box detecting unit 4 extracts a straight line forming part of a character box by recognizing, for example, the space between the obtained straight lines. The box separating unit 5 obtains the intersection of the extracted straight lines, divides the character box into a plurality of smaller character boxes each containing a single character according to the intersection information, and calculates the thinness of the line forming the smaller character boxes. Then, the character box is separated from the link pattern based on the thinness of the line forming the character box.

When the character box to be removed from the input pattern is a box other than the above described character box, such character box extracting methods as those disclosed by Tokukai-sho 62-212888, Tokukai-hei 3-126186, are also proposed. In these character box extracting methods, the format information relating to the position, size, etc. and other information about obliqueness are input and stored as listing data. The character boxes are removed based on the stored information.

In addition to the first image extracting system, the Applicant of the present invention also disclosed the second image extracting system in Tokukai-hei 6-309498 filed with the Patent Office of Japan to extract only characters from those touching character boxes.

FIG. 2 is a block diagram showing the entire configuration of this system.

In FIG. 2, a character box extracting unit 11 extracts only the character box from the binary image of the characters touching their character box (line-touching characters), and removes the character box.

In this process, the line-touching portion of a line forming part of the line-touching character indicates a low spot, thereby showing broken lines in the line forming part of the character.

For example, the binary image of "3" linked by the label 1 shown in FIG. 3A is divided into 3 broken lines forming part of the character as a result of the extraction and removal of a character box 21 as shown in FIG. 3B. The 3 broken lines are assigned the labels 1, 2, and 3. The binary image of "7" linked by the label 1 shown in FIG. 4A is divided into 3 broken lines forming part of the character as a result of the extraction and removal of a character box 23 as shown in FIG. 4B. The 3 broken lines are assigned the labels 1, 2, and 3.

An interpolating unit 12 interpolates necessary elements after evaluating the geometrical structure, for example, the direction of and clearance between the lines which form part of a character and are assigned labels.

Thus, the binary image of "3" broken at its line-touching portion as shown in FIG. 3B can be supplemented, thereby completing the character "3" with label 1 as shown in FIG. 3C. The binary image of "7" broken at its line-touching portion as shown in FIG. 4B is supplemented. However, the necessary elements are interpolated only between the lines with labels 1 and 2 as shown in FIG. 4C, but not between the lines with labels 1 and 3. As a result, the character "7" remains divided as two broken lines with labels 1 and 2 as shown in FIG. 4C.

A re-interpolating unit 13 interpolates necessary elements into the broken lines forming part of a character when the character has a line just touching in parallel to the line forming the character box. In this process, the line-touching character is preliminarily extracted according to the linkage based on the labels assigned to the line-touching character, detects the coincidence of the pattern interpolated by the interpolating unit 12 with the above described linkage of the line-touching character, and re-interpolates the necessary line touching in parallel to the line forming the character box.

Thus, the binary image "7" divided into the two broken lines with labels 1 and 2 as shown in FIG. 4C can be completed into the character shown in FIG. 4D.

As a result, the line-touching character can be reconstructed by the interpolating unit 12 or re-interpolating unit 13 after removing the character box.

The supplemented and re-supplemented patterns output respectively by the interpolating unit 12 and re-interpolating unit 13 are input to a recognizing unit 14. The recognizing unit 14 contains a plurality of character category dictionaries, compares the supplemented or re-supplemented pattern with each of the category dictionaries, and outputs the code of the character category indicating the smallest difference from the supplemented or re-supplemented pattern. That is, in the example shown in FIG. 4, it is recognized that the pattern shown in FIG. 4C belongs to the character category of "y". Likewise, it is recognized that the pattern shown in FIG. 4D belongs to the character category of "7". Then, it is determined that "7" indicates smaller difference, the character is finally recognized as "7", and the character code of 7 is output.

However, the first image extracting system disclosed by the present invention has the following problem, and therefore should be further improved. The first problem is that a character box cannot be successfully extracted when the character box is not to contain a single character or to contain a row of characters, that is, when the character box is designed for listings or in a free format. The second problem is that the line detecting unit 2 contains a fine-line process unit for performing a fine-line process, thereby taking a long process time. Furthermore, the fine-line process impairs the linearity of an original image. Therefore, if a fine-line process is performed on the original image of "6" partially overlapping the line forming the character box as shown in FIG. 5A, the output pattern indicates a combination of curves as shown in FIG. 5B. Since the character box cannot be detected as a straight line, it cannot be correctly extracted. The third problem is that a character box cannot be extracted when a character touches a plurality of adjacent lines forming the character box because, upon detection of broken lines, the character box is not recognized as a single-character box or a block-of-character box and the subsequent processes are aborted. The fourth problem is that a character box may not be correctly extracted after failing in searching for the character box if the search does not start at the correct start point because a partial pattern of the original image of the character box is traced to extract the character box.

The fourth problem is described below by referring to the example shown in FIG. 6. A partial pattern can be searched for downward. If the downward search has reached the bottom, then the search is made in the left or right direction by, for example, a predetermined number of picture elements corresponding to the thinness of the line forming the character box. Therefore, when the search starts at point A, the search is made in a good condition as shown in FIG. 26 by an arrow 26. However, if the search starts at point B, the search for a partial pattern cannot be made downward. Even if the search is then made in the left or right direction by the predetermined number of picture elements, the search cannot be successful using an arrow 27 shown in FIG. 6 because the partial pattern does not exist at the lower area. As a result, the character box cannot be extracted if the search starts at B.

In the character box extracting method disclosed by the publication of the above described Tokukai-sho 62-212888 and Tokukai-hei 3-126186, a character box can be extracted even if it is a block-of-character box in a table format. However, since the format information such as the position, size, obliqueness, etc. can be preliminarily entered and stored as listing data, the method has the problem that it is subject to have influences of the uneven surface made by the character box or of a slight obliqueness. Therefore, a character box slightly off a predetermined position can be recognized as a character and cannot be extracted as a character box. Otherwise, a character may be extracted as a part of the character box. Furthermore, since the user is required to enter the information for all character boxes in the listings, the entry process takes a long time and charges the user with a heavy load.

The above described second image extracting system has the following problems.

In this method, as described above, the recognizing unit 14 compares a supplemented pattern or a re-supplemented pattern with standard patterns entered in various types of character category dictionaries and outputs, as a recognition result, a character code indicating the smallest difference. In this example, the interpolating unit 12 or re-interpolating unit 13 respectively interpolates or re-interpolates necessary elements into the line-touching character. In fortunate cases, the broken lines forming part of a character can be supplemented based on the portion touching the character box. In unfortunate cases, however, the broken lines cannot be supplemented. FIG. 7 shows such examples.

As shown in FIG. 7A, the lower line of the character pattern "2" touches a character box 29 and the line-touching portion is almost completely on the character box 29. In this case, the character box extracting unit 11 removes the character box 29 as shown in FIG. 7B, and the character pattern of "2" is divided into the partial patterns with labels 1 and 2. Then, the interpolating unit 12 links the two partial patterns to make the pattern with label 1 as shown in FIG. 7C. Since the lower line forming the character "2" is not supplemented, there is the possibility that the recognizing unit 14 can recognize the pattern shown in FIG. 7C mistakenly as "7", but not "2".

If a part of the line-touching character is not written over line of the character box, but completely on the line, then the line-touching portion cannot be supplemented by the interpolating unit 12 or re-interpolating unit 13. As a result, it is almost impossible for the recognizing unit 14 to correctly recognize the line-touching character.

Therefore, for example, the optical character reading device of Tokukai-hei 3-122786 filed with the Patent Office of Japan has disclosed the system of recognizing a line-touching character using the dictionary by storing the partial patterns for a line-touching character or a character written over the character box after removing the character box. However, since a great number of the touching states can be assumed between a character and its character box, all the partial patterns for all characters cannot be stored. Improving the recognition rate refers to an increasing cost with the storage capacity for the dictionaries becoming extremely large. Furthermore, the improvement of the recognition rate is limited because the number of stored partial patterns is limited. With the increasing number of the partial patterns stored in the dictionaries, the access time to the dictionaries also increases, thereby lowering the recognition speed.

The optical character reading device of Tokukai-hei 6-62044 filed with the Patent Office of Japan has disclosed the system of recognizing a character by removing an underlined area or a character box area and comparing the character pattern with the binary pattern information about the standard characters in each character category stored in the dictionary. In this method, as shown by the examples in FIGS. 7A and 7B, a character cannot be correctly recognized if the line-touching portion is removed and the remaining character pattern is similar to another character category. In this system, the underlined area or character box area is removed when characters are recognized, but the portion of the character written over the character box is not supplemented. Therefore, if a character partially overlaps its character box, the recognition rate is lowered.

SUMMARY OF THE INVENTION

The present invention has been developed to improve the above described problems, and aims at providing an image extracting device capable of correctly retrieving characters, graphics, symbols, etc. touching the straight-line portions of the character boxes, lines forming tables, etc. by correctly extracting the portions forming parts of the characters, graphics, symbols, etc. from the straight-line portions of the character boxes, lines forming tables, etc. Furthermore, it aims at enhancing the recognition rate for characters touching or partially overlapping their character box, lines forming tables, etc., thereby lowering the misrecognition rate.

To attain these objects, the present invention provides a pattern extracting device for extracting only a pattern from an image formed by straight lines and the pattern. The pattern extracting device includes a line extracting unit for extracting straight lines from an image formed by the straight lines and a pattern; an intersection calculating unit for calculating the intersection of the straight line extracted by the line extracting unit with the pattern; a virtual image extracting unit for extracting as a virtual image a portion corresponding to the above described pattern partially overlapping the line according to the intersection information obtained by the intersection calculating unit; and a true image extracting unit for extracting only the image of the above described pattern from the virtual image extracted by the virtual image extracting unit.

The present invention also provides a pattern re-recognizing table generating device. The pattern re-recognizing table generating device includes a pattern separating unit for separating and extracting only the pattern from the image containing the pattern touching a line; a pattern recognizing unit for recognizing the pattern extracted by the pattern separating unit; a reliability calculating unit for calculating the reliability of the pattern recognized by the pattern recognizing unit for each of the touching state between the line and the pattern forming the object image; and a table generating unit for generating a table for storing the reliability data together with a set of patterns, that is, a pattern misrecognized by the pattern recognizing unit and an expected pattern, for the line-pattern touching state with the reliability (calculated by the reliability calculating unit) smaller than a predetermined threshold.

A further pattern re-recognizing table generating device according to the present invention includes a pattern separating unit for separating and extracting only the pattern from the image containing the pattern touching a line; a pattern recognizing unit for recognizing the pattern extracted by the pattern separating unit; a reliability calculating unit for calculating the reliability of the pattern recognized by the pattern recognizing unit for each of the touching state between the line and the pattern forming the object image; a character re-recognizing unit for learning a method of re-recognizing a character to improve the reliability in pattern recognition for the line-pattern touching state with the reliability (calculated by the reliability calculating unit) smaller than a predetermined threshold; and a table generating unit for generating a table for storing the method of re-recognizing a character learned by the character re-recognizing unit together with a set of patterns, that is, a pattern misrecognized by the pattern recognizing unit and an expected pattern.

A further pattern re-recognizing table generating device according to the present invention includes a character separating unit for separating and extracting only a character from an image containing the character as touching its character box or ruled line; a character recognizing unit for recognizing the character extracted by the character separating unit; a reliability calculating unit for calculating the reliability of the character recognized by the character recognizing unit for each line-character touching state; and a table generating unit for generating a table for storing the reliability data together with a set of characters, that is, a character misrecognized by the character recognizing unit and an expected character, for the line-character touching state with the reliability (calculated by the reliability calculating unit) smaller than a predetermined threshold.

A further pattern re-recognizing table generating device according to the present invention includes a character separating unit for separating and extracting only the character from the image containing the character touching a line of its character box or a ruled line; a character recognizing unit for recognizing the character extracted by the character separating unit; a reliability calculating unit for calculating the reliability of the character recognized by the character recognizing unit for each of the touching state between the line and the character forming the object image; a character re-recognizing unit for learning a method of re-recognizing a character to improve the reliability in character recognition for the line-character touching state with the reliability (calculated by the reliability calculating unit) smaller than a predetermined threshold; and a table generating unit for generating a table for storing the method of re-recognizing a character learned by the character re-recognizing unit together with a set of characters, that is, a character misrecognized by the character recognizing unit and an expected character.

A pattern recognizing unit according to the present invention includes a pattern separating unit for separating and extracting only the pattern from the image containing the pattern partially overlapping a line; a pattern recognizing unit for recognizing the pattern extracted by the pattern separating unit; a reliability calculating unit for calculating the reliability of the pattern recognized by the pattern recognizing unit for each of the states of the patterns partially overlapping the lines forming the object images; and a re-recognizing unit for re-recognizing the pattern by a method different from that of the pattern recognizing unit for the state of the pattern partially overlapping the line where the reliability calculated by the reliability calculating unit is smaller than a predetermined threshold.

The pattern recognizing device further includes a table in which a pattern re-recognizing method is entered to improve the reliability in pattern recognition for the state of the pattern partially overlapping the line where the reliability recognized by the pattern recognizing unit is smaller than a predetermined threshold. The re-recognizing unit re-recognizes the pattern by the re-recognizing method entered in the table.

A further pattern recognizing device according to the present invention includes a character separating unit for separating and extracting only the character from the image containing the character touching a line of its character box or ruled line; a character recognizing unit for recognizing the character extracted by the character separating unit; a reliability calculating unit for calculating the reliability of the character recognized by the character recognizing unit for each of the touching states between the line and the character forming the object image; a re-recognizing unit for re-recognizing the character by a method different from that of the character recognizing unit for the line-character touching state with the reliability (calculated by the reliability calculating unit) smaller than a predetermined threshold.

The pattern recognizing device further includes a table in which a character re-recognizing method is entered to improve the reliability in character recognition for the line-character touching state with the reliability (recognized by the character recognizing unit) smaller than a predetermined threshold. The re-recognizing unit re-recognizes the character by the re-recognizing method entered in the table.

The pattern recognizing device further includes a table containing, for the line-character touching state with the reliability (recognized by the character recognizing unit) smaller than a predetermined threshold, a set of characters, that is, a character misrecognized by the character recognizing unit and an expected character, together with a character re-recognizing method to improve the reliability in line-touching character recognition. The re-recognizing unit is configured such that characters can be re-recognized by the re-recognizing method entered in the table if the character recognized by the character recognizing unit is contained in the set of characters entered in the table.

The pattern recognizing device further includes a table containing, for the line-character touching state with the reliability (recognized by the character recognizing unit) smaller than a predetermined threshold, the reliability data, a set of characters, that is, a character misrecognized by the character recognizing unit and an expected character, together with a character re-recognizing method to improve the reliability in line-touching character recognition. The re-recognizing unit is configured such that characters can be re-recognized by the re-recognizing method entered in the table if the character recognized by the character recognizing unit is contained in the set of characters entered in the table, and if the reliability in character recognition by the character recognizing unit registered in the table is smaller than a predetermined threshold.

The pattern recognizing device further includes a table containing, for the line-character touching state with the reliability (recognized by the character recognizing unit) smaller than a predetermined threshold, a parameter indicating the feature of the touching state, the reliability data, a set of characters, that is, a character misrecognized by the character recognizing unit and an expected character, together with a character re-recognizing method to improve the reliability in line-touching character recognition. The re-recognizing unit is configured such that the re-recognizing unit can calculate a value of each parameter representing the feature of the line-character touching state, and that characters can be re-recognized by the re-recognizing method entered in the table if the parameter and the character recognized by the character recognizing unit are contained in the set of characters entered in the table, and if the reliability in character recognition by the character recognizing unit registered in the table is smaller than the predetermined threshold.

BRIEF DESCRIPTION OF THE DRAWINGS

FIG. 9 shows the second principle of the present invention;

FIG. 22 is a block diagram showing the configuration of the image extracting device according to the present invention;

FIGS. 38A, 38B, and 38C show examples in which the intersections in the line forming the character box correspond to the intersection of the character with the line forming the character box according to the flowchart shown in FIG. 38;

FIG. 42 is a flowchart showing in detail an example of the process performed by the character-in-character-box extracting unit;

FIG. 43 is a block diagram showing an example of the configuration of the character-in-character-box interpolating unit;

FIGS. 55A, 55B, and 55C show examples of character patterns for a portion having a local correspondence and for a portion not having a local correspondence;

FIGS. 56A, 56B, and 56C show examples of correctly retrieving a character pattern shown in FIG. 47 through the character size evaluating unit;

FIG. 59 shows an example of the character structure definition table;

FIGS. 63A and 63B show examples of line-touching characters as appearing as 8-shaped virtual images;

FIGS. 64A and 64B show examples of correctly retrieving the line-touching characters shown in FIG. 63;

FIGS. 72A and 72B show enlarged drawings of the line-touching character having two and three intersections of the character with the character box at the borders of the line forming part of the character box;

FIG. 73 shows the configuration of the virtual image table of the format shown in FIG. 72;

FIG. 77 shows the second configuration of the virtual image table of the structure shown in FIG. 75;

FIG. 78 shows the third configuration of the virtual image table of the structure shown in FIG. 75;

FIG. 80 is a block diagram showing the configuration of the first character recognizing device according to the embodiment of the present invention;

FIGS. 82A and 82B show the method of generating a line-touching character;

FIG. 84 shows the general configuration of the reliability table generated by the reliability table generating device shown in FIG. 81;

FIG. 85 shows other examples of variations entered in the reliability table and of amounts of variations;

DESCRIPTION OF THE PREFERRED EMBODIMENTS

Described below is the principle of the present invention.

FIGS. 8 through 15 show the principle of the present invention relating to the pattern extracting device for extracting only a pattern from an image represented as having the pattern written on a line.

Figure 8:
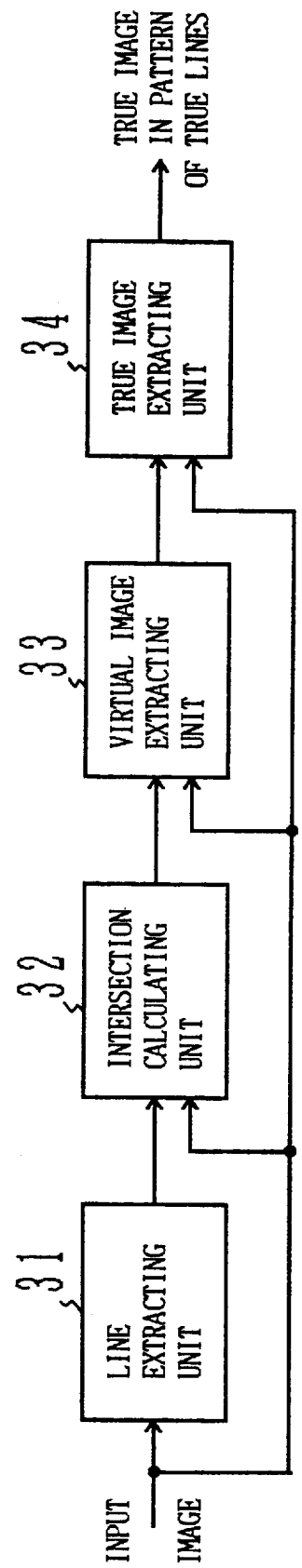
FIG. 8 shows the first principle of the present invention.

FIG. 8 is a block diagram showing the entire configuration of the present invention.

A line extracting unit 31 extracts a line from an image in which a line partially overlaps a pattern.

An intersection calculating unit 32 calculates the intersections of the line extracted by the line extracting unit 31 with the pattern.

A virtual image extracting unit 33 assumes a portion of the pattern written on the line according to the intersection information obtained by the intersection calculating unit 32 and extracts the portion as a virtual image.

A true image extracting unit 34 extracts only an image of the pattern as a true image from the virtual image extracted by the virtual image extracting unit 33.

FIG. 9 shows an example of the configuration of the true image extracting unit 34.

A true image determining unit 35 determines a true image corresponding to the image of the pattern in the virtual image.

An area removing unit 36 removes from the virtual image the area other than the portion determined to be a true image by the true image determining unit 35.

Figure 10:
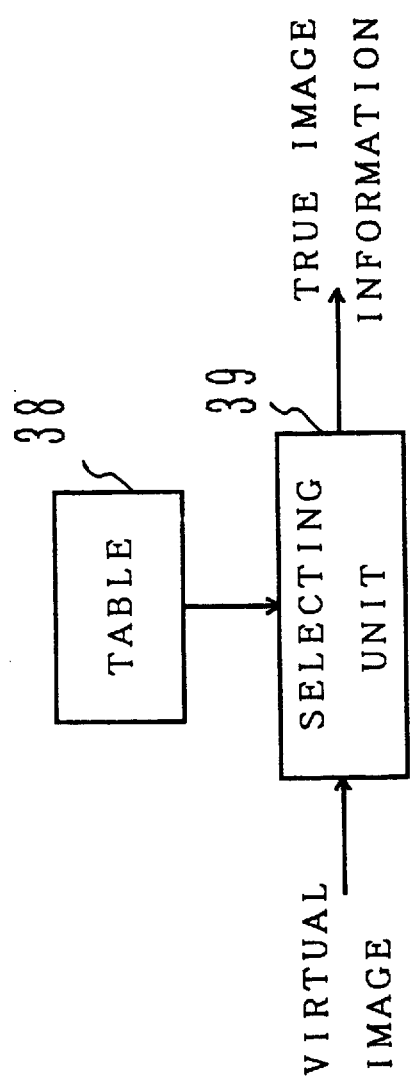
FIG. 10 shows the third principle of the present invention.

FIG. 10 shows an example of the configuration of the true image determining unit 35.

A table 38 stores the information for use in extracting from the structure of the virtual image only a true image corresponding to the image of the pattern of the virtual image.

A selecting unit 39 determines the structure of the virtual image and selects a true image corresponding to the image of the pattern of the virtual image by referring to the table 38.

If the pattern refers to a character with the above described configuration, the table 38 is provided separately for each type of character (for example, separately for a numerical character, alphabetical letter, Japanese character, Chinese character, etc.).

FIGS. 11 through 15 are block diagrams showing the configuration according to the second aspect of the present invention aiming at processing a character pattern.

Figure 11:
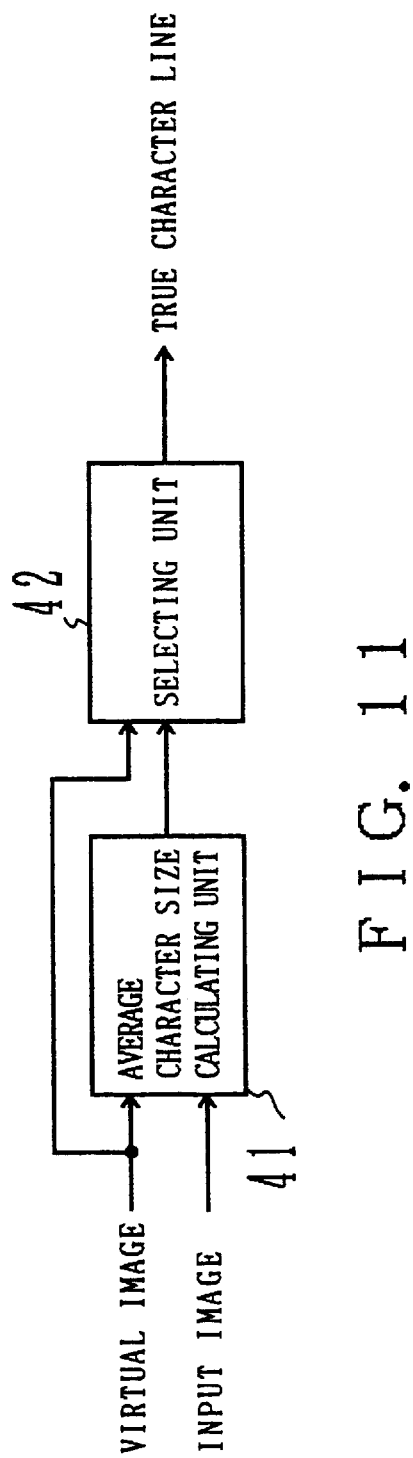
FIG. 11 shows the fourth principle of the present invention.

FIG. 11 is a block diagram showing other configurations of the true image determining unit 35.

An average character size calculating unit 41 calculates an average character size, that is, the average size of a 1-character pattern from the character string of the character pattern including a virtual image.

A selecting unit 42 selects a true image for the line forming part of a character of the above described character pattern from the virtual image based on the average character size calculated by the average character size calculating unit 41.

Figure 12:
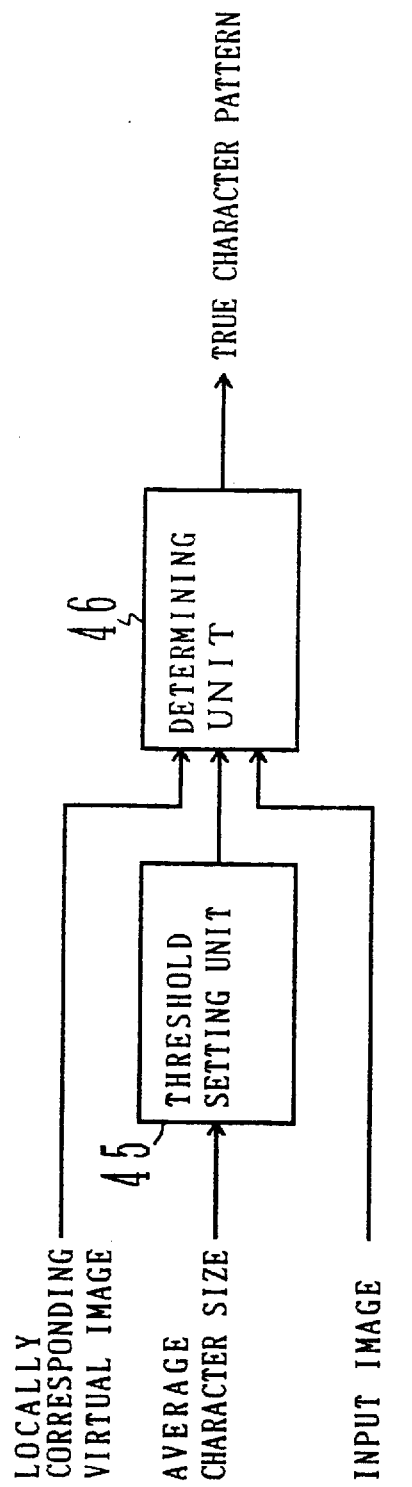
FIG. 12 shows the fifth principle of the present invention.

FIG. 12 is a block diagram showing an example of the configuration of the selecting unit 42.

A threshold setting unit 45 sets the maximum and minimum character sizes based on the average character size calculated by the average character size calculating unit 41.

When a character pattern locally associated with a virtual pattern is larger in size than the maximum character size obtained by the average character size calculating unit 41, the determining unit 46 regards as a true image the virtual image locally associated with an image smaller in size than the above described minimum character size in a plurality of patterns obtained by removing the associated virtual image from the character pattern. The threshold setting unit 45 and determining unit 46 can be configured as follows.

That is, the threshold setting unit 45 determines the maximum character size based on the above mentioned average character size calculated by the average character size calculating unit 41.

When the character pattern in the above described character string is larger than the maximum character size set by the threshold setting unit 45, the determining unit 46 determines that the character pattern refers to a true image of one character.

Figure 13:
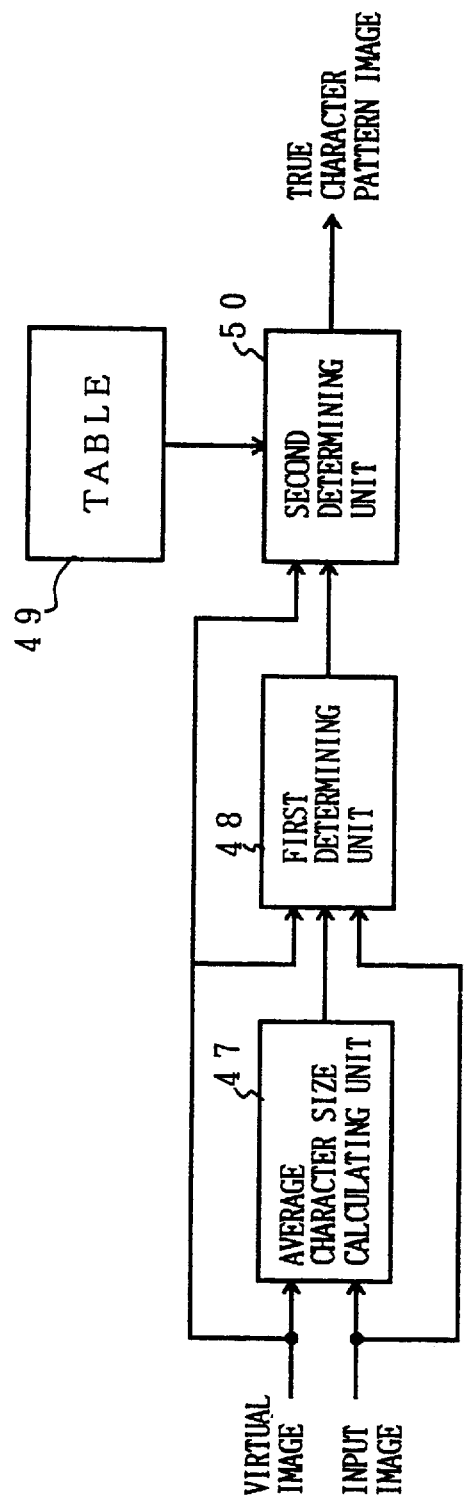
FIG. 13 shows the sixth principle of the present invention.

FIG. 13 shows an example of another configuration of the true image determining unit 35.

If the pattern refers to a character pattern, the average character size calculating unit 47 calculates the average character size representing the average size of the pattern of one character from the character string of the character patterns including the virtual image.

The first determining unit 48 determines the image of the true line forming part of a character from the character pattern including the virtual image in the character string based on the average character size obtained by the average character size calculating unit 47.

A table 49 stores the information for use in extracting only images of true lines forming a character in a virtual image from the structure of the virtual image formed by virtual lines.

A second determining unit 50 judges the structure of the virtual image, refers to the table 49, and determines based on the virtual image the true image formed by the true lines.

Figure 14:
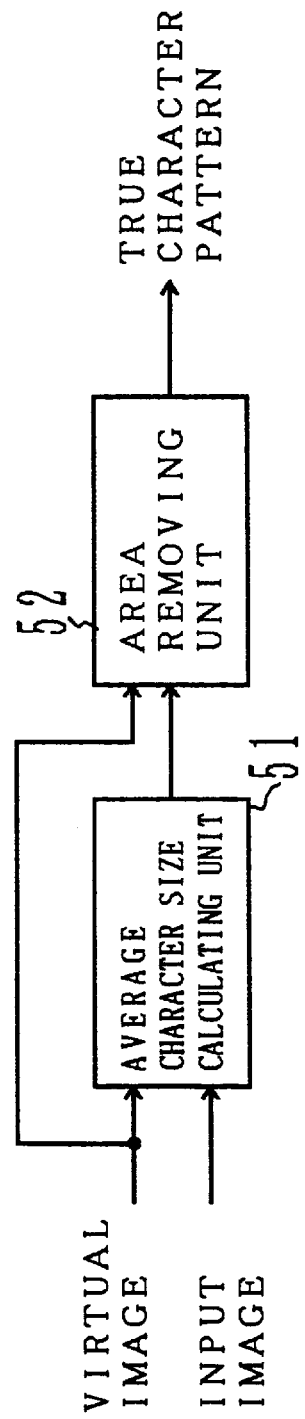
FIG. 14 shows the seventh principle of the present invention.

FIG. 14 shows an example of the configuration of the true image extracting unit 34.

If the pattern refers to a character pattern, an average character size calculating unit 51 calculates an average character size, that is, the average size of a 1-character pattern from the character string of the character pattern including a virtual image.

An area removing unit 52 removes areas other than a true image of a character pattern from the character pattern including the virtual image in the character string based on the average character size obtained by the average character size calculating unit 51.

Figure 15:
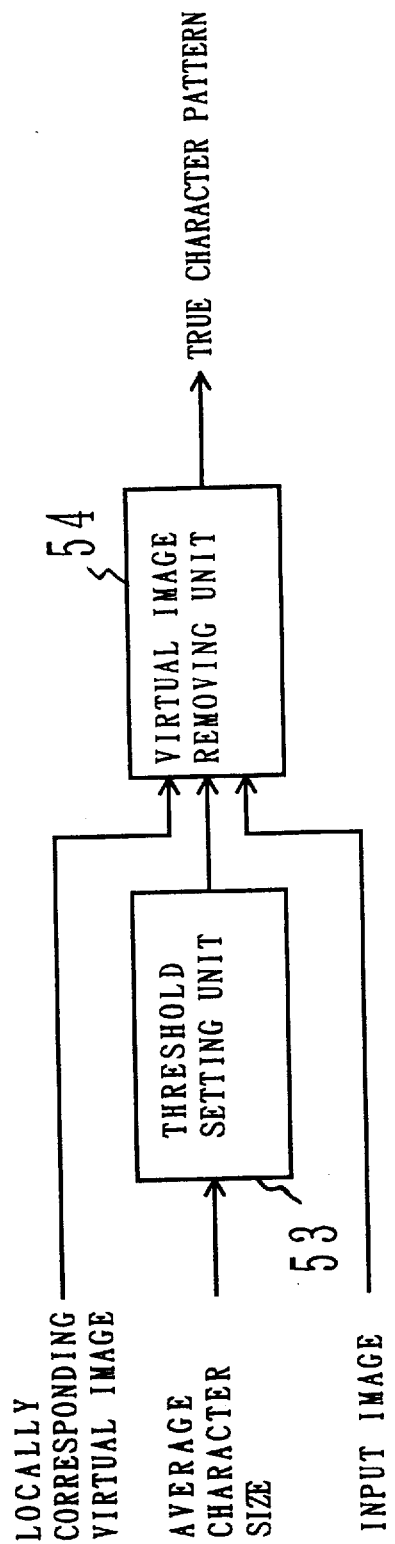
FIG. 15 shows the eighth principle of the present invention.

FIG. 15 shows an example of the configuration of the area removing unit 52.

A threshold setting unit 53 sets the maximum and minimum character sizes based on the average character size.

If the character pattern locally corresponding to the virtual image is larger than the maximum character size obtained by the threshold setting unit 53, then a virtual image removing unit 54 removes the locally corresponding virtual image only when a plurality of character patterns obtained when the locally corresponding virtual image is removed from the character pattern are larger than the above described minimum character size.

According to the invention shown in FIG. 8, the line extracting unit 31 extracts only the straight line from the image formed by a pattern written on the straight line. Thus, for example, only straight lines forming parts of character boxes and tables are extracted from images formed by characters written on lines of character boxes, tables, etc.

Then, the intersection calculating unit 32 calculates the intersection between the extracted line and the pattern. Thus, the coordinates of the intersection between the lines forming a character box, a table, etc. and the line forming part of the character can be calculated for the character written as touching or partially overlapping the lines forming the character box, table, etc.

Next, the virtual image extracting unit 33 assumes the image of the pattern partially overlaps the line according to the intersection information and extracts it as a virtual image. The virtual image includes, for example, virtual lines (virtual lines forming a character) connecting intersections.

The true image extracting unit 34 extracts a true image formed by the image of the pattern from the virtual image.

As a result, an object pattern can be correctly extracted (retrieved) from an image formed by various patterns such as a character, symbol, graphics, etc. partially overlapping a line forming a character box, a table, etc.

For example, even if a character touches or partially overlaps a line forming part of a character box, table, etc., or if a hand-written character overhangs on the ruled lines, the image of the character partially overlapping the lines forming part of the character box or table can be correctly extracted.

Figure 16:
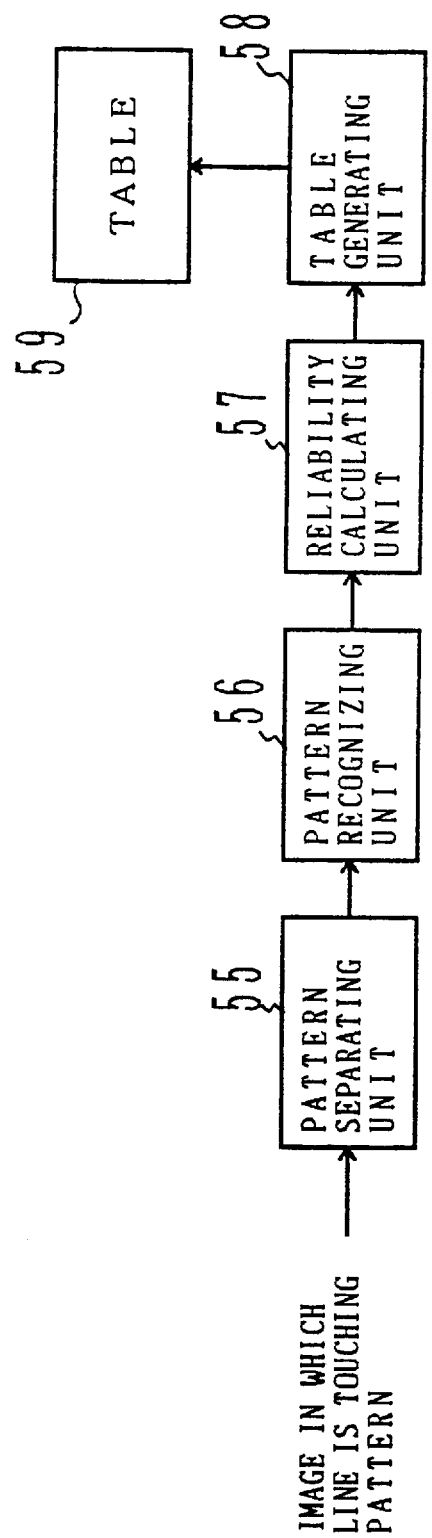
FIG. 16 shows the ninth principle of the present invention.

FIG. 16 is a block diagram showing the principle of another aspect of the present invention.

A pattern separating unit 55 separates only a pattern from an image formed by the pattern written as touching a line. The touching also refers to a character partially overlapping the line. The similar states can be considered for the following descriptions.

A pattern recognizing unit 56 recognizes a pattern extracted by the pattern separating unit 55.

A reliability calculating unit 57 calculates the reliability of a pattern recognized by the pattern recognizing unit 56 for each state of the pattern touching the line.

A table generating unit 58 generates a table 59 for storing the reliability data together with a set of patterns, that is, a pattern misrecognized by the pattern recognizing unit 56 and an expected pattern, for the line-pattern touching state with the reliability (calculated by the reliability calculating unit 57) smaller than a predetermined threshold.

According to the aspect shown in FIG. 16, the pattern separating unit 55 separates and extracts only the pattern from the image containing the pattern touching a line. The pattern recognizing unit 56 recognizes the pattern extracted by the pattern separating unit 55. The reliability calculating unit 57 calculates the reliability of the pattern recognized by the pattern recognizing unit 56 for each of the touching state between the line and the pattern. The table generating unit 58 generates the table 59 for storing the reliability together with a set of patterns, that is, a pattern misrecognized by the pattern recognizing unit 56 and an expected pattern for the line-pattern touching state with the reliability (calculated by the reliability calculating unit 57) smaller than a predetermined threshold.

Thus, the user can refer to the table 59 to check the reliability in recognizing pattern obtained by the pattern recognizing unit 56.

Figure 17:
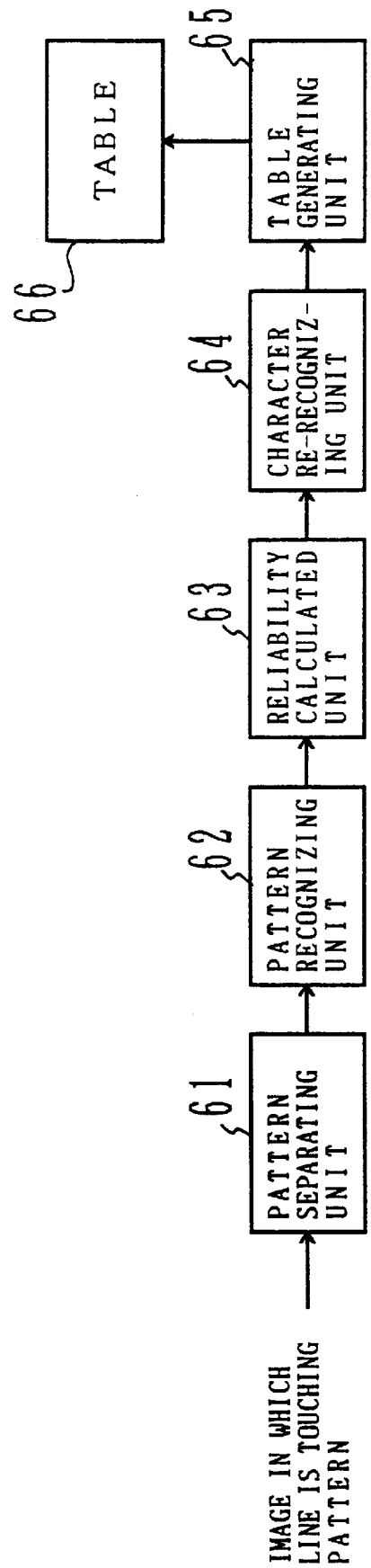
FIG. 17 shows the tenth principle of the present invention.

FIG. 17 is a block diagram showing the principle of another aspect of the present invention.

A pattern separating unit 61 separates only a pattern from an image formed by the pattern written as touching a line.

A pattern recognizing unit 62 recognizes a pattern extracted by the pattern separating unit 61.

A reliability calculating unit 63 calculates the reliability of a pattern recognized by the pattern recognizing unit 62 for each state of the pattern touching the line.

A character re-recognizing unit 64 learns a method of re-recognizing a character to improve the reliability in pattern recognition for the line-pattern touching state with the reliability (calculated by the reliability calculating unit 63) smaller than a predetermined threshold.

A table generating unit 65 generates a table 66 for storing a method of re-recognizing a character learned by the character re-recognizing unit 64 together with a set of patterns, that is, a pattern misrecognized by the pattern recognizing unit 62 and an expected pattern.

According to the aspect of the present invention shown in FIG. 17, the pattern separating unit 61 separates and extracts only a pattern from a line-pattern touching image, and then the pattern recognizing unit 62 recognizes the pattern extracted by the pattern separating unit 61.

Then, the reliability calculating unit 63 calculates the reliability of the pattern recognized by the pattern recognizing unit 62 for each of the line-pattern touching state. The character re-recognizing unit 64 learns the method of re-recognizing a character to improve the reliability in pattern recognition for the line-pattern touching state with the reliability (calculated by the reliability calculating unit 63) smaller than a predetermined threshold. Then, the table generating unit 65 generates a table 66 for storing a method of re-recognizing a character learned by the character re-recognizing unit 64 together with a set of patterns, that is, a pattern misrecognized by the pattern recognizing unit 62 and an expected pattern.

Therefore, the reliability of the pattern recognized by the pattern recognizing unit 62 can be referred to on the table 66.

Figure 18:
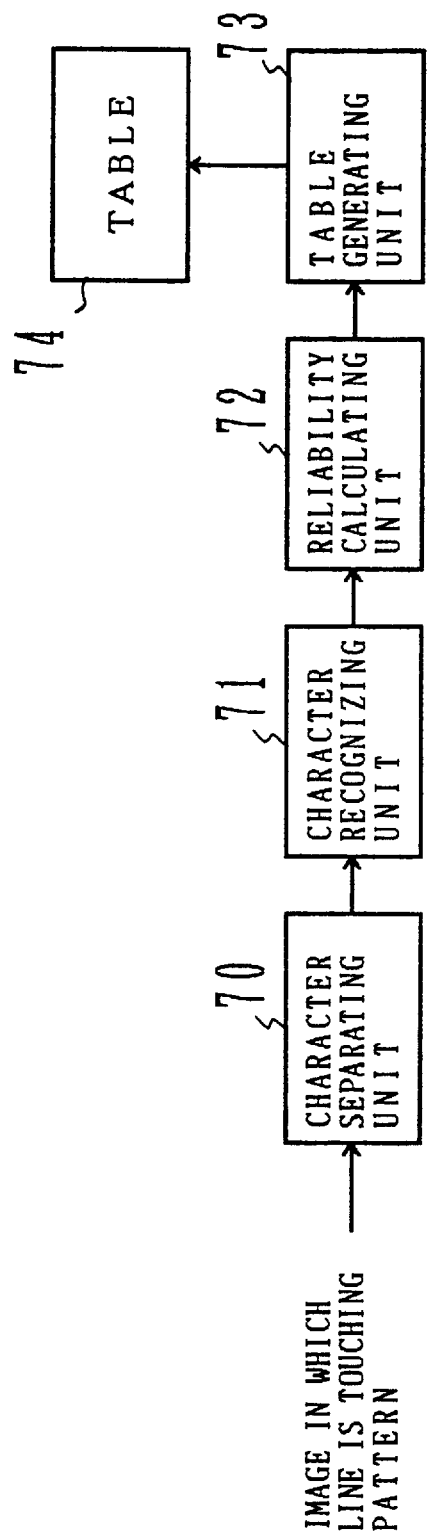
FIG. 18 shows the eleventh principle of the present invention.

FIG. 18 is a block diagram showing the principle of a further aspect of the present invention.

A character separating unit 70 separates and extracts only a character from an image containing the character as touching its character box or ruled line. The touching also refers to a character partially overlapping the line. The similar states can be considered for the following descriptions.

A character recognizing unit 71 recognizes the character extracted by the character separating unit 70.

A reliability calculating unit 72 calculates the reliability of the character recognized by the character recognizing unit 71 for each line-character touching state.

A table generating unit 73 generates a table 74 for storing the reliability data together with a set of characters, that is, a character misrecognized by the character recognizing unit 71 and an expected character, for the line-character touching state with the reliability (calculated by the reliability calculating unit 72) smaller than a predetermined threshold.

As a result, the user can generate a table 74 on which the reliability of the character recognized by the character separating unit 70 can be referred to.

Figure 19:
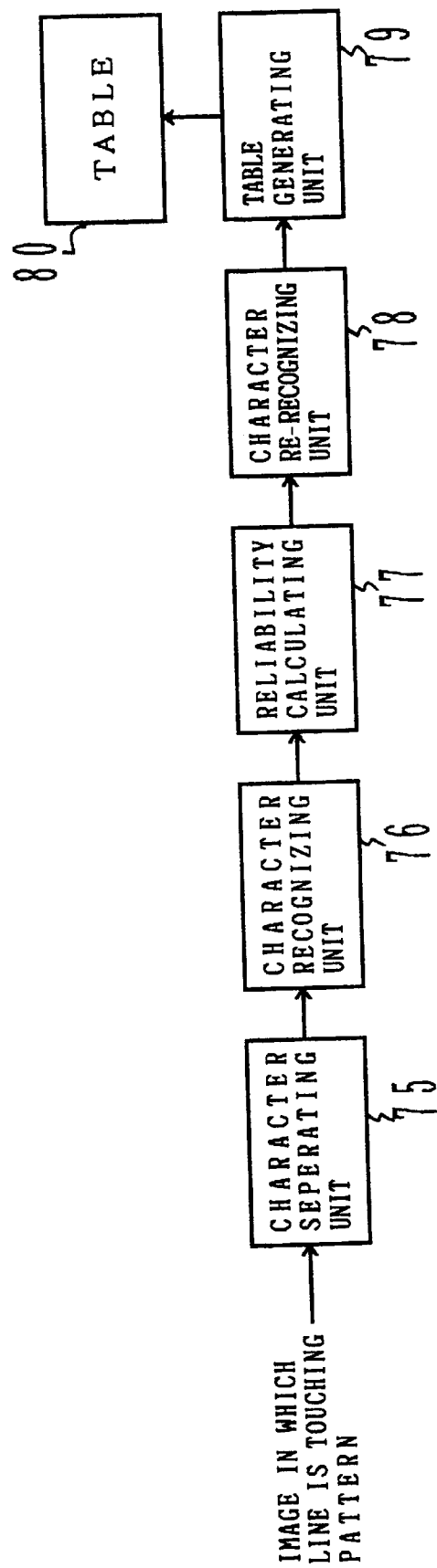
FIG. 19 shows the twelfth principle of the present invention.

FIG. 19 is a block diagram showing the principle of a further aspect of the present invention.

A character separating unit 75 separates and extracts only a character from an image containing the character as touching its character box or ruled line.

A character recognizing unit 76 recognizes the character extracted by the character separating unit 75.

A reliability calculating unit 77 calculates the reliability of the character recognized by the character recognizing unit 76 for each line-character touching state.

A character re-recognizing unit 78 learns a method of re-recognizing a character to improve the reliability in character recognition for the line-character touching state with the reliability (calculated by the reliability calculating unit 77) smaller than a predetermined threshold.

A table generating unit 79 generates a table 80 for storing a method of re-recognizing a character learned by the character re-recognizing unit 78 together with a set of patterns, that is, a pattern misrecognized by the pattern recognizing unit and an expected pattern.

The reliability calculating unit 77 comprises, for example, a line-touching character generating unit for generating various image patterns touching lines forming character boxes and tables and a reliability setting unit for checking the recognition rate of a character stored in the character recognizing unit 76 for the image pattern generated by the line-touching character generating unit.

The line-touching character generating unit generates the image pattern by superposing each character in various formats onto a predetermined line forming part of a character box, table, etc.

The line-touching character generating unit generates the image pattern by changing the size of each character.

Furthermore, the line-touching character generating unit generates the image pattern by changing each character in rotation degree around the center of its gravity.

Additionally, the line-touching character generating unit generates the image pattern by superposing a line forming part of a character box, table, etc. in various formats onto each character in a predetermined format.

Furthermore, the line-touching character generating unit generates the image pattern by changing the rotation degree, around the center of gravity, of a line forming part of a character box, table, etc.

The line-touching character generating unit also generates the image pattern by changing the thinness of the line forming part of a character box, table, etc.

The line-touching character generating unit further generates a line-touching character by changing the thinness of the line forming part of the character box, table, etc. depending on each position.

The line-touching character generating unit further generates the image pattern by superposing a line forming part of a character box, table, etc. in various formats onto each character in various formats.

Furthermore, the line-touching character generating unit generates the line-touching character by changing the relative position between the center of the gravity of a character and the center of the gravity of a line forming part of a character box, lines, etc.

According to the present invention shown in FIG. 19, the character separating unit 75 separates and extracts only a character from an image containing the character as touching its character box or ruled line. The character recognizing unit 76 recognizes the character extracted by the character separating unit 75. The reliability calculating unit 77 calculates the reliability of the character recognized by the character recognizing unit 76 for each line-character touching state. The character re-recognizing unit 78 learns a method of re-recognizing a character to improve the reliability in character recognition for the line-character touching state with the reliability (calculated by the reliability calculating unit 77) smaller than a predetermined threshold. The table generating unit 79 generates a table 80 for storing a method of re-recognizing a character learned by the character re-recognizing unit 78 together with a set of patterns, that is, a pattern misrecognized by the pattern recognizing unit and an expected pattern.

Thus, the user can generate the table 80 on which the reliability of the character recognized by the character separating unit 75 can be referred to.

Figure 20:
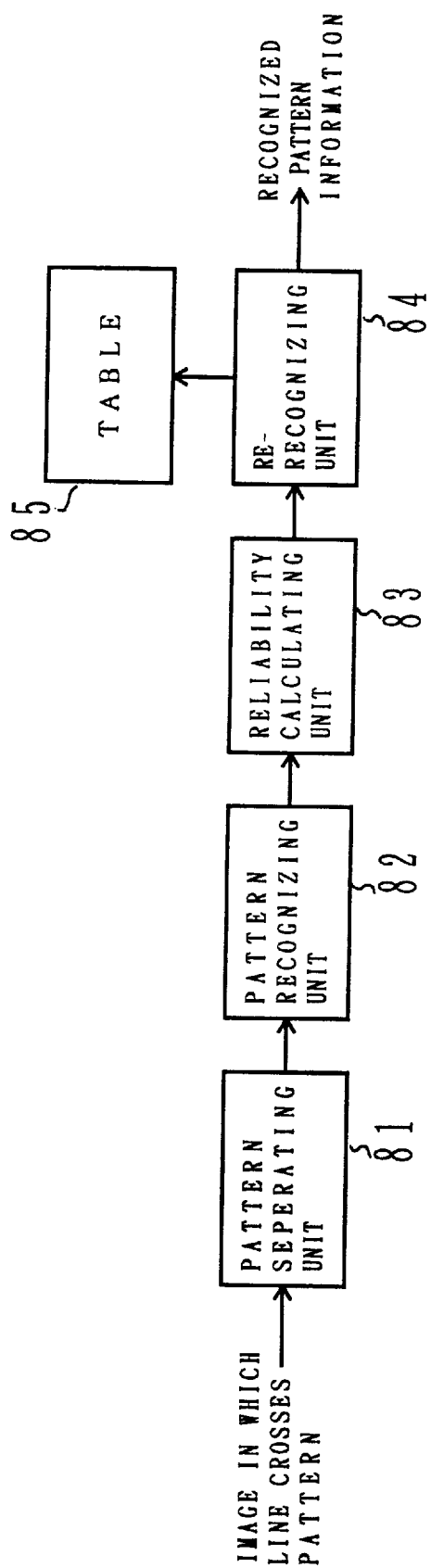
FIG. 20 shows the thirteenth principle of the present invention.

FIG. 20 is a block diagram showing the principle of another aspect of the present invention.

A pattern separating unit 81 separates only a pattern from an image formed by the pattern partially overlapping a line.

A pattern recognizing unit 82 recognizes a pattern extracted by the pattern separating unit 81.

A reliability calculating unit 83 calculates the reliability of a pattern recognized by the pattern recognizing unit 82 for each state of the pattern partially overlapping the line.

A re-recognizing unit 84 re-recognizes the pattern by a method different from that of the pattern recognizing unit 82 for the state of a pattern partially overlapping a line with the reliability (calculated by the reliability calculating unit 83) smaller than a predetermined threshold.

The another aspect of the present invention shown in FIG. 20 further comprises a table 85 containing, for the state of a pattern partially overlapping a line with the reliability (recognized by the pattern recognizing unit 82) smaller than a predetermined threshold, a pattern re-recognizing method to improve the reliability in pattern recognition. The re-recognizing unit 84 is designed to perform a re-recognition process by the re-recognizing method entered in the table 85.

The re-recognizing method entered in the table 85 is to recognize a pattern using a specific area of the pattern separated by the pattern separating unit 81.

The specific area of the pattern is a divided area of a rectangle encompassing the pattern.

According to the aspect of the present invention not comprising the table 85, the pattern separating unit 81 separates only a pattern from an image formed by the pattern partially overlapping a line. The pattern recognizing unit 82 recognizes a pattern extracted by the pattern separating unit 81. The reliability calculating unit 83 calculates the reliability of a pattern recognized by the pattern recognizing unit 82 for each state of the pattern partially overlapping the line. The re-recognizing unit 84 re-recognizes the pattern by a method different from that of the pattern recognizing unit 82 for the state of a pattern partially overlapping a line with the reliability (calculated by the reliability calculating unit 83) smaller than a predetermined threshold.

If the reliability value of the pattern recognized by the pattern separating unit 81 is smaller than a predetermined threshold, the pattern is re-recognized by another pattern recognizing method to enhance the recognition rate for the pattern.

According to a another aspect of the present invention comprising the table 85 shown in FIG. 20, the re-recognizing unit 84 refers to the table 85 containing, for the state of a pattern partially overlapping a line with the reliability (recognized by the pattern recognizing unit 82) smaller than a predetermined threshold, a pattern re-recognizing method to improve the reliability in pattern recognition, and re-recognizes a pattern having the reliability of the pattern recognized by the pattern recognizing unit 82 smaller than a predetermined threshold by the re-recognizing method entered in the table.

Thus, the pattern having the reliability of the pattern recognized by the pattern recognizing unit 82 smaller than a predetermined threshold can be recognized at a higher recognition rate.

Figure 21:
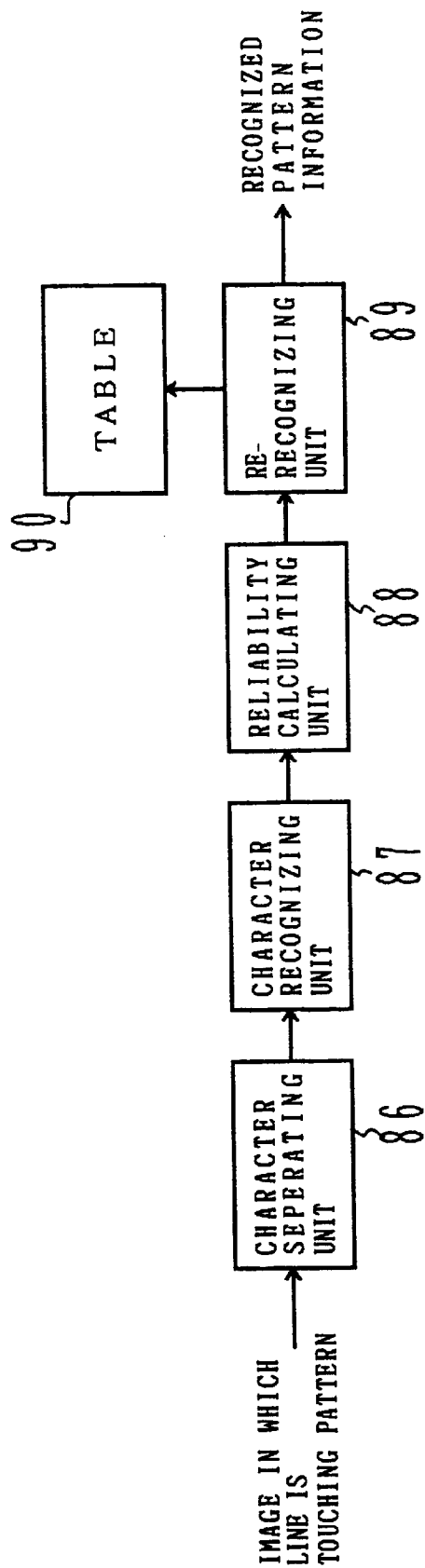
FIG. 21 shows the fourteenth principle of the present invention.

FIG. 21 is a block diagram showing the principle of another aspect of the present invention.

The first aspect of the present invention shown in FIG. 21 comprises the following units.

A character separating unit 86 separates and extracts only a character from an image containing the character as touching its character box or ruled line.

A character recognizing unit 87 recognizes the character extracted by the character separating unit 86.

A reliability calculating unit 88 calculates the reliability of the character recognized by the character recognizing unit 87 for each line-character touching state.

A character re-recognizing unit 89 re-recognizes a character by a method different from that of the character recognizing unit 87 for the line-character touching state with the reliability (calculated by the reliability calculating unit 88) smaller than a predetermined threshold.

The second aspect of the present invention shown in FIG. 21 comprises a table 90 containing, for the line-character touching state with the reliability (recognized by the character recognizing unit 87) smaller than a predetermined threshold, a character re-recognizing method to improve the reliability in character recognition. The re-recognizing unit 89 is designed to perform a re-recognition process by the re-recognizing method entered in the table 90.

The re-recognizing method entered in the table 90 is a method of re-recognizing a character using a specific area of the character separated by the character separating unit 86.

The specific area of the character is a divided area of a rectangle encompassing the character.

The third aspect of the present invention shown in FIG. 21 further comprises a table 90 containing, for the line-character touching state with the reliability (recognized by the character recognizing unit 87) smaller than a predetermined threshold, a set of characters, that is, a character misrecognized by the character recognizing unit 87 and an expected character, together with a character re-recognizing method to improve the reliability in line-touching character recognition. The re-recognizing unit 89 is configured so that characters can be re-recognized by the re-recognizing method entered in the table 90 if the character recognized by the character recognizing unit 87 is contained in the set of characters entered in the table 90.

The re-recognizing method entered in the table 90 is, for example, a method of re-recognizing a character using a specific area of the character separated by the character separating unit 87.

The specific area of the character is, for example, a divided rectangular area encompassing the character.

The fourth aspect of the present invention shown in FIG. 21 further comprises a table 90 containing, for the line-character touching state with the reliability (recognized by the character recognizing unit 87) smaller than a predetermined threshold, the reliability, a set of characters, that is, a character misrecognized by the character recognizing unit 87 and an expected character, and a character re-recognizing method to improve the reliability in line-touching character recognition. The re-recognizing unit 89 is configured so that characters can be re-recognized by the re-recognizing method entered in the table 90 if the character recognized by the character recognizing unit 87 is contained in the set of characters entered in the table 90, and if the reliability of the character recognized by the character recognizing unit 87 entered in the table 90 is smaller than a predetermined threshold.

The re-recognizing method entered in the table 90 is, for example, a method of re-recognizing a character using a specific area of the character separated by the character separating unit 87.

The specific area of the character is, for example, a divided rectangular area encompassing the character.

The fifth aspect of the present invention shown in FIG. 21 further comprises a table 90 containing, for the line-character touching state with the reliability (recognized by the character recognizing unit 87) smaller than a predetermined threshold, a parameter indicating the feature of the touching state, the reliability, a set of characters, that is, a character misrecognized by the character recognizing unit 87 and an expected character, and a character re-recognizing method to improve the reliability in line-touching character recognition. The re-recognizing unit 89 is configured so that characters can be re-recognized by the re-recognizing method entered in the table 90 if the parameter, indicating the feature of the line-character touching state, calculated by the re-recognizing unit 89 and the character recognized by the character recognizing unit 87 are contained in the set of characters entered in the table 90, and if the reliability of the character recognized by the character recognizing unit 87 entered in the table 90 is smaller than a predetermined threshold.

The re-recognizing method entered in the table 90 is, for example, a method of re-recognizing a character using a specific area of the character separated by the character separating unit 86.

The specific area of the character is, for example, a divided rectangular area encompassing the character.

According to the first aspect of the present invention, the character separating unit 86 separates and extracts only a character from an image containing the character as touching its character box or ruled line. The character recognizing unit 87 recognizes the character extracted by the character separating unit 86. The reliability calculating unit 88 calculates the reliability of the character recognized by the character recognizing unit 87 for each line-character touching state. The character re-recognizing unit 89 re-recognizes a character by a method different from that of the character recognizing unit 87 for the line-character touching state with the reliability (calculated by the reliability calculating unit 88) smaller than a predetermined threshold.

Therefore, a character recognized by the character recognizing unit 87 with the reliability smaller than a predetermined threshold can be recognized at an improved recognition rate.

According to the second aspect of the present invention shown in FIG. 21, the re-recognizing unit 89 refers to the table 90 containing, for the line-character touching state with the reliability (recognized by the character recognizing unit 87) smaller than a predetermined threshold, a character re-recognizing method to improve the reliability in character recognition. Thus, the re-recognizing unit 89 re-recognizes by the re-recognizing method entered in the table 90 the character recognized by the character recognizing unit 87 with the reliability smaller than a predetermined threshold.

Therefore, a character recognized by the character recognizing unit 87 with the reliability smaller than a predetermined threshold can be recognized at an improved recognition rate.

According to the third aspect of the present invention shown in FIG. 21, the re-recognizing unit 89 refers to the table 90 containing, for the line-character touching state with the reliability (recognized by the character recognizing unit 87) smaller than a predetermined threshold, a set of characters, that is, a character misrecognized by the character recognizing unit 87 and an expected character, together with a character re-recognizing method to improve the reliability in line-touching character recognition. The re-recognizing unit 89 is configured so that characters can be re-recognized by the re-recognizing method entered in the table 90 if the character recognized by the character recognizing unit 87 is contained in the set of characters entered in the table 90.

Therefore, a character recognized by the character recognizing unit 87 with the reliability smaller than a predetermined threshold can be recognized at an improved recognition rate.

According to the fourth aspect of the present invention shown in FIG. 21, the re-recognizing unit 89 refers to the table 90 containing, for the line-character touching state with the reliability (recognized by the character recognizing unit 87) smaller than a predetermined threshold, the reliability, a set of characters, that is, a character misrecognized by the character recognizing unit 87 and an expected character, and a character re-recognizing method to improve the reliability in line-touching character recognition. The re-recognizing unit 89 is configured so that characters can be re-recognized by the re-recognizing method entered in the table 90 if the character recognized by the character recognizing unit 87 is contained in the set of characters entered in the table 90, and if the reliability of the character recognized by the character recognizing unit 87 entered in the table 90 is smaller than a predetermined threshold.

Therefore, a character recognized by the character recognizing unit 87 with the reliability smaller than a predetermined threshold can be recognized at an improved recognition rate.

According to the fifth aspect of the present invention shown in FIG. 21, the re-recognizing unit 89 refers to the table 90 containing, for the line-character touching state with the reliability (recognized by the character recognizing unit 87) smaller than a predetermined threshold, a parameter indicating the feature of the touching state, the reliability, a set of characters, that is, a character misrecognized by the character recognizing unit 87 and an expected character, and a character re-recognizing method to improve the reliability in line-touching character recognition. The re-recognizing unit 89 is configured so that characters can be re-recognized by the re-recognizing method entered in the table 90 if the parameter, indicating the feature of the line-character touching state, and the character recognized by the character recognizing unit 87 are contained in the set of characters entered in the table 90, and if the reliability of the character recognized by the character recognizing unit 87 entered in the table 90 is smaller than a predetermined threshold.

Therefore, a character recognized by the character recognizing unit 87 with the reliability smaller than a predetermined threshold can be recognized at an improved recognition rate.

The embodiments of the present invention are described in detail by referring to the attached drawings.

Figure 23:
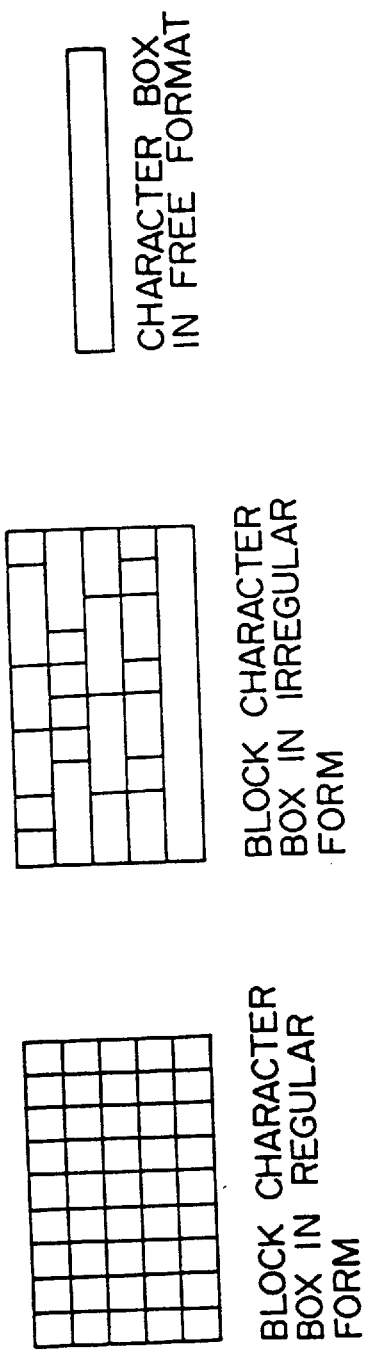
FIGS. 23A, 23B, and 23C show the format of each character box to be processed according to the present invention.

FIG. 22 is a block diagram showing the configuration of the image extracting device according to the first embodiment of the present invention. With the device, an input pattern to be processed by the device is a binary image preliminarily amended if it indicates an extreme obliqueness, rotation, etc. and processed in noise and low-spot removing processes. According to the present embodiment, black lines and boxes forming part of tables can be removed from line- or box-touching characters. That is, only the lines or character boxes can be removed even if characters are hand-written in a character box of unknown position and obliqueness and the characters are touching or partially overlapping the character box. The character box to be processed is, for example, a block-of-character box in a regular table format as shown in FIG. 23A, an irregular free-form block-of-character box as shown in FIG. 23B, a free-form character box shown in FIG. 23C.

A link pattern extracting unit 101 receives an input pattern preprocessed by amending the obliqueness and rotation as described above, removing noises, low-spots, etc. Since a labelling unit in the link pattern extracting unit 101 selects a candidate for a line-touching character regardless of the position of the character box, a link pattern connected at a point in any of the 8 directions (upward, downward, rightward, leftward, and diagonal directions) is extracted in a labeling process. The link pattern obtained according to the labels indicating the 8 links refers to (a) a character box not touching the character, (b) a character or a part of a character not touching the character box, or (c) a character touching a character box.

Since the size of the link pattern obtained in the labeling process is required in a later process, the link pattern is approximated as a rectangle in the labelling process and the coordinates of the corner of the rectangle are obtained and stored in the memory.

A character-box extracting unit 102 extracts a line corresponding to the character box from the link pattern extracted by the link pattern extracting unit 101. When the line (character box) is extracted, a bold line (character box) is first extracted to speed up the entire process. If no bold lines are extracted, a fine line (character box) is then extracted.

Figure 24:
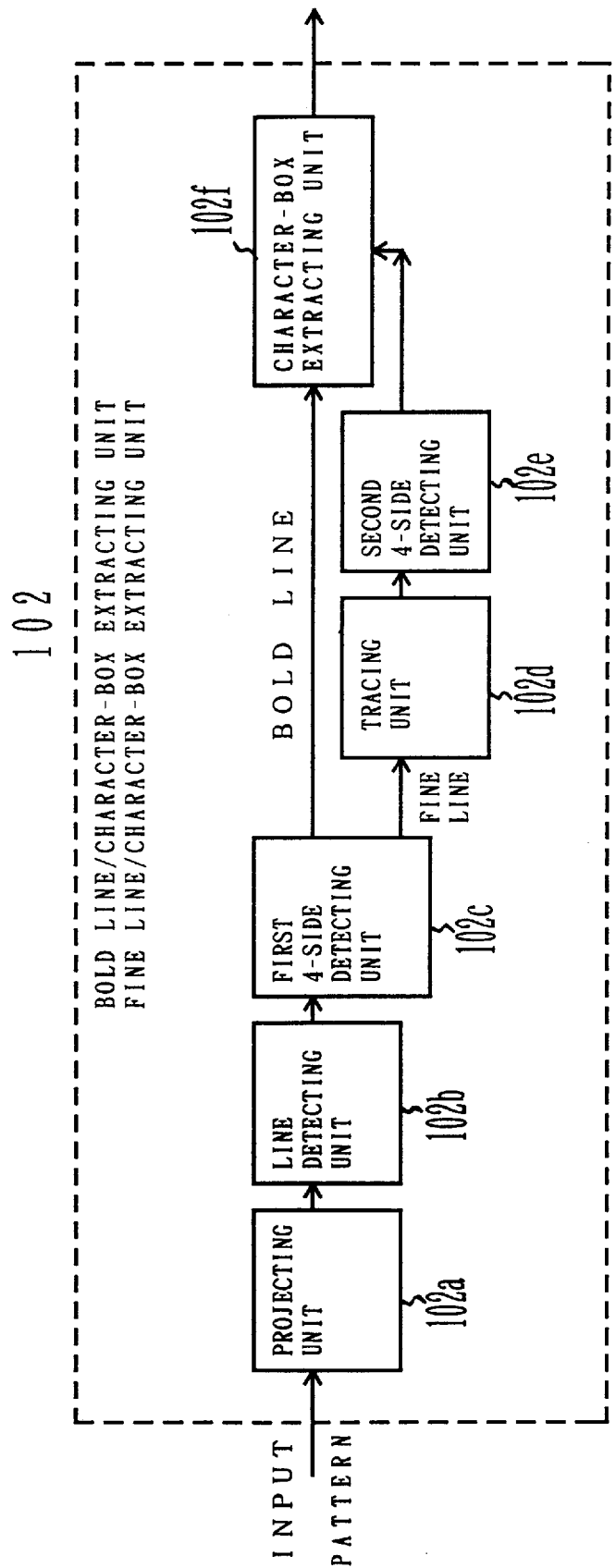
FIG. 24 is a block diagram showing the first embodiment of the character box extracting unit.

FIG. 24 is a block diagram showing an embodiment of the character-box extracting unit 102.

A projecting unit 102a projects vertically or horizontally a partial pattern extracted by the link pattern extracting unit 101. A line detecting unit 102b detects a horizontal or vertical line from the horizontal or vertical projection information obtained by the projecting unit 102a. A first 4-side detecting unit 102c detects 4 sides of the rectangle formed by the lines detected by the line detecting unit 102b. A tracing unit 102d traces the line by an n-line run length method described later to obtain a fine line not detected by the line detecting unit 102b or the first 4-side detecting unit 102c. A second 4-side detecting unit 102e detects 4 sides of the rectangle formed by the fine lines obtained by the tracing unit 102d. A character-box extracting unit 102f extracts a character box from the rectangle information obtained by 4-side detecting units 102c and 102e.

Described below is the operation of the character-box extracting unit 102 designed as described above.

(A) Extracting bold line and character box

Even if the size of a character box is unknown and a character is touching the character box, the character box should be correctly extracted. The projecting unit 102a projects each partial pattern obtained in a labeling process. The line detecting unit 102b calculates the ratio of the projection value to the size obtained through approximation from the partial pattern to a rectangle, and considers a line a longer side if the ratio is larger than a predetermined threshold.

Since the line can be a stroke of the character, not a line forming part of the character box, lines possibly forming the four sides of the outermost rectangle should be obtained.

Figure 25:
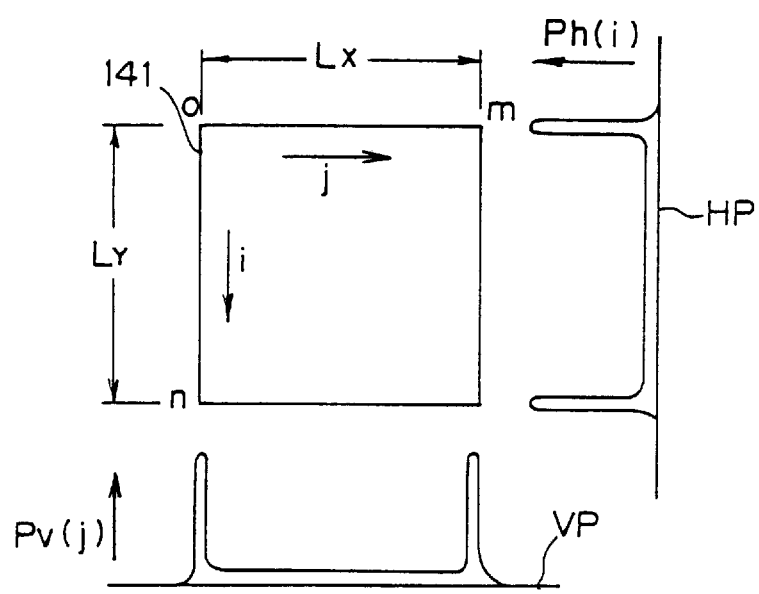
FIG. 25 shows the projection of the partial patterns obtained by the link pattern extracting unit in the labeling process in the horizontal and vertical directions.

FIG. 25 shows the projection in the horizontal and vertical directions of the partial pattern obtained by the labeling process of the link pattern extracting unit 101. In FIG. 25, a partial pattern 141 obtained by the labeling process is formed by the length of Lx and the width of Ly. The partial pattern has the projection VP in the vertical direction i and the projection Hp in the horizontal direction j. Assuming that, for convenience in the explanation, the size of the image is m columns×n rows, the density of the coordinates (i, j) in the flat coordinate system shown in FIG. 25 are f (i, j), the projection in the horizontal direction in line i is Ph (i), and that the projection in the vertical direction in column j is Pv (j), Ph (i) and Pv (j) can be represented by the following equations (1) and (2).

$$P_h(i) = \sum_{j=1}^{m} f(i, j) \quad (1)$$

$$P_v(j) = \sum_{i=1}^{n} f(i, j) \quad (2)$$

The line detecting unit 102b obtains the ratio of the length Lx to the projection Ph (i) in the horizontal direction by the following equation (3) based on the length Lx and width Ly of the rectangle having the rectangle coordinates of the partial pattern obtained by the link pattern extracting unit 101, also obtains the ratio of the width Ly to the projection Pv (j) in the vertical direction by the following equation (4), and compares the ratios with the threshold $TH_L$.

$$[P_h(i)/Lx] \geq TH_L \quad (3)$$

$$[P_v(j)/Ly] \geq TH_L \quad (4)$$

If the ratios obtained by the equations (3) and (4) are larger than the thresholds $TH_L$, then the partial pattern refers to a candidate for a line forming part of the character box. That is, if the extracted partial pattern can be a rectangle as shown in FIG. 25, then the horizontal projection value Ph (i) and the vertical projection value Pv (j) of the line indicate the maximum values and the ratio of the length Lx to the width Ly indicates a larger value. Thus, the line is considered to be a line forming part of the character box according to the equations (3) and (4).

Figure 26:
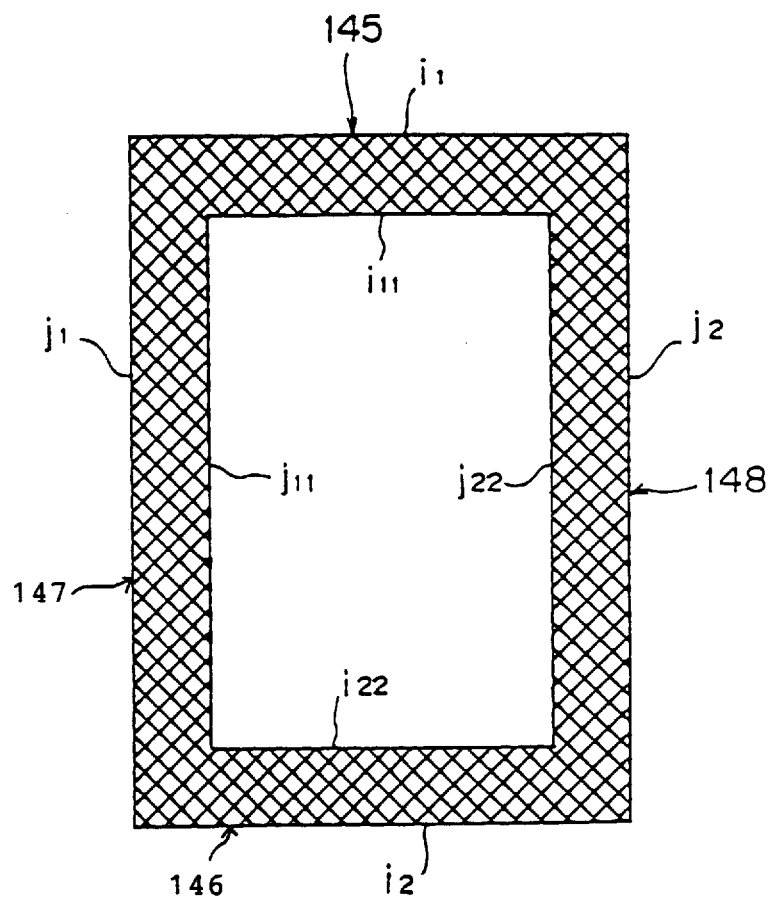
FIG. 26 shows the components of a character box.

FIG. 26 shows the components of a character box. A character box comprises an upper side 145, a lower side 146, a left side 147, and a right side 148. The upper side 145 comprises lines (straight lines) i1 and i11. The lower side 146 comprises lines i2 and i22. The left side 147 comprises lines j1 and j11. The right side 148 comprises lines j2 and j22. If the ratio of the projection to each size of a rectangle is larger than a predetermined threshold $TH_L$ when the length and width of the rectangle of the partial pattern obtained in the labeling process are Lx and Ly as shown in FIG. 25, the partial pattern can be a candidate for the line forming part of the character box.

Character box extracting unit 102f extracts a character box according to the detection result of the first 4-side detecting unit 102c. That is, when the first 4-side detecting unit 102c detects a line, a character box is extracted according to the line information. If no line is detected, another candidate is searched for to extract a character box.

After obtaining the line forming part of the character box as described above, calculations are made to find how many horizonal or vertical lines exist continuously from the obtained line. The resultant value is a reference value for the thinness of each side.

Figure 27A:
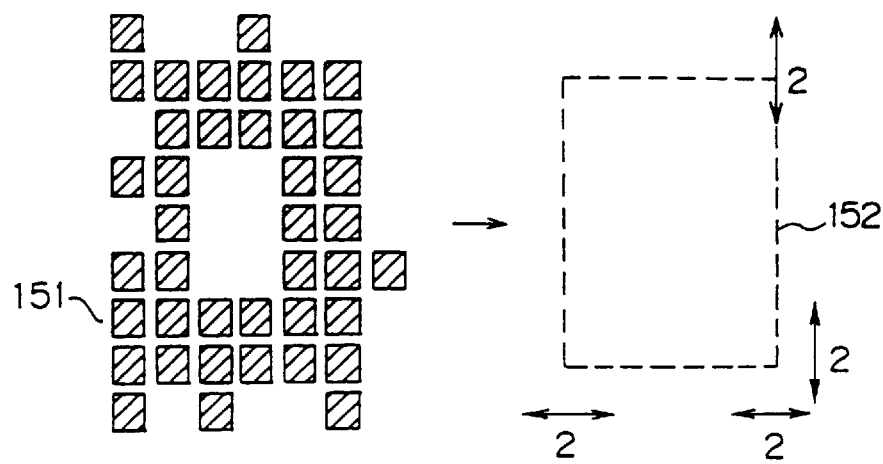
FIGS. 27A and 27B show examples of the character boxes in bold and fine line respectively.

FIG. 27A shows an example of the character box formed by bold lines extracted as described above. According to the example shown in FIG. 27A, a skeletal line 152 indicated by broken lines is obtained for the extracted character box 151. Two picture elements form the thinness of each side in this example.

(B) Extracting fine line/character box

A fine line/character box is extracted by checking the partial pattern not extracted in extracting a bold line/character box shown in FIG. 27A.

Figure 27B:
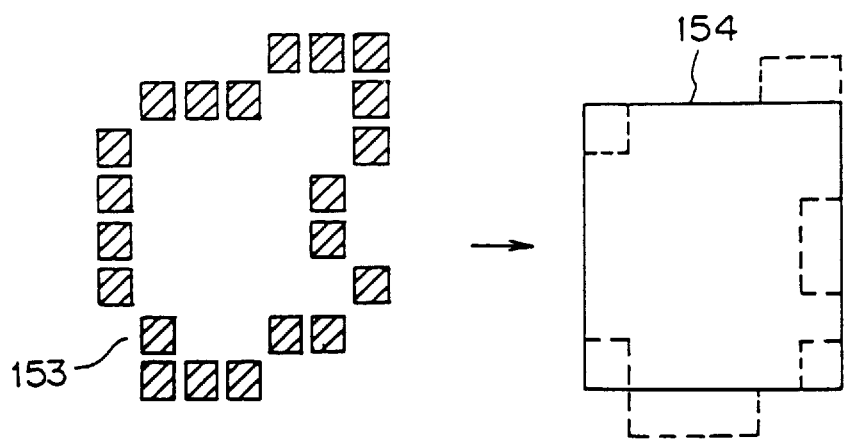

FIG. 27B shows an example of a fine-line character box 153 and its skeletal line 154. As shown in FIG. 27B, the fine-line character box contains a pattern which is formed by lines of the thinness of 1 picture element and is not straight but shows obliqueness. To correctly extract the fine-line character box shown in FIG. 27B, a character box is retrieved as follows according to the present embodiment.

That is, the n-line run length indicating the length of the line is defined to detect a line even if the line indicates obliqueness.

With a normal run length, the number of picture elements arranged horizontally or vertically is calculated. Therefore, a long straight line indicating the obliqueness as shown in FIG. 27B is divided into a number of short lines. With the n-line run length shown in FIG. 28, the 8-link run length for the n lines is calculated as the n-line run length. The value of n depends on the value of obliqueness. The larger the obliqueness is, the larger the value n becomes. When n=1, a normal run length is applied.

Figure 28:
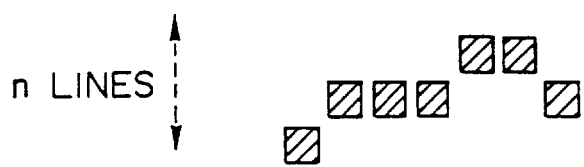
FIG. 28 shows the n-line run length.

The value n equals 3 in the example shown in FIG. 28. In this example, a line of seven picture elements can be extracted as a horizontal line.

Based on the above described n-line run length, the tracing unit 102d of the character-box extracting unit 102f searches for a line leftward, rightward, upward, or downward along a partial pattern from the start point on the partial pattern touching the vertical lines drawn within the character box from a plurality of points at both ends, center, etc. of the line forming part of the rectangle identified by the coordinates of the rectangle obtained by the labeling unit of the link pattern extracting unit 101.

In the above described method, a fine-line character box can be correctly obtained even if a character partially overlaps the character box.

The first 4-side detecting unit 102c defines Nhi for a candidate for the horizontal line and Nvj for a candidate for the vertical line. It obtains the ratio of the length Lx to the length Nhi of the candidate for the horizontal line by the following equation (5) based on the length Lx and width Ly of the rectangle having the rectangle coordinates of the partial pattern obtained by the labeling unit of the link pattern extracting unit 101, also obtains the ratio of the width Ly to the length Nvj of the candidate for the horizontal line by the following equation (6), and compares the ratios with the threshold $TH_L$.

$$[N_{hi}(i)/Lx] \geq TH_L \quad (5)$$

$$[N_{vj}(j)/Ly] \geq TH_L \quad (6)$$

If the ratios obtained by the equations (5) and (6) are larger than the thresholds $TH_L$, then each candidate for the horizontal and vertical lines refers to a candidate for a line forming part of the character box.

The first 4-side detecting unit 102c checks the candidates j1 and j2 for the horizontal lines i1 and i2 of the outermost rectangle of the candidates for the horizontal and vertical lines detected by the line detecting unit 102b, makes calculations by the following equations (7) and (8), and compares the results with the threshold $TH_L'$ $$|i1-i2|/Ly \geq TH_L' \quad (7)$$

$$|i1-i2|/Ly \geq TH_L' \quad (8)$$

The character-box extracting unit 102f extracts a character box according to the detection result from the first 4-side detecting unit 102c as described above. That is, is the first 4-side detecting unit 102c detects a line, a character box is extracted based on the line. If no lines are detected, then another candidate is searched for, and these processes are repeated to finally extract a character box. Practically, if the candidate meets the equations (7) and (8), the line is regarded as the line forming part of the character box. If the candidate does not meet them, another candidate is searched for, and these processes are repeated. The reference value of the thinness of the line is obtained as the difference between the maximum and minimum coordinates.

After obtaining one character box, the extracted character box is scanned for the entire image. The character boxes are matched with the partial pattern extracted by the link pattern extracting unit 101, thereby possibly extracting another character box.

It is also possible to extract a character box by calculating the ratio of the approximate rectangle of the partial pattern obtained by the link pattern extracting unit 101 to the extracted character box, limiting the partial patterns to those indicating the ratio within a predetermined threshold, and by matching with an extracted character box.

Furthermore, the partial patterns existing at the size of the extracted character box to the left. right, up, and down the character box. If it is determined that all extracted partial patterns are regarded as those containing only characters in an attribute adding unit 124d described later, then a unit for re-defining the extracted character box as a character pattern can also be provided. With such a unit, a character having a rectangle corresponding to the character box, for example, a chinese character "圖" which comprises a rectangle corresponding to a character box can be prevented from being mis-recognized for the part as a character box.

Figure 29:
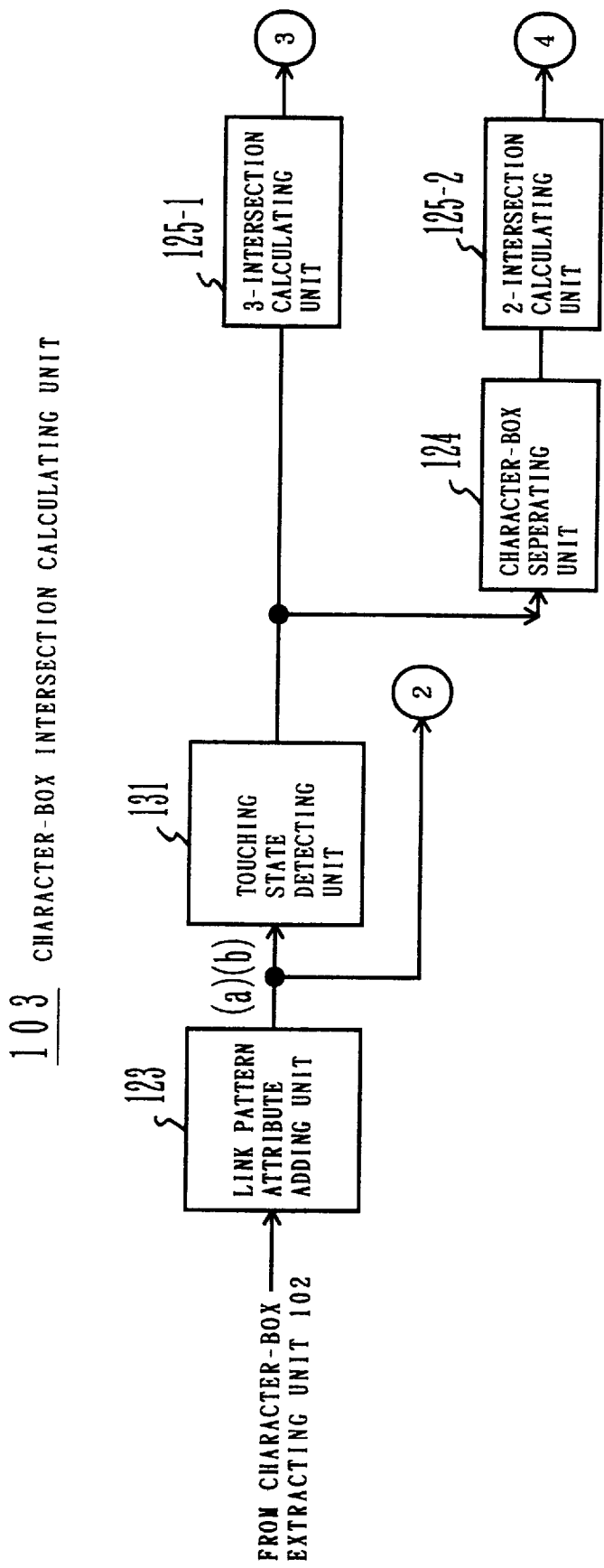
FIG. 29 shows an example of the configuration of the intersection calculating unit.

A character box intersection calculating unit 103 calculates the intersection of a character box with a character to be written in the character box. As shown in FIG. 29, the character box intersection calculating unit 103 comprises a link pattern attribute adding unit 123, a touching state detecting unit 131, a character box separating unit 124, a 2-intersection calculating unit 125-2, 3-intersection calculating unit 125-1, etc.

The link pattern attribute adding unit 123 adds any attribute of the "character box", "all or part of character pattern", or "touching state between character box and character pattern or part of it" (character-box touching pattern) to the link pattern extracted by the link pattern extracting unit 101 based on the extraction result from the character-box extracting unit 102.

For the link pattern assigned the "character-box touching pattern" which means "the touching pattern between a character and a character box", the touching state detecting unit 131 detects the touching state from the "thinness of character box and character" and "touching state between character and character box". That is, if the thinness of the character is larger than that of the character box and the character is lightly touching the character-box, then the touching state is "light". On the other hand, if the thinness of the character is the same as that of the character box or if the character is written considerably over the character box, it is determined that the touching state is "heavy". If the touching state is light, the character box separating unit 124 first separates the character box and the 2-intersection calculating unit 125-2 calculates the intersection of the character with its character box. If the touching state is heavy, then the 3-intersection calculating unit 125-1 calculates the intersection of the character with its character box.

The character can be correctly extracted from its character box after the 3-intersection calculating unit 125-1 have calculated 3 intersections. However, this process requires a longer process time. Therefore, only if the touching state between the character and the character box is complicated when the touching state is calculated, the three intersections are calculated by the 3-intersection calculating unit 125-1. Otherwise, the two intersections can be calculated by the 2-intersection calculating unit 125-2 to speed up the character-line extracting process, or the system can be configured without the 2-intersection calculating unit 125-2 or the 3-intersection calculating unit 125-1, but comprises either of them.

Figure 30:
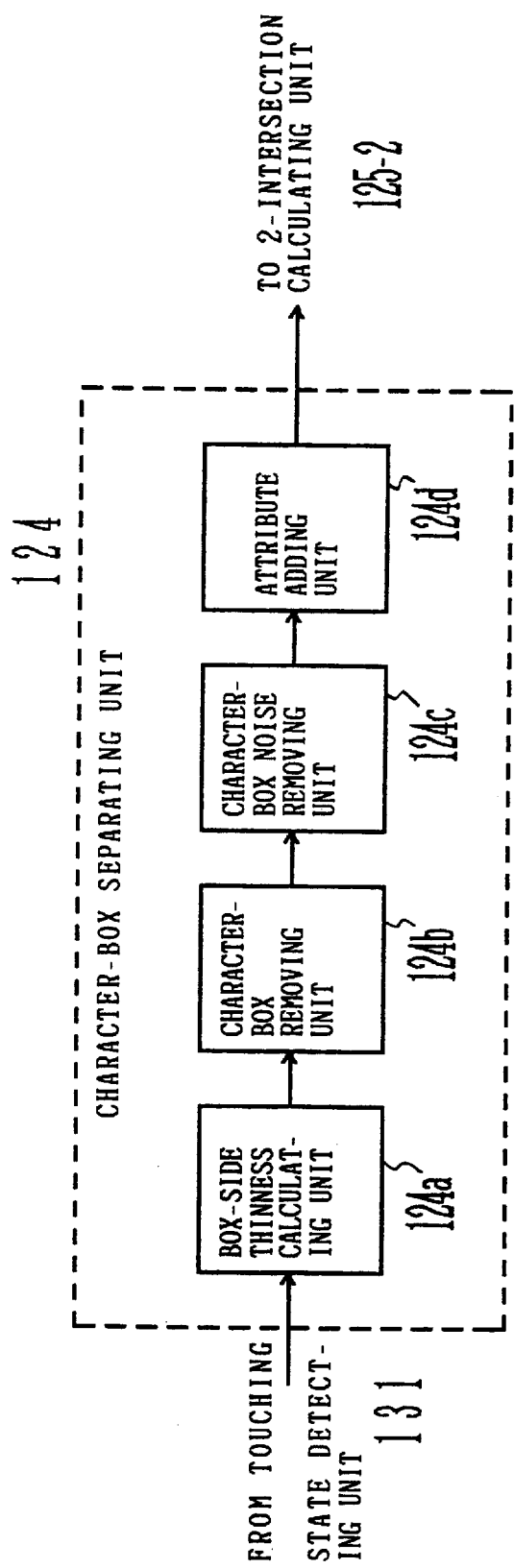
FIG. 30 shows an example of the configuration of the character box separating unit.

The character box separating unit 124 separates the character box from the link pattern assigned the attribute "character box" or "touching pattern between character and character box" (touching pattern) by the link pattern attribute adding unit 123. The character box separating unit 124 comprises a box-side thinness calculating unit 124a for calculating the thinness of the side of the character box, a character-box removing unit 124b for removing the character box, a character-box noise removing unit 124c for providing a label again for a character-box-removed pattern and removing the pattern of a small area as noises, and an attribute adding unit 124d, for example, as shown in FIG. 30. The above described attribute adding unit 124d adds the attribute "line-touching character pattern" to the pattern remaining even after removing the character box, and adds the attribute "character box" to the pattern indicating nothing after removing the character box.

(4) Separating a character box

The box-side thinness calculating unit 124a checks the smoothness of the outer and inner contours of the character box, obtains as the thinness of the line the sum of the reference value of the thinness of the line obtained when the character box is extracted and 2 (1 for the outer contour and 1 for the inner contour), and determines the coordinates of the outer and inner contours of the character box based on skeletal line calculated when the character box is extracted or the maximum/minimum position when the character box is extracted.

Figure 31A:
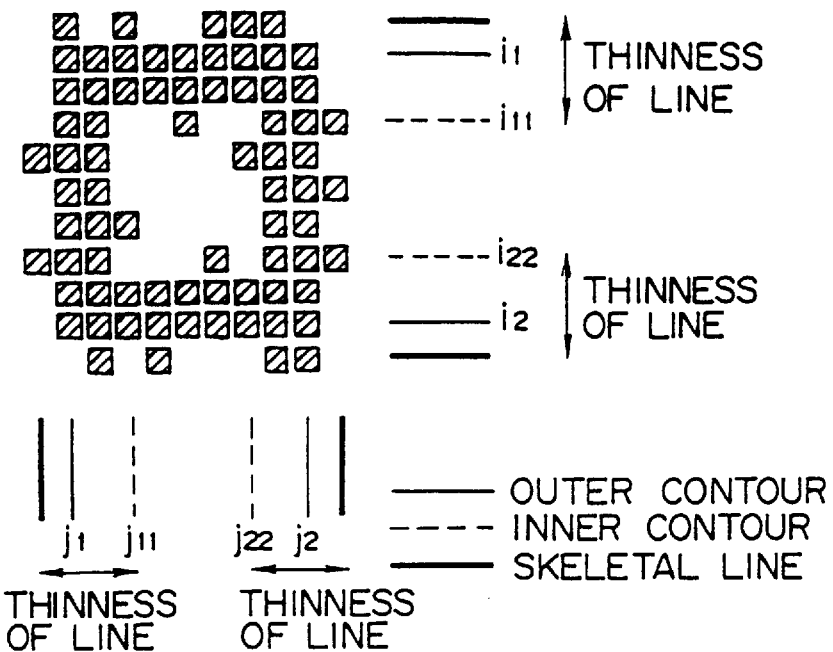
FIGS. 31A and 31B show a skeletal line, an outer border, an inner border, and the thinness of the line forming the character boxes in bold and fine lines.
Figure 31B:
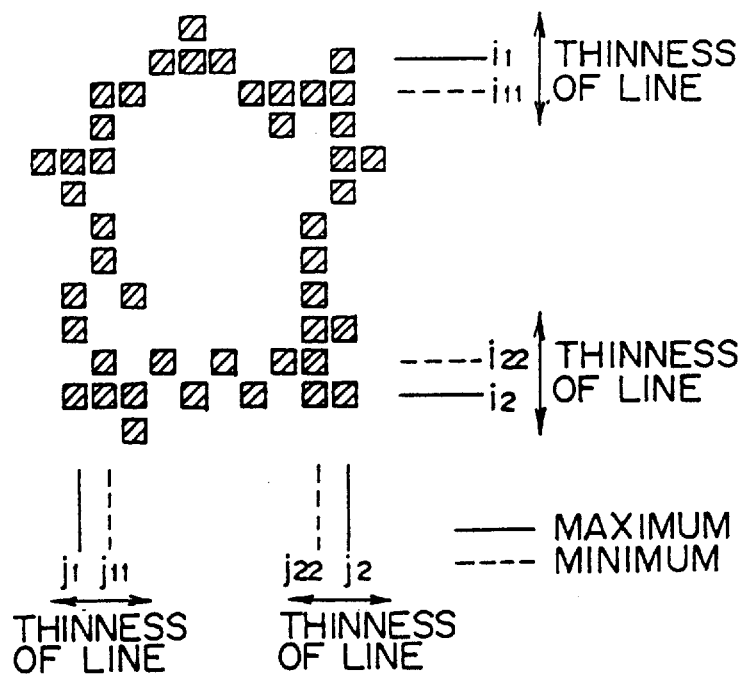
Figure 32:
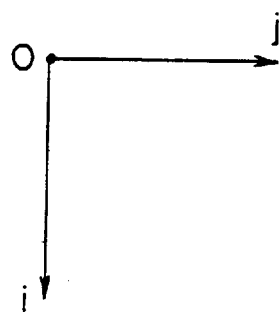
FIG. 32 shows the coordinate system according to the present embodiment.

FIGS. 31A and 31B show the skeletal line and outer and inner contours as the thin and thick lines of the character box. The thick line indicates an outer contour; the broken line indicates an inner contour; and the thin line indicates a skeletal line. FIG. 31A shows the thick-line character box. FIG. 31B shows the thin-line character box. The box-side thinness calculating unit 124a determines the coordinates of the outer and inner contours of the character boxes formed by thin and thick lines as shown in FIGS. 31A and 31B. In FIGS. 31A and 31B, the coordinate system is set as shown in FIG. 32.

The box-side thinness calculating unit 124a determines the coordinates of the upper character box (i1−1, i11+1) and the thinness of the sides is w1+2 +1if the coordinates of i of the outer and inner contours of the upper side of the character box are i1 and i11 and the thinness of the line is w1. The box-side thinness calculating unit 124a determines the coordinates of the lower side of the character box (i2+1, i22−1) and the thinness of the sides as w2+2 if the coordinates of i of the outer and inner contours of the lower side of the character box are i2 and i22 and the thinness of the line is w2. Likewise, the box-side thinness calculating unit 124a determines the coordinates of the left side of the character box (j1−1, j11+1) and the thinness of the sides is w3+2 if the coordinates of j of the outer and inner contours of the left side of the character box are j1 and j11 and the thinness of the line is w3. The box-side thinness calculating unit 124a determines the coordinates of the right side of the character box (j2+1, j22−1) and the thinness of the sides is w4+2 if the coordinates of j of the outer and inner contours of the right side of the character box are j2 and j22 and the thinness of the line is w4.

The character-box removing unit 124b removes the pattern of the character box existing between the outer and inner contours based on the coordinates of the outer and inner contours of the character box obtained by the box-side thinness calculating unit 124a.

The character-box noise removing unit 124c provides a label again for the pattern whose character box has been removed by the character-box removing unit 124b, extracts the feature of the pattern such as small area, etc. for each label, and removes a pattern remaining as a part of the character box according to the extraction information.

The attribute adding unit 124d checks the pattern not assigned an attribute by the link pattern attribute adding unit 123, and adds to a pattern, which still remains after removing the inner contour of the pattern, the attribute of the pattern indicating that the pattern refers to a line-touching pattern or a part of a character. It adds a pattern attribute indicating a character box to the pattern which disappears after removing the character box.

Then, it is determined whether a part of a line-touching character pattern or a character is integrated into a part of another line-touching character pattern or a character after interpolating the character parts in the character box as described later or it is defined as a single pattern.

Figure 33:
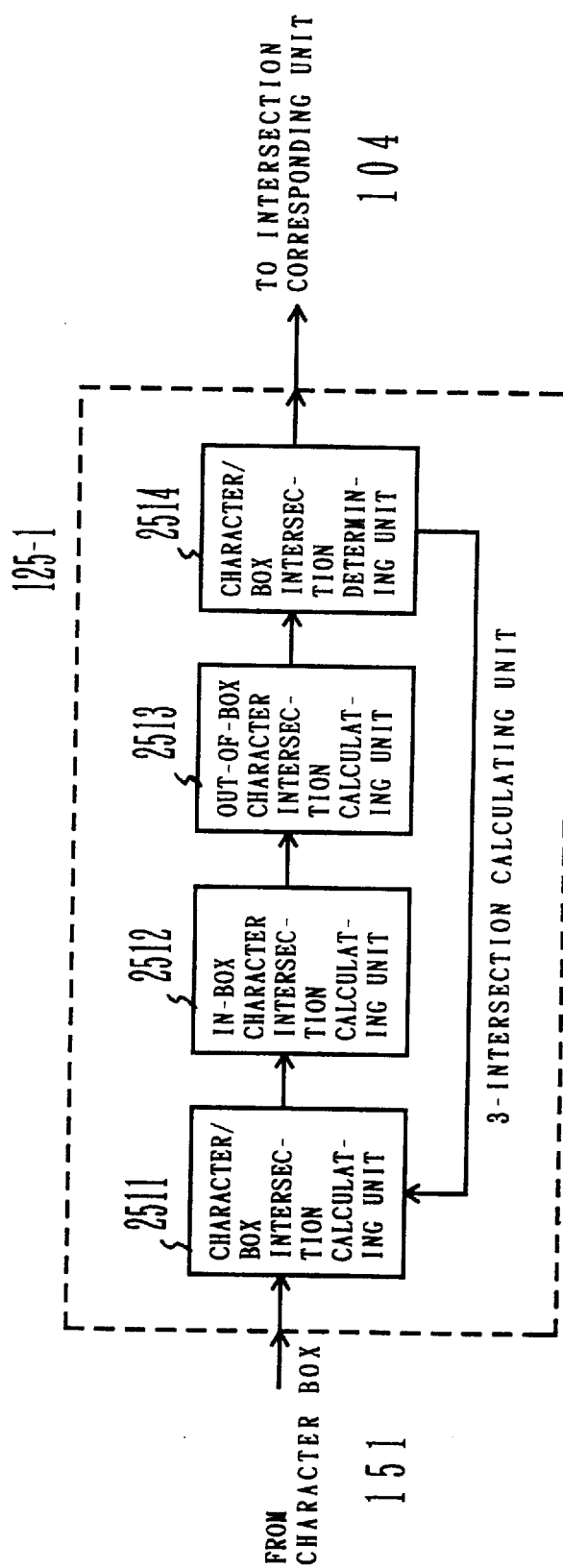
FIG. 33 shows an example of the configuration of the 3-intersection calculating unit.

FIG. 33 is a block diagram showing an example of the configuration of the 3-intersection calculating unit 125-1.

If the touching state is heavy and the character complicatedly touches the character box, then the intersection of the character box with the character is calculated by the 3-intersection calculating unit 125-1 without separating the character box.

A character/box intersection calculating unit 2511 calculates the intersection of a line-touching character pattern or a part of the character with its character box. That is, according to the information about the line forming part of the outer and inner contours of the character box obtained by the character box separating unit 124, the first line at one picture-element outside the outer contour of the character box and the second line at one picture-element inside the inner contour of the character box are obtained. At the intersections of the first and second lines with the line-touching character pattern or a part of the character, a point where the pattern turns from black to white or from white to black is obtained and extracted as an intersection (of the character with its character box). According to the present embodiment, an "intersection of the character with its character box" is represented as (x, y) using two points x and y, that is, the intersections of a character with a predetermined thinness of lines. The "x" and "y" are represented by (i, j) in the above described normal i-j coordinate system. That is, the intersection of the outer contour of the upper side with the character, the intersection of the inner contour of the upper side with the character, and similarly the intersections of the character with the outer and inner contours of the lower, left, and right sides of the character box are calculated.

An in-box character intersection calculating unit 2512 searches for a line forming part of a character in the inward direction, that is, the direction from the intersection of each character with its character box to center of the character box, and calculates the intersection in the character box to obtain the area of the line forming part of the character. However, if the line forming part of the character is broken in searching for the line, then it is determined that the calculated intersection is not the intersection of the character with the character box.

An out-of-box character intersection calculating unit 2513 searches by the thinness of the line forming the character box for a line forming part of a character in the outward direction, that is, the direction from the character box to the outside of the character box, and calculates the intersection outside the character box to obtain the area of the line forming part of the character. The outward direction is the direction from the character box to outside, and is opposite to the inward direction. The outside intersection refers to an intersection away from a character box. If the sum of the areas of the above described two lines forming part of the character is smaller than a predetermined value, then a character/box intersection determining unit 2514 determines the line forming the character as a noise, removes it, and determines that the intersection is not the intersection of the character with the character box.

Figure 34:
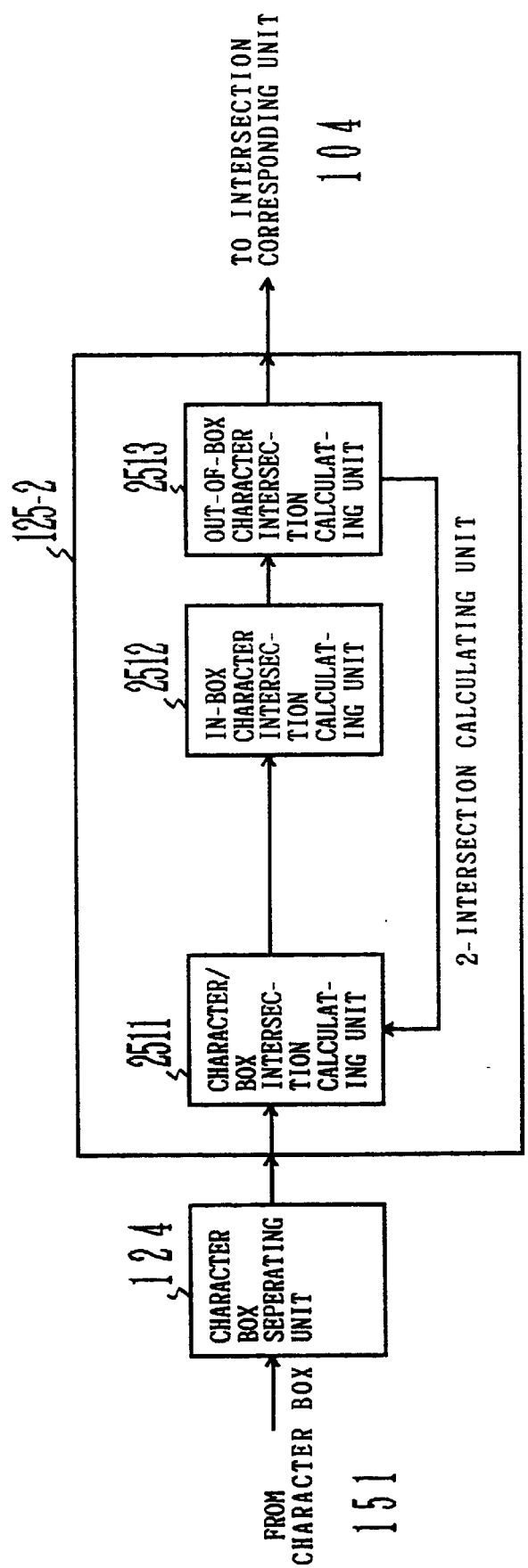
FIG. 34 shows an example of the configuration of the 2-intersection calculating unit.

FIG. 34 is a block diagram showing an embodiment of the 2-intersection calculating unit 125-2. The character/box intersection calculating unit 2511 calculates the intersection of the character box with the character in the above described line-touching character pattern. The out-of-box character intersection calculating unit 2513 searches by the thinness of the line forming the character box for a line forming part of a character in the outward direction, that is, the direction from the character box to the outside of the character box, and calculates the intersection outside the character box to obtain the area of the line forming part of the character.

If the area of the character line obtained by the in-box character intersection calculating unit 2512 is smaller than a predetermined threshold, then the out-of-box character intersection calculating unit 2513 determine that the character line is a noise and removes it, and that the intersection is not the intersection of the character with its character box.

Described below is the block diagram shown in FIG. 22.

An intersection corresponding unit 104 obtains the directional property of the line forming a line-touching character according to the intersection information obtained by the character box intersection calculating unit 103. Then, it obtains the distance $d_1$ between the two character lines touching both sides of the character box. Furthermore, the intersection corresponding unit 104 associates the intersections of the characters with their character box according to the above described directional property, the distance $d_1$ between the two character lines, and the condition for the continuity of the character lines based on their directions. The intersection corresponding unit 104 comprises, for example, a 3-intersection corresponding unit and a 2-intersection corresponding unit.

The 3-intersection corresponding unit obtains the directional property of a character line according to three types of intersection information "an intersection away from the character box", "an intersection of a character with its character box", and "an in-box intersection" obtained by the 3-intersection calculating unit 125-1. Furthermore, it associates the intersections of characters with the character box according to the above described directional property, the distance $d_1$ between the two character lines obtained from the intersection of the character line with the character box, and the condition for the continuity of the character lines based on their directions.

The 2-intersection corresponding unit obtains the directional property of a character line according to two types of intersection information "an intersection of a character with its character box" and "an out-of-character-box intersection" obtained by the 2-intersection calculating unit 125-2. Furthermore, it associates the intersections of characters with the character box according to the above described directional property, the distance between the character lines obtained by the out-of-character-box intersection, and the condition for the continuity of the character lines based on their directions. Then, it performs an interpolation process by connecting the associated intersections to reconstruct the character pattern separated from its character box by the character box separating unit 124. In the present embodiment, the interpolated character pattern is processed as a virtual character line.

The process performed by the 3-intersection corresponding unit is described further in detail.

The 3-intersection corresponding unit obtains the directional property of a character line according to three types of intersection information "an intersection away from the character box", "an intersection of a character with its character box", and "an in-box intersection". If it is determined that the directions of the character lines are the same, then the intersections of the characters with their character box are associated. Even if the directional properties do not match each other, the intersections of the characters with their character box are associated when the conditions relating to the distance between the intersections in the character box are met or the conditions relating to the continuity are met. Since the conditions are determined to associate the intersections in the character box, the intersections of characters with their character box can be correctly associated.

Figure 35:
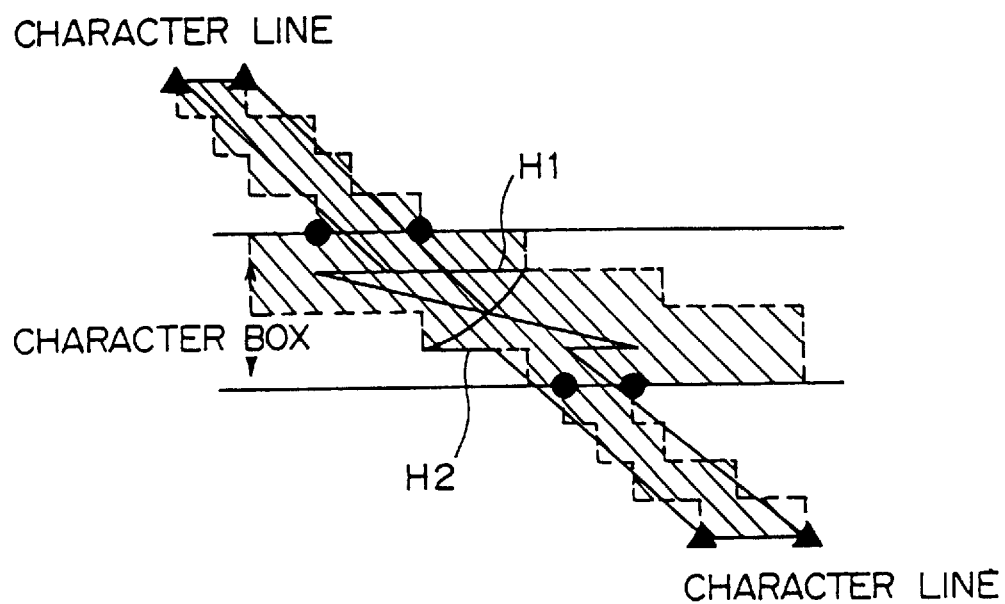
FIG. 35 shows the correspondences between the intersections of the characters with the character box when they indicate the identical direction.
Figure 36:
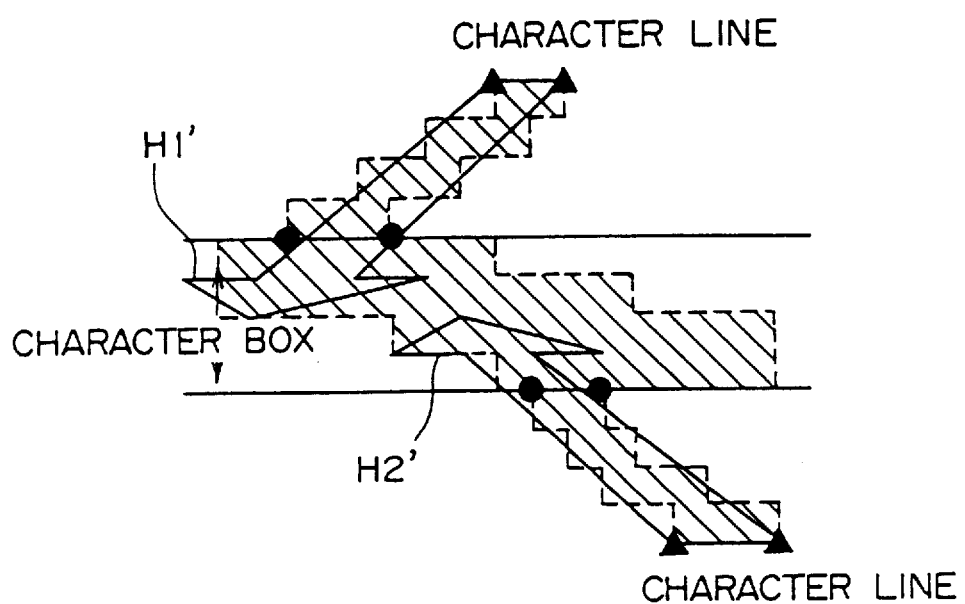
FIG. 36 shows the correspondences between the intersections of the characters with character box when they indicate different directions.

FIG. 35 shows the correspondence between the intersections of the characters with their character box when the directional properties match. In FIG. 35, the hatched portion indicates an image of black picture elements optically read from, for example, a table. The black dot indicates an intersection of a character box with a character. The black triangle indicates an intersection away from the character box. Arrows H1 and H2 indicate directional properties. FIG. 36 shows the correspondence between the intersections of the characters with their character box when the directional properties do not match. In FIG. 36, the hatched portion indicates an image of black picture elements optically read from, for example, a table. The black dot indicates an intersection of a character box with a character. The black triangle indicates an intersection away from the character box. Arrows H1' and H2' indicate directional properties.

In FIG. 35, it is determined that the virtual character line in the character box is in the diagonal direction. In FIG. 36, it is determined that the virtual character line in the character box has no directional property.

Figure 37:
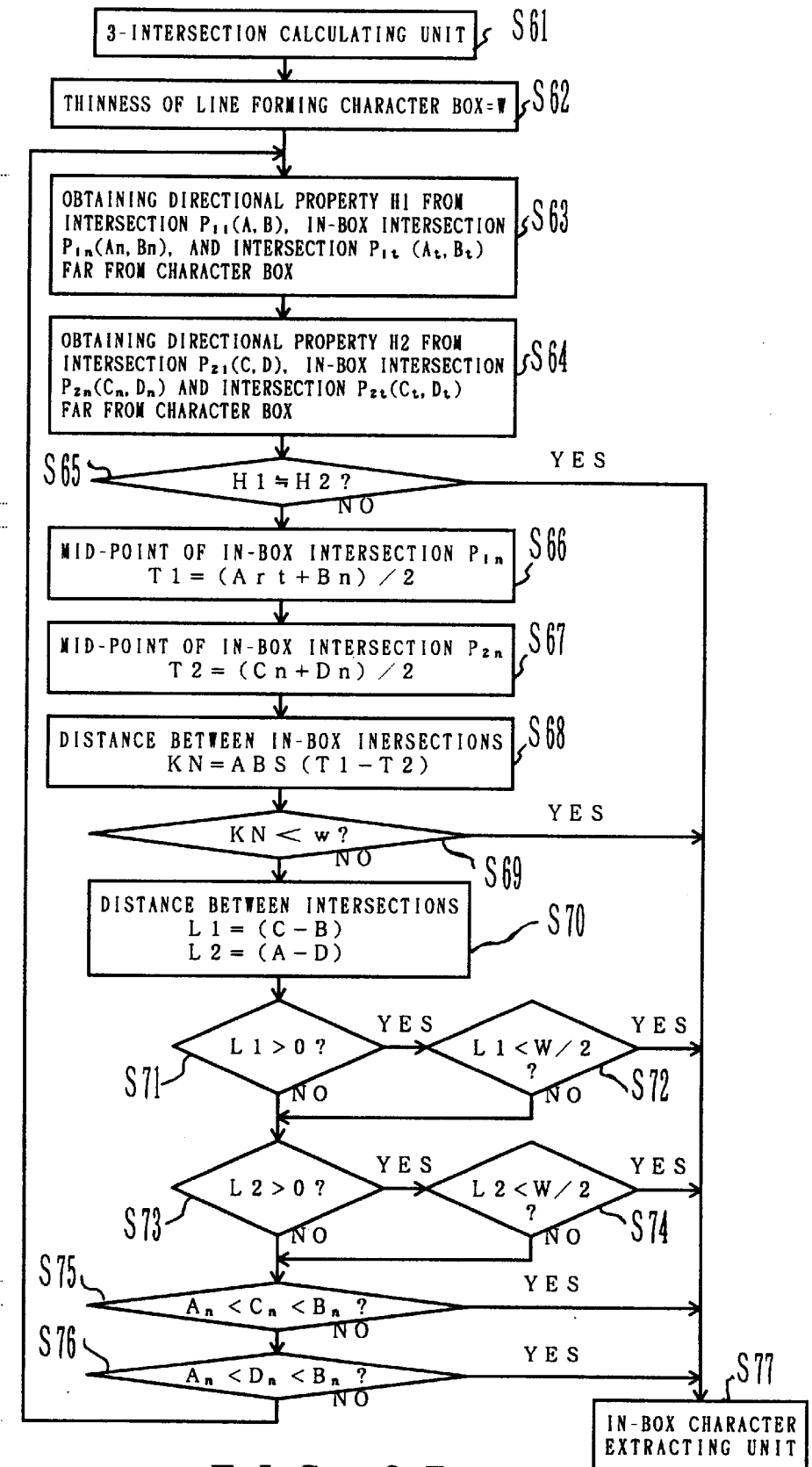
FIG. 37 is a flowchart showing in detail an example of the 3-intersection corresponding unit.

FIG. 37 is a flowchart showing in detail an embodiment of the process performs by the above described 3-intersection corresponding unit.

First, the 3-intersection corresponding unit receives the information about the intersections, etc. from the 3-intersection calculating unit 125-1 (step S61), and then sets the thinness of the line forming part of the character box (step S62). Then, the directional property H3 of one pattern (first pattern) of the character line outside the character box is obtained based on the intersection $P_{11}$ (A, B) of the character with the character box; the intersection $P_{1n}$ (An, Bn) in the character box; and the intersection $P_{1t}$ (At, Bt) away from the character box (step S63). The intersection $P_{11}$ (A, B) indicates that the leftmost coordinates of the intersection $P_{11}$ indicate A, and the rightmost coordinates indicate B. Similar information can be obtained for other intersections $P_{1n}$ and $P_{1t}$ as well as $P_{21}$, $P_{2n}$, and $P_{2t}$. Furthermore, the directional property $H_2$ of the other pattern (second pattern) of the character line outside the character box is obtained based on the intersection $P_{21}$ (C, D) of the character with the character box; the intersection $P_{2n}$ ($C_n$, $D_n$) in the character box; and the intersection $P_{2t}$ ($C_t$, $D_t$) away from the character box. Then, it is determined whether or not the above described directional property H1 can be regarded as the same as the directional property H2 (step S65). Thus, it is checked in steps S63 through S65 whether or not the directional properties of the two character line pattern outside the character box match each other.

If the determination result in step S65 is NO, then the mid-point T1 of the intersection $P_{1n}$ in the character box can be obtained by the equation $(A_n+B_n)/2$ (step S66). Then, the mid-point T2 of the intersection $P_{2n}$ in the character box can be obtained by the equation $(C_n+D_n)/2$ (step S67). Then, the distance KN between the intersections $P_{1n}$ and $P_{2n}$ in the character box is obtained from the ABS (T1−T2) (step S68). The ABS is the symbol indicating the absolute value of (T1−T2).

Then, it is determined whether or not KN is smaller than w (KN<w) (step S69). If the determination result in step S69 is NO, then the distances L1 and L2 between the leftmost and rightmost ends of the two intersections P11 and P21 can be obtained by the equations (C−B) and (A−D) (step S70). Then, it is determined whether or not the distance L1 is larger than 0 (step S71). If the determination result is YES in step S71, then it is determined whether or not L1 is smaller than w/2 (L1<w/2), that is, whether or not the distance L1 is smaller than the half of the thinness of the line forming part of the character box (step S72). If the determination result in step S71 or S72 is NO, then it is determined whether or not L2 is larger than 0 (L2>0), that is, the above described distance L2 is larger than 0 (step S73). If the determination result in step S73 is YES, then it is determined whether or not L2 is smaller than w/2 (L2<w/2). That is, it is determined whether or not the distance L2 is smaller than the half of the thinness of the character box w (step S74).

Thus, the relationship is determined between the thinness w of the character box and the distance KN between the two intersections P1n and P2n in the character box, and the distances L1 and L2 between the intersections P11 and P21 of the character box with the character line.

If the determination result in step S73 or S74 is NO, then it is determined whether or not An<Cn<Bn (step S75). If the determination result in step S75 is NO, then it is determined whether or not An<Dn<Bn (step S76). If the determination result in step S76 is NO, then control is returned to step S63.

Thus, in steps S75 and S76, it is checked whether or not the conditions for the continuity of lines are met for the two character lines outside the character box based on the position information A, B, C, and D of the intersections $P_{11}$ and $P_{21}$ of the character box with the character.

If the determination result in steps S65, S69, S72, S74, or S76 is YES, then control is passed to the process performed by an in-box character extracting unit 105 described later (step S77).

Since the 3-intersection corresponding unit determines the conditions for associating the intersections in the character box according to the process shown by the flowchart in FIG. 37, the intersections of the characters with the character box can be correctly associated as shown in, for example, FIGS. 38A, 38B, 38C, 39A, and 39B.

FIGS. 38A through 38C show the cases where the intersections are associated in the character box. The hatched portion indicates an image of black picture elements optically read from, for example, a table. The black dot indicates an intersection of a character box with a character. The black rectangle indicates an intersection in the character box. FIG. 38A shows an actual image pattern read from a table, etc. FIG. 38B shows that the intersections of characters with their character box are not associated, but, as shown in FIG. 38C, two intersections $P_{11}$ (A, B) and $P_{21}$ (C, D) of characters with their character box are associated with each other with the condition An<Cn<Bn met in step S75 on the flowchart shown in FIG. 37.

Figure 39B:
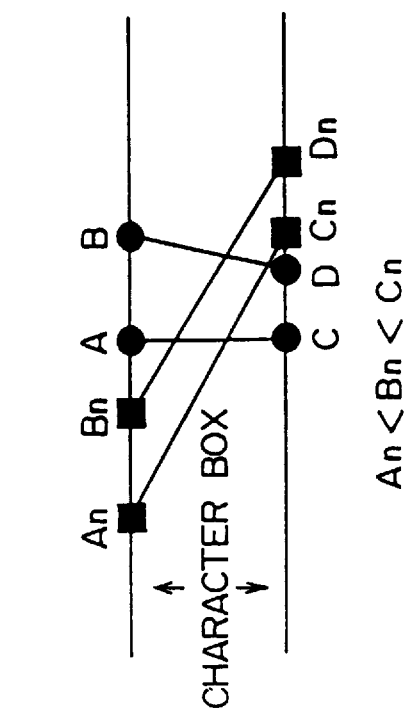
FIGS. 39A and 39B show examples in which the intersections in the line forming the character box do not correspond to the intersection of the character with the line forming the character box according to the flowchart shown in FIG. 38.
Figure 39A:
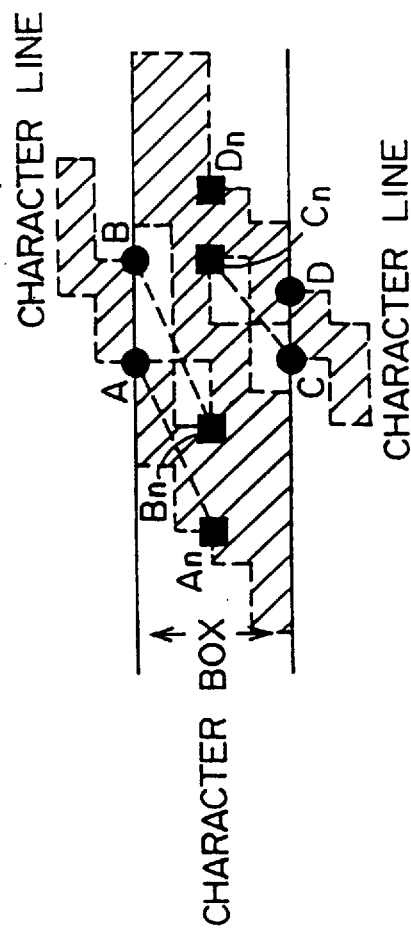

FIG. 39 shows the case where the intersections in the character box are not associated. The hatched portion indicates an image of black picture elements optically read from, for example, a table. The black dot indicates an intersection of a character box with a character. The black rectangle indicates an intersection in the character box. FIG. 39A shows an actual image pattern. FIG. 39B shows that, considering the positions of the two intersections $P_{1n}$ (An, Bn) and $P_{2n}$ (Cn, Dn) in the character box, the two intersections $P_{11}$ (A, B) and $P_{21}$ (C, D) of characters with their character box are not associated with each other. In FIGS. 38C and 39B, the intersections An, Bn, Cn, and Dn in the character box are mapped on the outer circumference of the character box for comprehensibility of the explanation in this specification.

Described below in detail is the operation of the 2-intersection corresponding unit.

The 2-intersection corresponding unit calculates the directional properties of the pattern of the 2 character lines written over the character box based on the coordinates of the intersections away from the character box and the intersections of the character with the character box. When the directions of the two character lines are approximately the same, it is determined that their directional properties are identical and the two intersections of the character with the character box are associated with each other. Even when the directional properties do not match, the two intersections of the character with the character box are associated if the conditions of the distance between the intersections of the character with the character box or the conditions for the continuity are met.

Figure 40:
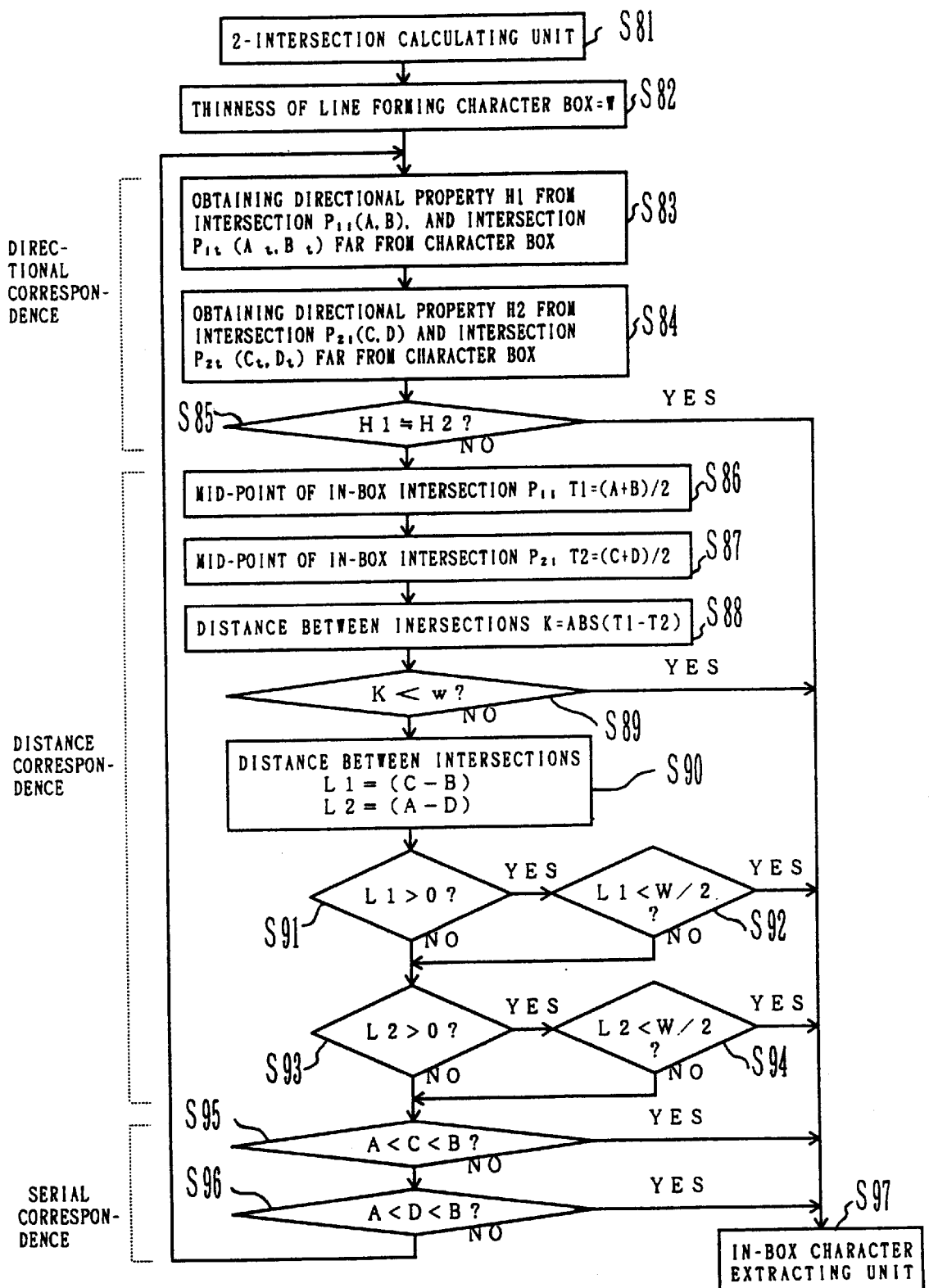
FIG. 40 is a flowchart showing in detail an example of the process performed by the 2-intersection corresponding unit.

FIG. 40 is a flowchart showing in detail an embodiment of the process performed by the 2-intersection corresponding unit. The intersections $P_{11}$ (A, B), $P_{1t}$ (A$_t$, B$_t$), $P_{21}$ (C, D), and $P_{2t}$ (C$_t$, D$_t$) are the same as those shown on the flowchart in FIG. 37.

First, the information about the intersections, etc. are received from the 2-intersection calculating unit 125-2 (step S81), and the thinness of the line forming the character box is set to w (step S82). Then, the directional property H1 of the pattern (first pattern) of one character-line outside the character box is obtained based on the intersection $P_{11}$ (A, B) of the character with the character box at one intersection point on the character box and based on the intersection $P_{1t}$ (A$_t$, B$_t$) corresponding to the intersection $P_{11}$ at the other intersection point on the character box (step S83). Then, the directional property H2 of the pattern (second pattern) of the other character-line outside the character box is obtained based on the intersection $P_{21}$ (C, D) of the character with the character box at one intersection point on the character box and based on the intersection $P_{2t}$ (C$_t$, D$_t$) corresponding to the intersection $P_{21}$ at the other intersection point on the character box (step S84). Then, it is determined whether or not the directional properties of H1 and H2 are identical (step S85). Thus, the correspondence between the directional properties of the patterns of the two character lines outside the character box can be determined in steps S83 through S85. If the determination result in step S85 is NO, then the coordinates (A+B) of the mid-point T1 of the intersection P11 of the character with the character box is divided by 2 ((A+B)/2) (step S86). Likewise, the coordinates (C+D) of the mid-point T2 of the intersection P22 of the character with the character box is divided by 2 ((C+D)/2) (step S87). Then, the ABS (T1−T2) of the distance K between the two intersections P11 and P22 is calculated (step S88). The ABS indicates the absolute value of (T1−T2).

It is determined whether or not K is smaller than w (K<w) (step S89). If the determination result in step S89 is NO, then the distances L1 and L2 between the right end and left end of the above described two intersections P11 and P21 are obtained by calculating (C−B) and (A−D) respectively. Then, it is determined whether or not L1 is larger than 0 (L1>0) (step S91). If the determination result in step S91 is YES, then it is determined whether or not L1<w/2 is true (step S92). If the determination result in step S91 or S92 is NO, then it is determined whether or not L2 is larger than 0 (L2>0) (step S93). If the determination result in step S93 is YES, then it is further determined whether or not L2<W/2 is true (step S94).

Thus, the difference between the thinness w of the character box and the distance K between the intersections P11 and P21 of the character and the character box, and the differences between the thinness w of the line forming the character box and the distances L1 and L2 between the right and left ends of the intersections P11 and P21 are determined.

If the determination result in step S93 or S94 is NO, it is determined whether or not A<C<B is true (step S95). If the determination result in step S95 is NO, it is further determined whether or not A<D<B is true (step S96). If the determination result in step S96 is NO, then control is returned to step S83.

Thus, it is checked in steps S95 and S96 whether or not the conditions for the continuity are met on the two corresponding character lines outside the character box according to the position information A, B, C, and D about the intersections P11 and P21 of the character with the character box.

If the determination results in step S85, S89, S92, S94, or S96 is YES, then control is passed to an in-box character interpolating unit 1051 in the in-box character extracting unit 105 (step S97).

Figure 41A:
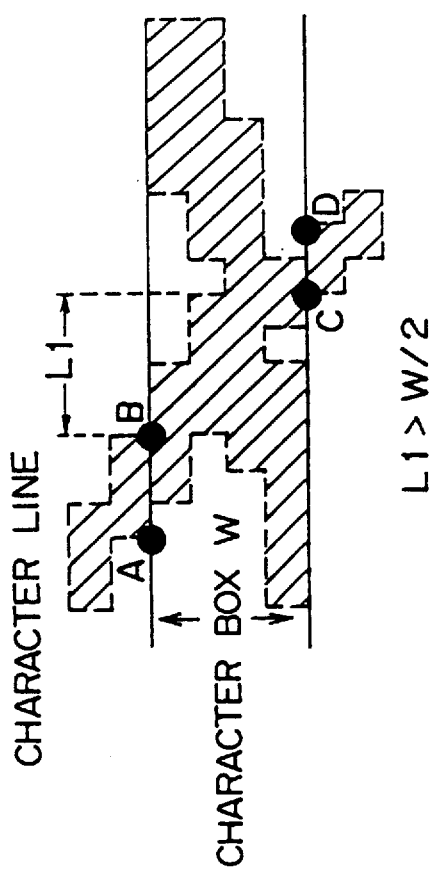
FIGS. 41A and 41B show examples of patterns extracted as a virtual line forming part of a character by the character-in-character-box extracting unit.
Figure 41B:
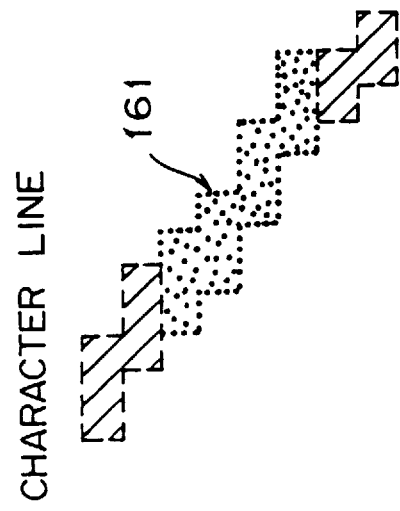

The in-box character extracting unit 105 shown in FIG. 22 determines that the image in the character box identified by the intersections associated by the intersection corresponding unit 104 refers to a character component. The character component is extracted, and the others are recognized as images forming the character box and removed. Thus, in the case of the pattern shown in FIG. 41A, a character component 161 indicated by dots is provisionally extracted as a virtual character component as shown in FIG. 41B. In FIGS. 41A and 41B, the hatched portion indicates an image of black picture elements optically read from, for example, a table. The black dot indicates an intersection of a character box with a character.

FIG. 42 is a flowchart showing in detail an embodiment of the process performed by the in-box character extracting unit 105.

The in-box character extracting unit 105 receives the information about the intersection, etc. associated as described above by the 3-intersection corresponding unit (step S101), and calculates the lines L1 and L2 passing the associated intersections P11 (A, B) and P21 (C, D) according to the received information (step S102). Then, it calculates the line L3 forming part of the outer circumference of the character box having the intersection P11 (step S103), and calculates the line L4 forming part of the other outer circumference of the character box having the intersection P21 (step S104). It is determined whether or not there is a portion of black picture elements in the character box encompassed by the 4 lines L1, L2, L3, and L4 (step S105). If the determination result in step S105 is YES, that is, if the corresponding black picture elements exist, then the black picture elements are extracted as virtual character lines (step S106), and control is passed to the character string extracting process (step S108). On the other hand, if the determination result in step S105 is NO, then the character box is removed (step S107) and control is passed to step S108.

Described below is the in-box character interpolating unit 1051 in the in-box character extracting unit 105. The in-box character interpolating unit 1051 is provided corresponding to the above described 2-intersection corresponding unit. It smoothly connects the intersections of the line-touching character pattern or a part of it for both cases where the intersections are associated one to one and they are associated one to multiples in order to interpolate the character portion lost when the character box is removed. In the present embodiment, the interpolated character line is referred to as a virtual character line.

FIG. 43 is a block diagram showing an embodiment of the in-box character interpolating unit 1051. A simple interpolating unit 1051a shown in FIG. 43 smoothly connects the intersections of the one-to-one-correspondence line-touching character pattern or a part of it to generate a virtual character line. If one-to-one interpolation is made, then the direction vector is calculated for the contour of the character line between intersections. A straight line is drawn from each intersection according to the direction vector. The character lines are connected at the intersections between the lines. To save the direction vector calculation process, the associated intersections can be connected for interpolation.

Figure 44A:
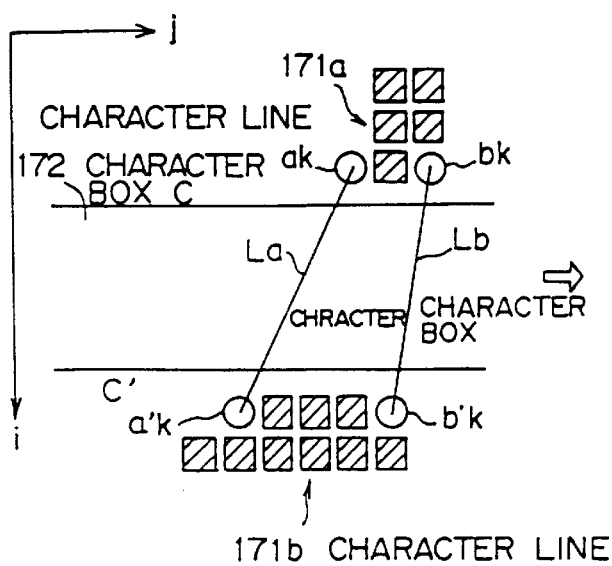
FIGS. 44A and 44B show examples of one-to-one simple interpolation.
Figure 44B:
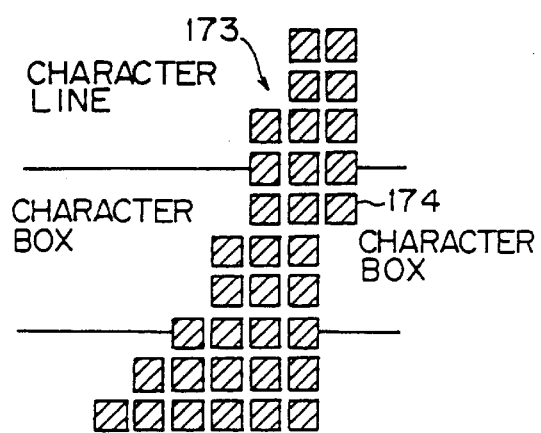

FIGS. 44A and 44B show examples of one-to-one simple interpolation. FIG. 44A shows character lines 171a and 171b and a character box 172. FIG. 44B shows an interpolated character line 173. In this example, the corresponding intersections are connected for interpolation. As shown in FIGS. 44A and 44B, a picture element ak at the left most point of the intersection of the character line 171a with the character box 172, the picture element a'k at the leftmost point of the contact of the character line 171b with the character box 172, the picture element bk at the rightmost point of the intersection of the character line 171a and the character box 172, and the picture element b'k at the rightmost point of the intersection of the character line 171b with the character box 172 are connected via the two lines La and Lb. The area encompassed by the two lines La and Lb in the character box 172 is filled with a plurality of black picture elements 174 as shown by the hatched rectangle in FIG. 44B so that the two character lines 171a and 171b are interpolated to obtain the interpolated character line 173. According to the present embodiment, the portion of the interpolated character line 173 filled with the black picture elements 174 in the character box 172 is provisionally referred to as a virtual character line.

Figure 45:
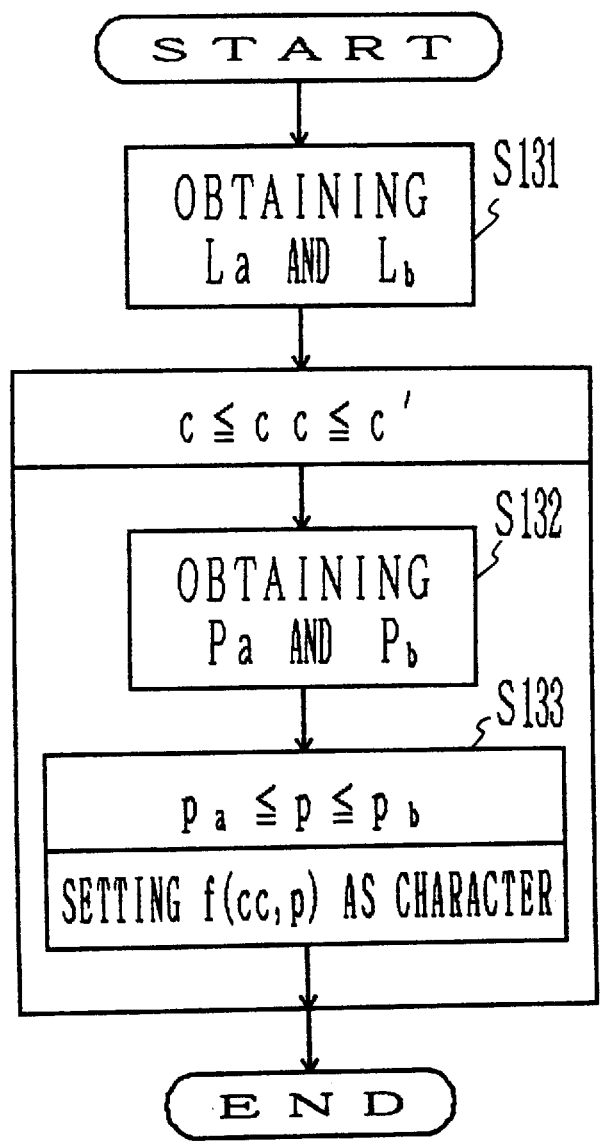
FIG. 45 is a flowchart showing in detail an example of the process performed by the simply-interpolating unit.

FIG. 45 is a flowchart showing in detail an embodiment of the process performed by the simple interpolating unit 1051a.

The examples shown in FIGS. 44A and 44B are described below for comprehensibility. In FIGS. 44A and 44B, f (cc, p) indicates coordinates of the black picture element generated by the interpolation. The values (cc, p) indicate the position of the black picture elements. The cc is a value of the i axis and p is a value of the j axis. (refer to FIG. 44A).

In FIG. 44A, the line La connecting the two picture elements ak with a'k and the line lb connecting the two picture elements bk with b'k are obtained (step S131). Then, in FIG. 44A, i coordinates of the points one picture element each downward from the line forming the character box 172 for the character lines 171a and 171b respectively are obtained as c and c' so that the processes in steps S132 and S133 are performed on all i coordinates in the range of $c \leq cc \leq c'$. That is, the j coordinates pa and pb are obtained as the intersections of the line i=cc in the character box 172 with the lines La and Lb (step S132). Then, the black picture element f (cc, p) at the position (cc, p) of the picture element is generated for every coordinate value p meeting the above described condition while changing the variable p indicating the value in the j direction in the range of $pa \leq p \leq pb$. The pattern is set on the virtual character line formed by the black picture element f (cc, p) (step S133).

Thus, the processes in step S132 and S133 are repeated while the values of cc are changed in the range of $c \leq cc \leq c'$. Finally, all black picture elements f (cc, p) satisfying the conditions of i coordinate in the range of $c \leq cc \leq c'$ and j coordinate in the range of $pa \leq p \leq pb$ are generated as picture elements forming the virtual character line.

In the one-to-multiple intersection interpolating process, an crosspoint calculating unit 1051b calculates the direction vector of the contour of each character line, draws a line from the contact of the character box with each character line according to the direction vector, and obtains the intersection of the lines. To save the process of calculating the direction vector, the direction vector can be replaced with the line connecting the associated intersections.

After the crosspoint calculating unit 1051b calculates the intersection as described above, an in-box crosspoint interpolating unit 1051c interpolates the elements.

Figure 46A:
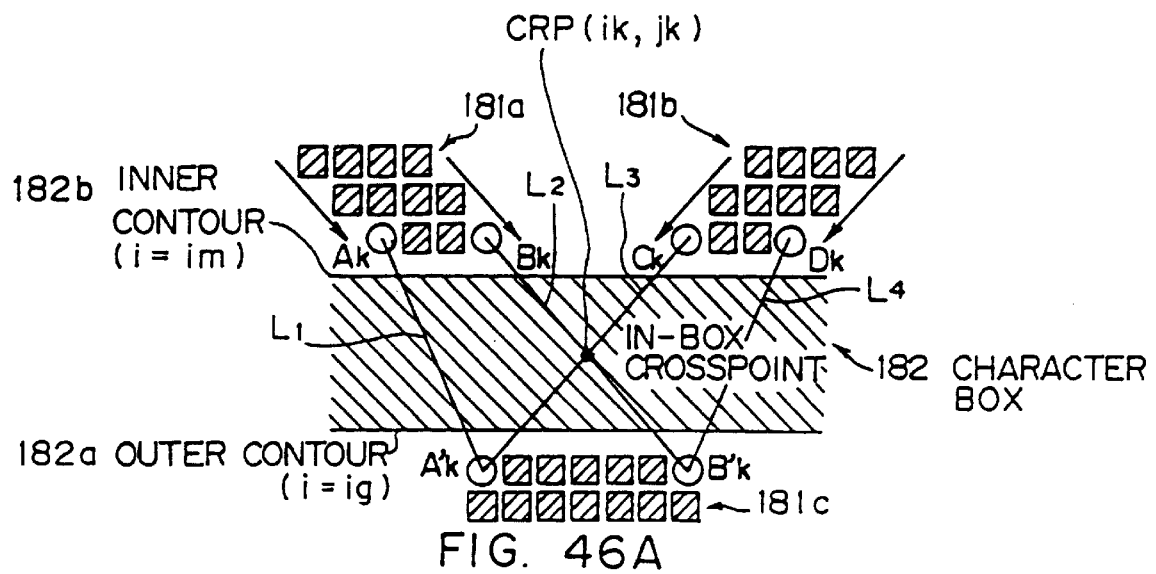
FIGS. 46A and 46B show examples of interpolating in cross points.
Figure 46B:
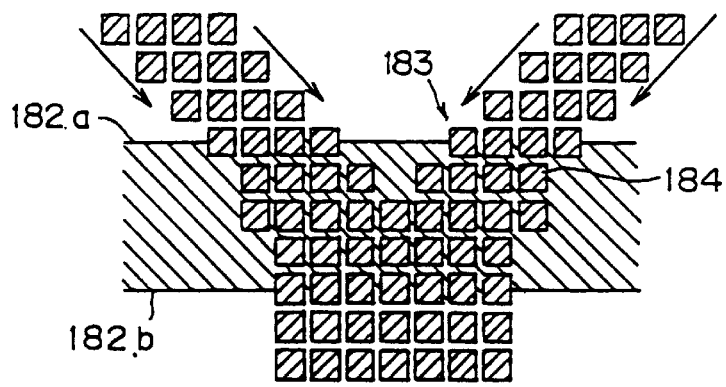
Figure 47:
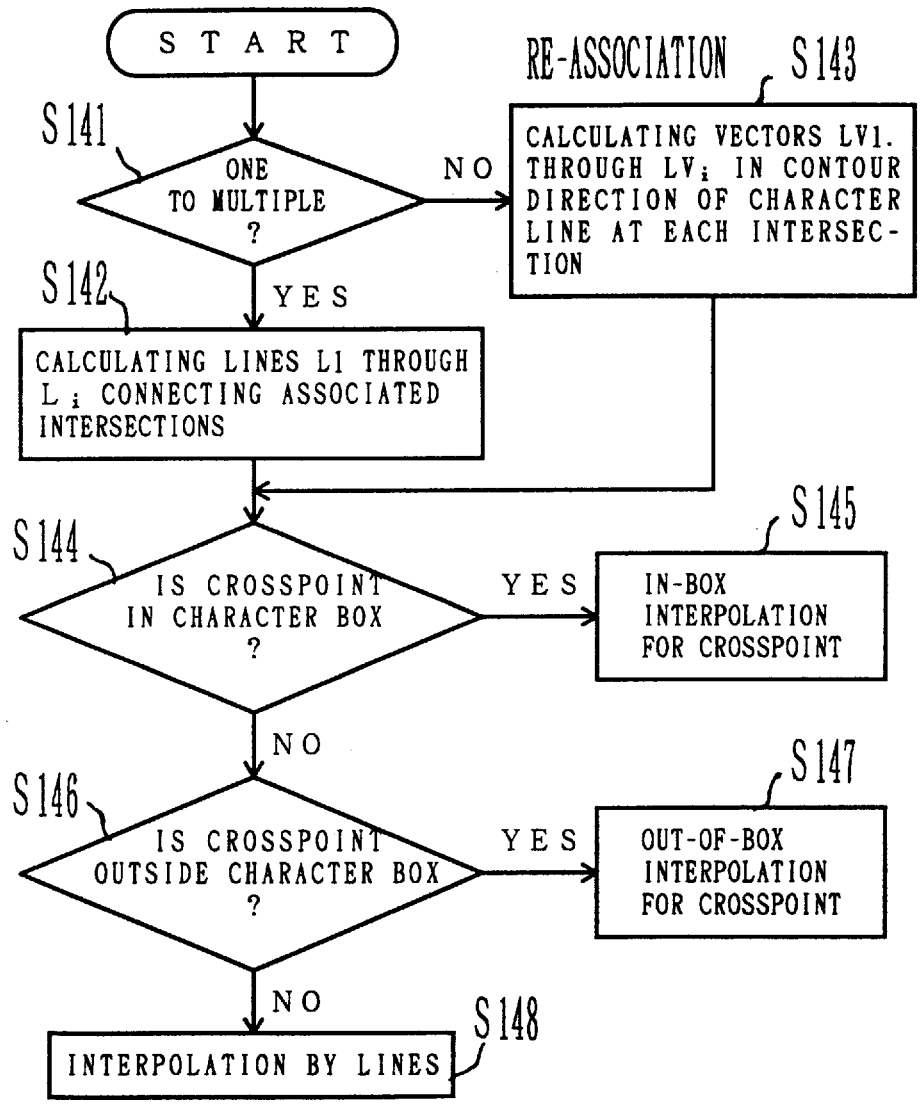
FIG. 47 is a flowchart showing in detail an example of the process performed by the crosspoint calculating unit.

FIGS. 46A and 46B shows examples of interpolating the elements for an in-box intersection by the in-box crosspoint interpolating unit 1051c. FIG. 46A shows three character lines 181a, 181b, and 181c, a character box 182, and an outer contour 182a and an inner contour 182b of the character box 182. FIG. 46B shows a character line 183 obtained by interpolating the above described three character lines 181a, 181b, and 181c. In this example, a direction vector is replaced with the four lines L1, L2, L3, and L4 connecting the intersections (Ak with A'k, Bk with the B'k, Ck with the A'k, and Dk with the B'k) associated by the intersection corresponding unit 104. If the associated intersections are connected by straight lines and the crosspoint CRP of the lines is within the character box 182 as shown in FIG. 46B, then the area encompassed by the lines L1, L2, L3, and L4 connecting the above described intersections is filled with black picture elements 184 to generate the character line 183. The pattern filled with the black picture elements 184 is defined as a virtual character line. FIG. 47 is a flowchart followed when the process is realized by software, and shows in detail an embodiment of the process of the crosspoint calculating unit 1051b on the above described associated lines. For comprehensibility, the examples shown in FIGS. 46A and 46B are explained below.

In FIG. 47, it is determined whether or not the one-to-multiple interpolation is currently made based on the information about the intersections entered by the intersection corresponding unit 104 (step S141). If the determination result in step S141 is YES, the lines L1 through L4 (n=2, 3, . . . ) connecting the intersections associated as shown in FIG. 46A are calculated (step S142). If the determination result in step S141 is NO, the direction vectors LVl through LVn of the contour of the character lines at each intersection are calculated (step S143). After the above described step S142 or S143, it is determined whether or not the intersection is in the character box 182 (step S144). If the determination result in step S144 is YES, then control is passed to the process of the in-box crosspoint interpolating unit 1051c described below (step S145). If the determination result in step S144 is NO, it is determined whether or not the crosspoint is outside the character box (step S146). If the determination result in step S146 is YES, then the control is passed to the process to be performed by an out-of-box crosspoint interpolating unit 1051d (step S147). If the determination result in step S146 is NO, control is passed to the process to be performed by a line interpolating unit 1051e (step S148).

Figure 48:
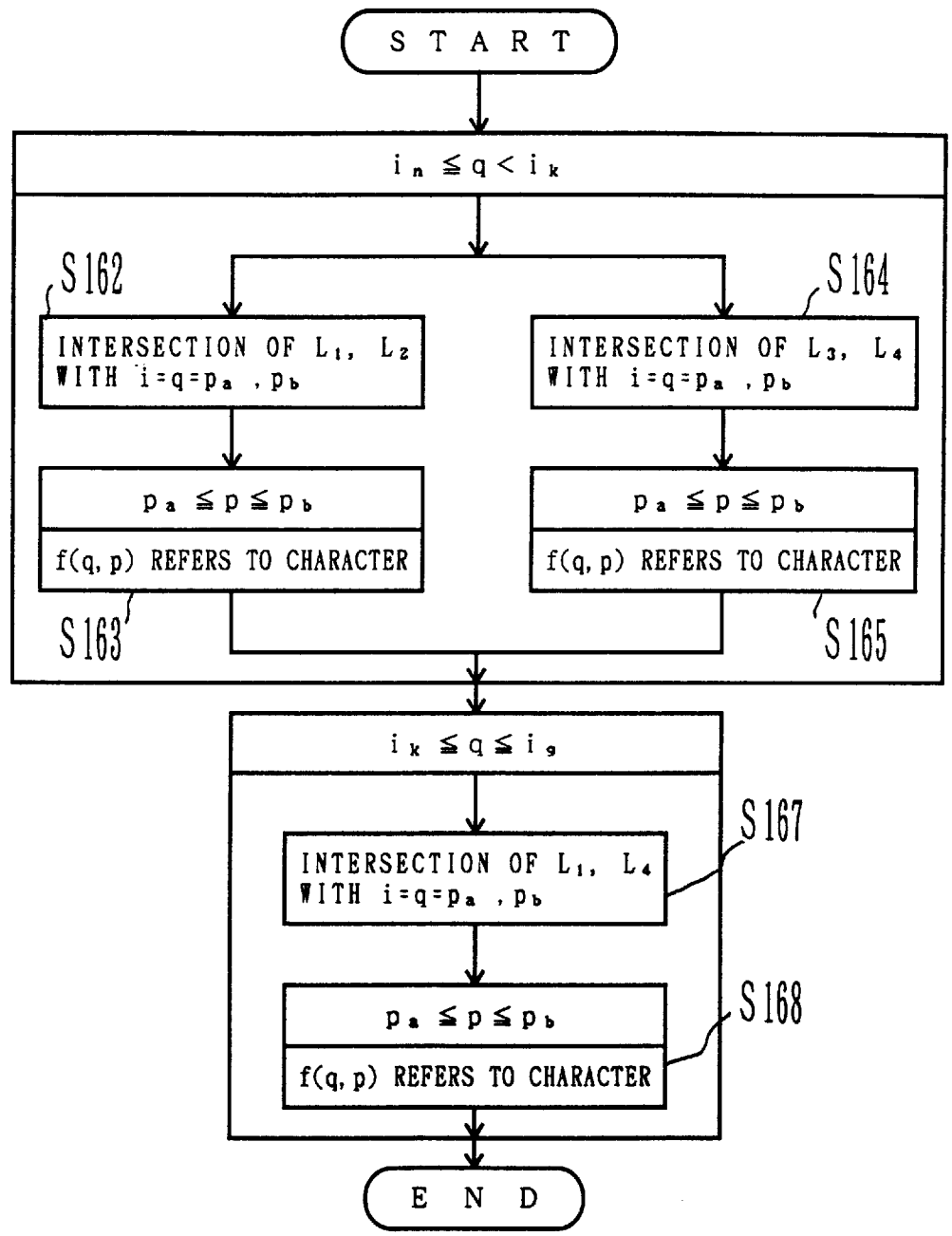
FIG. 48 is a flowchart showing in detail an example of the process performed by the internal crosspoint interpolating unit.

FIG. 48 is a flowchart showing in detail an embodiment of the process performed by the in-box crosspoint interpolating unit 1051c. In FIG. 48, the i coordinate of the outer contour 182a of the character box 182 shown in FIG. 46A is $i_n$, and the i coordinate of the inner contour 182b of the character box 182 is $i_g$. Furthermore, the variables q and p are assigned values of the i and j coordinates respectively. The f (q, p) indicates the density of the picture element at (q, p). The crosspoint CRP in the character box 182 shown in FIG. 46A, that is, the coordinates of the crosspoint CRP of the two lines L2 and L3 in the character box 182 are (ik, jk).

In FIG. 48, the processes in steps S162 through S165 are repeated with the value of the variable q, in which the value of the i coordinate is set, changed in the range of $i_n \leq q < ik$. That is, the values of the j coordinates pa, pb are obtained as the intersection of the lines L1, L2, with line i=q (step S162). The picture element f (q, p) is set as the black picture element forming part of the virtual character line with the value of the variable p, in which the value of the j coordinate is set, changed in the range of $pa \leq p < pb$ (step S163). The following steps S164 and S165 are performed in parallel with the above described steps S162 and S163.

That is, the values of the j coordinates pa, pb are obtained as the intersection of the lines L3, L4, with line i=q (step S164). The picture element f (q, p) is set as the black picture element forming part of the virtual character line with the value of the variable p changed in the range of $pa \leq p < pb$ (step S165).

If the processes in steps S162 through S165 are completed, then the processes in steps S166 and S167 are repeated with the variable q changed in the range of $ik \leq q \leq ig$. That is, the values of the j coordinates pa, pb are obtained as the intersection of the lines L1, L4, with line i=q (step S167). The picture element f (q, p) is set as the black picture element forming part of the virtual character line with the value of the variable p changed in the range of $pa \leq p < pb$ (step S168).

Thus, the character line 183 in the character box 182 is generated as shown in FIG. 46.

Figure 49:
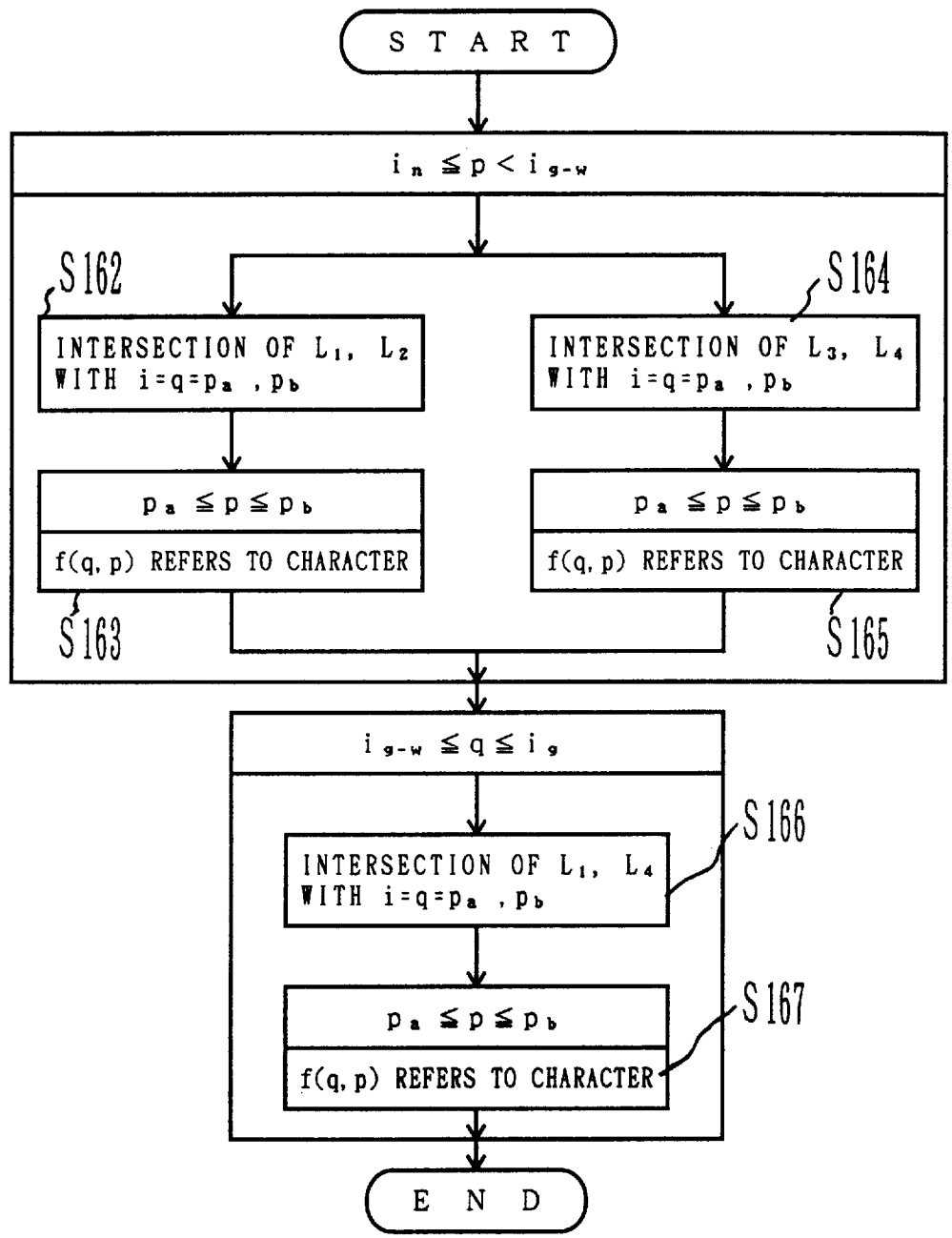
FIG. 49 is a flowchart showing in detail an example of the process performed by the external crosspoint interpolating unit.

FIG. 49 is a flowchart showing in detail an embodiment of the process performed by the out-of-box crosspoint interpolating unit 1051d. In FIG. 49, the steps also shown in FIG. 48 are assigned the same step numbers and the descriptions of the steps are omitted here. In the flowchart shown in FIG. 49, the thinness of the line forming the character box is w, and the i coordinate inward the i coordinate ig of the outer contour of the character box by the thinness of the line forming the character box (in the negative direction of the i coordinate) is (ig−w).

The process followed according to the flowchart shown in FIG. 49 is almost the same as that shown in FIG. 48 except that the process in steps S162 through S165 are repeated with the variable q changed in the range of $in \leq q < ig$ w and that the process in steps S166 and S167 are repeated with the variable q changed in the range of $ig - w \leq q \leq ig$.

Figure 50:
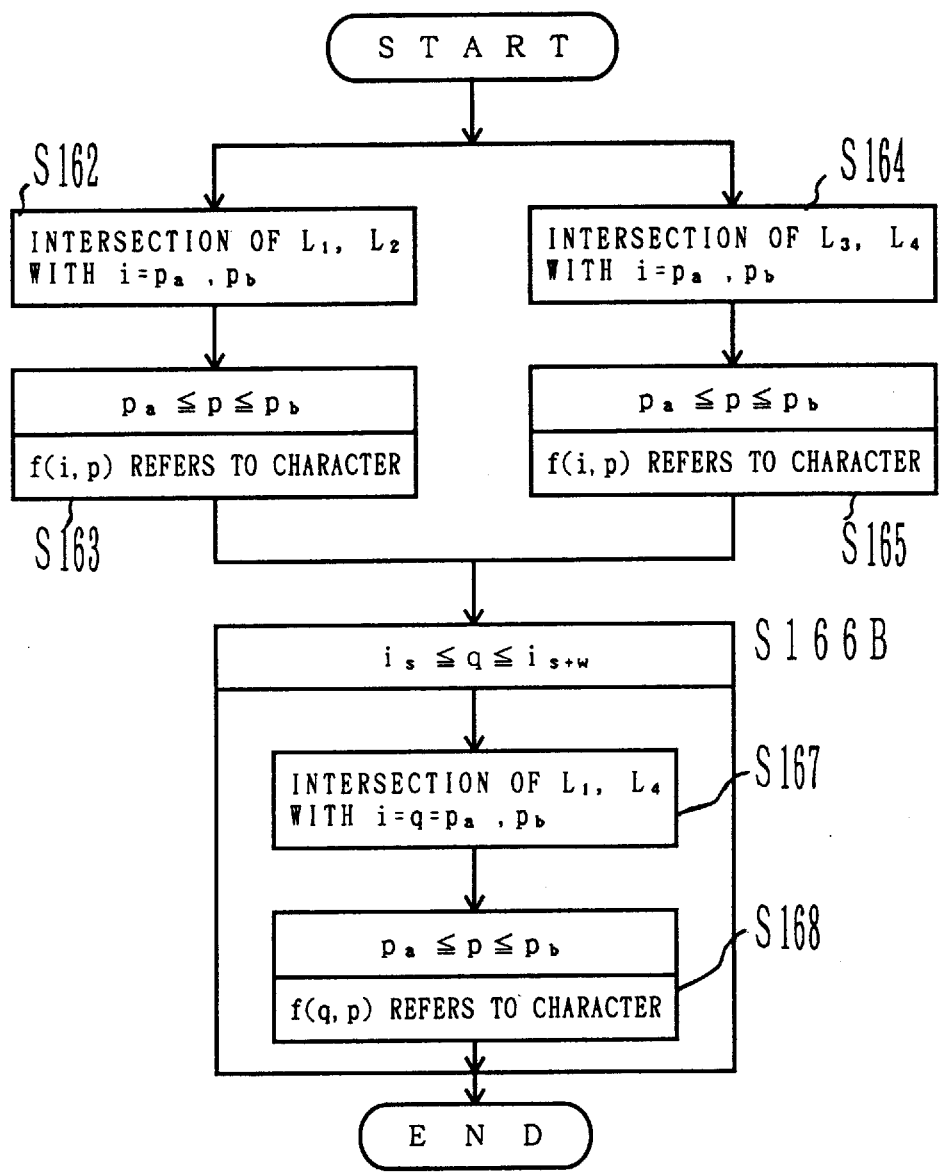
FIG. 50 is a flowchart showing in detail an example of the process performed by the line interpolating unit.

FIG. 50 is a flowchart showing in detail an embodiment of the process performed by the line interpolating unit 1051e. In FIG. 50, the step also shown in FIG. 48 is assigned the same step number, and the explanation is omitted here.

The process followed according to the flowchart shown in FIG. 50 is almost the same as that shown in FIG. 48 except that the variable i is fixed to a specific value, that the process in steps S162 and S163 and the process in S164 and S165 are repeated with the variable p changed in the range of $pa \leq p \leq pb$, and that the process in steps S166 and S167 are repeated with the variable q changed in the range of $is \leq q \leq is + w$.

Figure 51:
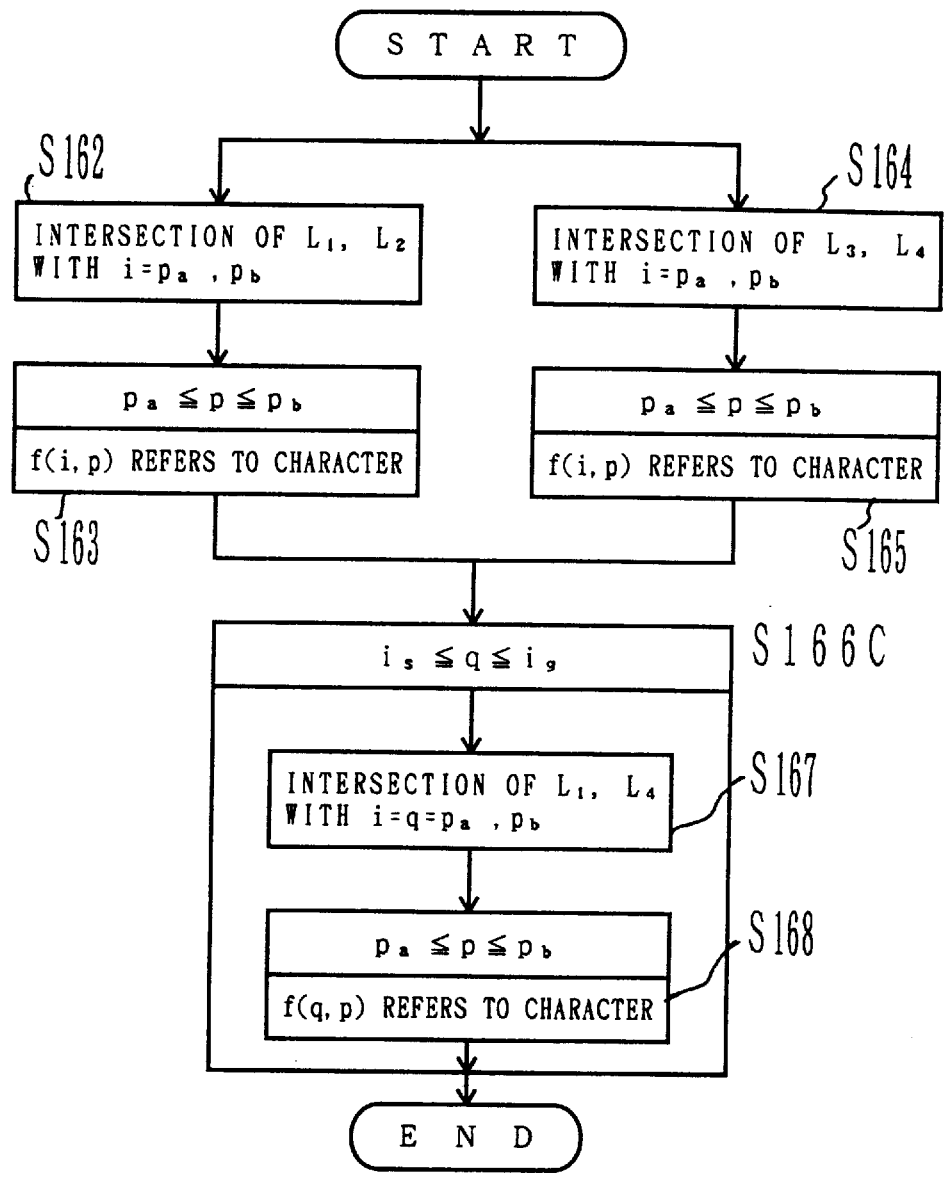
FIG. 51 is a flowchart showing in detail an example of the process performed by the line interpolating unit for a intersection for which no correspondence can be defined.

If an intersection cannot be associated with any other intersections, it should be processed according to the flowchart shown in FIG. 51. The step also shown in FIG. 48 is assigned the same step number, and the explanation is omitted here.

The process shown in FIG. 51 is almost the same as that shown in FIG. 48 except that the process in step S161 is omitted and the variable q is set in the range of $is \leq q \leq ig$ in step S166C.

According to the present embodiment, the line forming part of a line-touching character in the character box is provisionally extracted as a "virtual character line". Then, the average character size calculating unit 106 obtains an average character size from a character string containing a character from which the above described virtual character line has been extracted. Such a character string can be written in a row or a column on a table. The character string also can be written in a character box in a free format.

Figure 52:
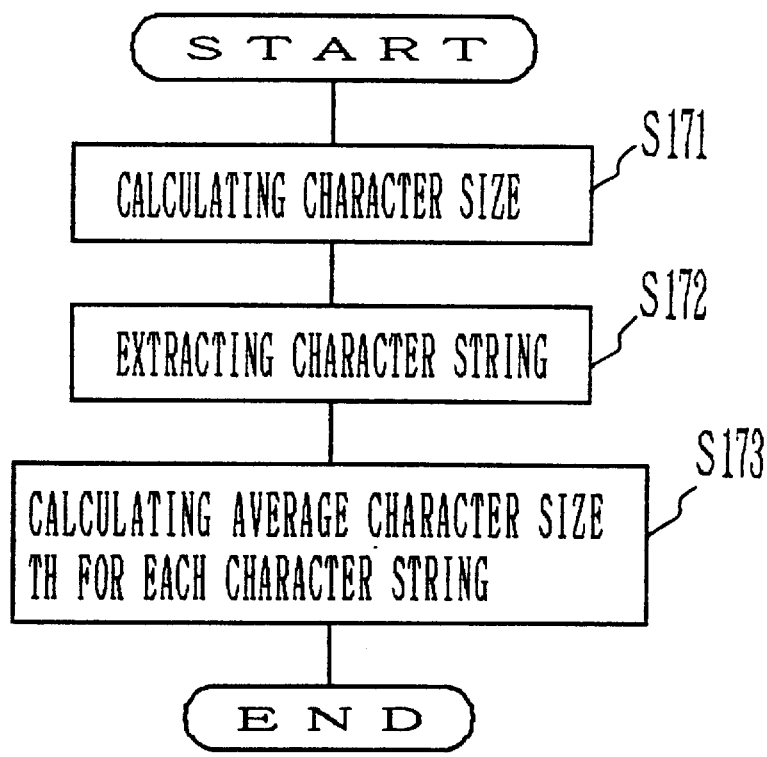
FIG. 52 is a flowchart showing in detail an example of the process performed by the average size calculating unit.

FIG. 52 is a flowchart showing the process performed by the average character size calculating unit 106 shown in FIG. 22.

The average character size calculating unit 106 obtains the size of each character extracted by the in-box character extracting unit 105. The character can be a line-touching character and contains the above described virtual character line. In calculating the character size, the link information about each character can be used after being obtained by the link pattern extracting unit 101. That is, the character size is calculated using the coordinates of the apex of the rectangle obtained by approximating the link image according to the link information of each character (step S171).

Then, a character string is extracted according to the label position information of the character extracted by the in-box character extracting unit 105 (step S172).

Next, the average character size TH is calculated for each of the extracted character strings (step S173). Since tables and lists can contain character boxes in both vertical and horizontal directions, a process of determining whether the character box is vertical or horizontal as a preprocess before the above described step S173. The average character size TH can contain the size information about either a horizontal rectangle or a vertical rectangle to contain characters.

The average character size HT can be calculated by, for example, the following method. First, the number of characters of an object character string is represented by n. The character size in the object character string is j[m] in the horizontal direction and i[n] in the vertical direction. The average character size TH is avec j in the horizontal direction and avec i in the vertical direction.

$$avej = \frac{\sum_{k=0}^{k=n} j[k]}{n}$$

$$avei = \frac{\sum_{k=0}^{k=n} i[k]}{n}$$

A character size evaluating unit 107 compares the size of each of the extracted characters with the average character size TH of the character string obtained by the average character size calculating unit 106. It determines whether or not the character pattern regarded as of an improper size contains a redundant virtual character line. If the character pattern contains the redundant virtual character line, the character size evaluating unit 107 separates the redundant virtual character line from the character pattern.

Figure 53:
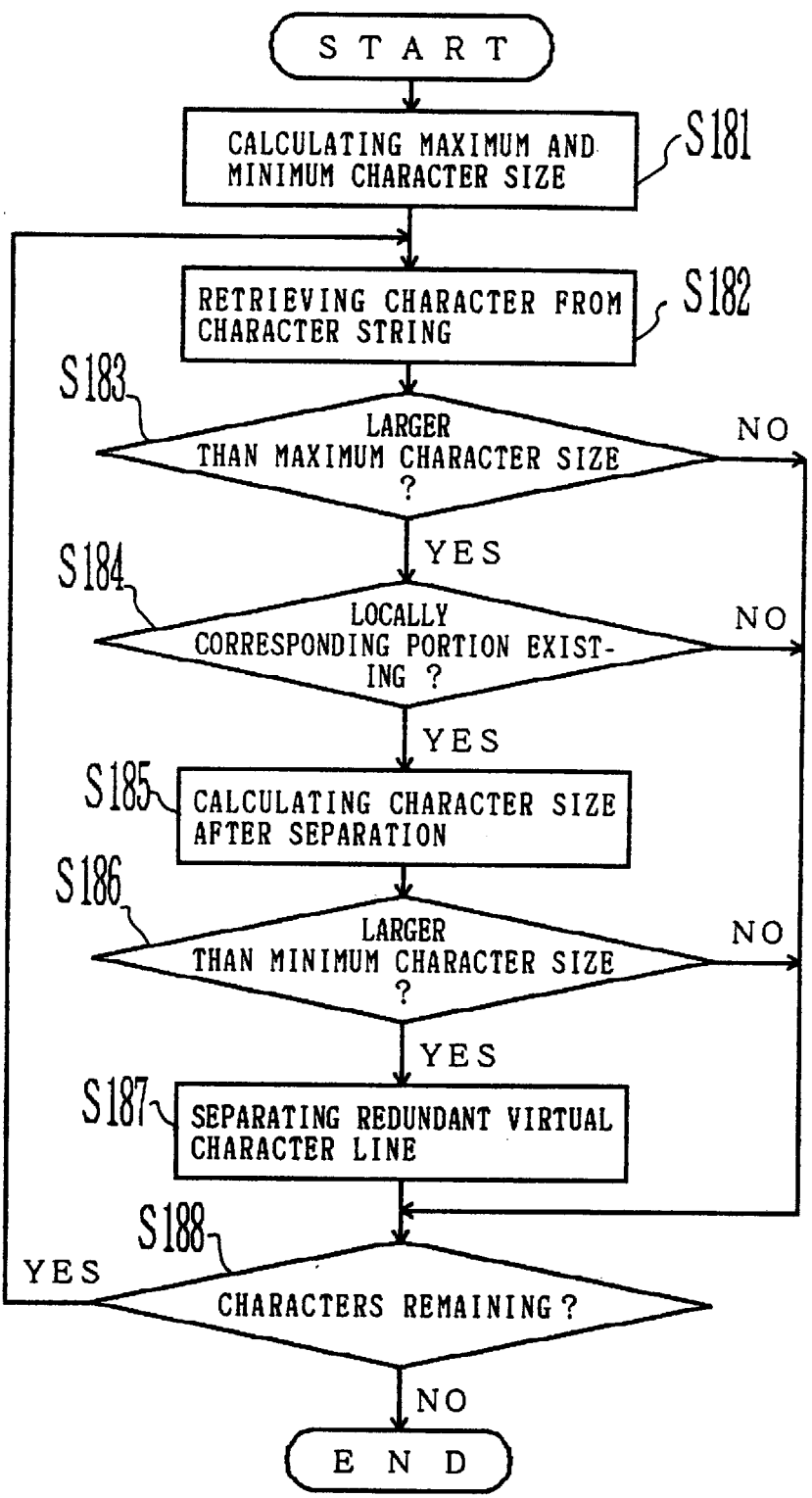
FIG. 53 is a flowchart showing an example of the process performed by the character size evaluating unit.

FIG. 53 is a flowchart showing an embodiment of the character size evaluating unit 107 shown in FIG. 22.

The character size evaluating unit 107 calculates the maximum character size THmax and minimum character size THmin based on the average character size TH obtained by the average character size calculating unit 106 (step S181). The maximum character size THmax and minimum character size THmin are used as a threshold in correctly retrieving a character from the extracted character pattern.

The maximum character size THmax can be calculated by the following equation.

$$THmaxj = avej + 5$$

or $$THmaxi = avei + 5$$

("5" indicates the size 5 times as large as one picture element.)

The minimum character size THmin can be calculated by the following equation.

$$THminj = avej - 5$$

or $$THmini = avei - 5$$

("5" indicates the size 5 times as large as one picture element.)

or $$THminj = avej \times 0.9$$

or $$THmini = avei \times 0.9$$

Figure 54:
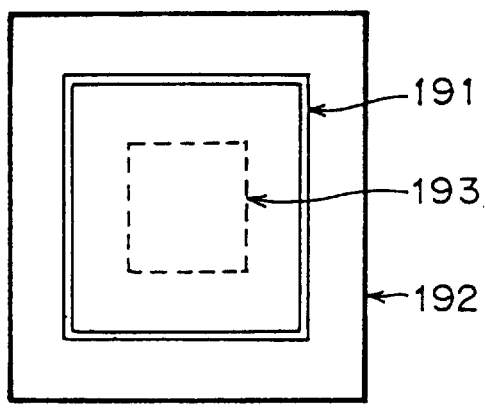
FIG. 54 is an example showing the maximum and minimum character sizes.

FIG. 54 shows examples of the maximum character size and minimum character size.

In FIG. 54, a double-line rectangle 191 indicates the average character size TH. A single-solid-line rectangle 192 indicates the maximum character size THmax, and a broken-line rectangle 193 indicates the minimum character size THmin.

The following processes in steps S183 through S187 are performed on all characters in the character string. That is, the first character (character pattern) is retrieved from the character string (step S182), and it is determined whether or not the character pattern is larger than the maximum character size THmax (step S183). If the character pattern is larger than the maximum character size THmax (yes in step S183), then it is determined whether or not the character pattern has a locally associated portion (step S184). A locally associated portion refers to an image formed by a virtual character line (locally associated image) and generated by a character interpolation process performed by the in-box character extracting unit 105 after the character box has been extracted. That is, it is determined in step S184 whether or not the character pattern retrieved in step S182 contains a virtual character line.

The determination as to whether or not the character contains the locally associated portion is made according to the association information between the intersections (of a character with its character box) obtained by the intersection corresponding unit 104. That is, if an intersection of a character pattern with its character box is associated with another intersection, then it is determined that the character has a locally associated portion.

If it is determined that no such locally associated portions exist in the above described character pattern (no in step S184), then the above described character pattern is recognized as a single character and control is passed to step S188.

FIGS. 55A, 55B, and 55C show examples of determining character patterns. In FIGS. 55A, 55B, and 55C, the pattern represented with diagonal lines is a character image read by an image scanner, etc. The pattern represented with dots is a locally associated image associated by the in-box character extracting unit 105 according to the intersection information.

As shown in FIG. 55A, if a character image 201 is larger than the maximum character size THmax and there are no locally associated portions, then the character image 201 is recognized as a single character. That is, in this example, it is considered that a character "8" larger than the average character size TH has been entered, and the single character "8" is retrieved.

If it is determined in step S184 that such a locally associated portion exists in the above described character pattern (yes in step S184), then the character size of various patterns obtained by deleting the locally associated portions (images of virtual character lines) from the above described character pattern can be calculated (step S185). Then it is determined whether or not the size of each pattern separated by the deletion is larger than the minimum character size THmin (step S186). If any of the pattern size is equal to or larger than the minimum character size THmin (yes in step S186), then the locally associated image, that is, a redundant virtual character line, is released from the character pattern, and the character pattern is divided into a plurality of patterns (step S187).

The redundant virtual character line is released as follows. That is, the correspondence between the intersections relating to the redundant character lines set by the intersection corresponding unit 104 can be released.

Thus, for example, two character images 202 and 203 written as "5" and "3" touching each other over the character box as shown in FIG. 55B are correctly retrieved as shown in FIG. 56B by releasing locally associated images 204a and 204b.

If any of a plurality of character images obtained by separating locally associated images (image formed by virtual character lines) is smaller than the minimum character size THmin in step S186 (no in step S186), then the character pattern is recognized as a single character by regarding the locally associated image as a part of the character pattern.

FIG. 55C shows an example of the above described pattern. FIG. 55C shows an image pattern of a character "d" partially overlapping the character box obtained by the in-box character extracting unit 105. The image pattern is formed by two character images 205 and 206, and a locally associated image (image containing a virtual character line) 207. In this image pattern, the first character image 205 (portion encompassed by the rectangle of broken lines) obtained by releasing the locally associated image 207 is equal to or smaller than the minimum character size THmin. Therefore, in this example, the locally associated image 207 is regarded as a true character line. Thus, the character "d" partially hand-written as a character larger than the maximum character size THmax over the character box is correctly retrieved as a single character image 208 as shown in FIG. 56C.

If the character pattern (including the character pattern containing the locally associated image) is equal to or smaller than the maximum character size THmax in step S183, then the character pattern is regarded as a single character.

If the processes in steps S183 through S187 are performed on all character patterns in the character strings, and it is determined that the processes have been completed (no in step S188), then the process shown on the flowchart in FIG. 53 is completed.

Figure 57A:
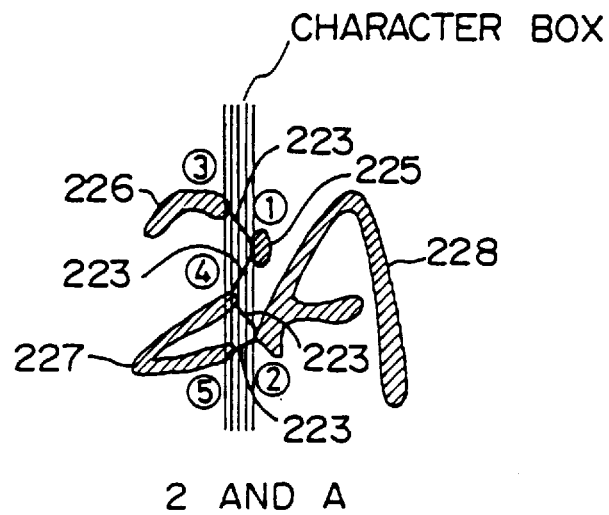
FIGS. 57A, 57B, and 57C show examples of easily preventing a plurality of characters from being retrieving as a single character through overhang.
Figures 57B, 57C:
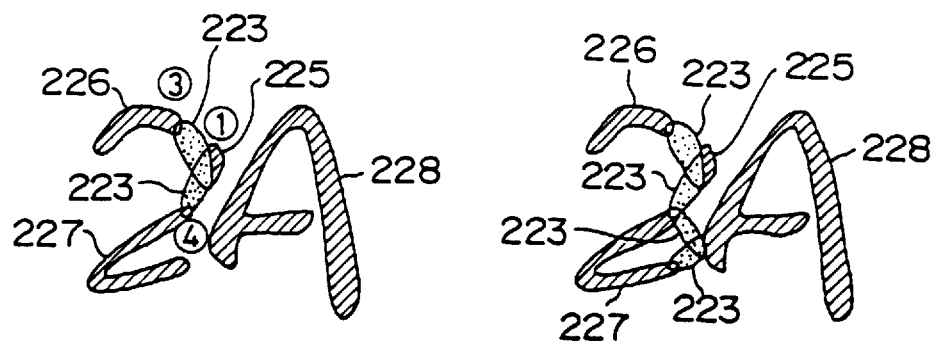

If the characters "2" and "1" are hand-written partially over the character box as shown in FIG. 57A, the two characters can be prevented from being mistakenly extracted by the in-box character extracting unit 105 as a single character as shown in FIG. 57C as in the conventional method.

That is, the character pattern associated with a locally associated image 223 shown in FIG. 57A is recognized as being larger than the maximum character size THmax and having the locally associated image 223. If the locally associated image 223 is deleted, then it is determined that a character image 225 is smaller than the minimum character size THmin. The character image 225 is combined with two character images 226 and 227 forming part of the above described character "2" through the locally associated image 223. Thus, the character "2" can be correctly retrieved.

Since a character image 228 of "A" obtained by releasing the locally associated image 223 is larger than the minimum character size THmin, it is recognized as a single character. Therefore, the locally associated image 223 connecting the intersections 2 to 4 and the intersections 2 to 5 is removed as a redundant virtual line. As a result, the two characters "2" and "A" can be correctly retrieved as shown in FIG. 57B.

Figure 58:
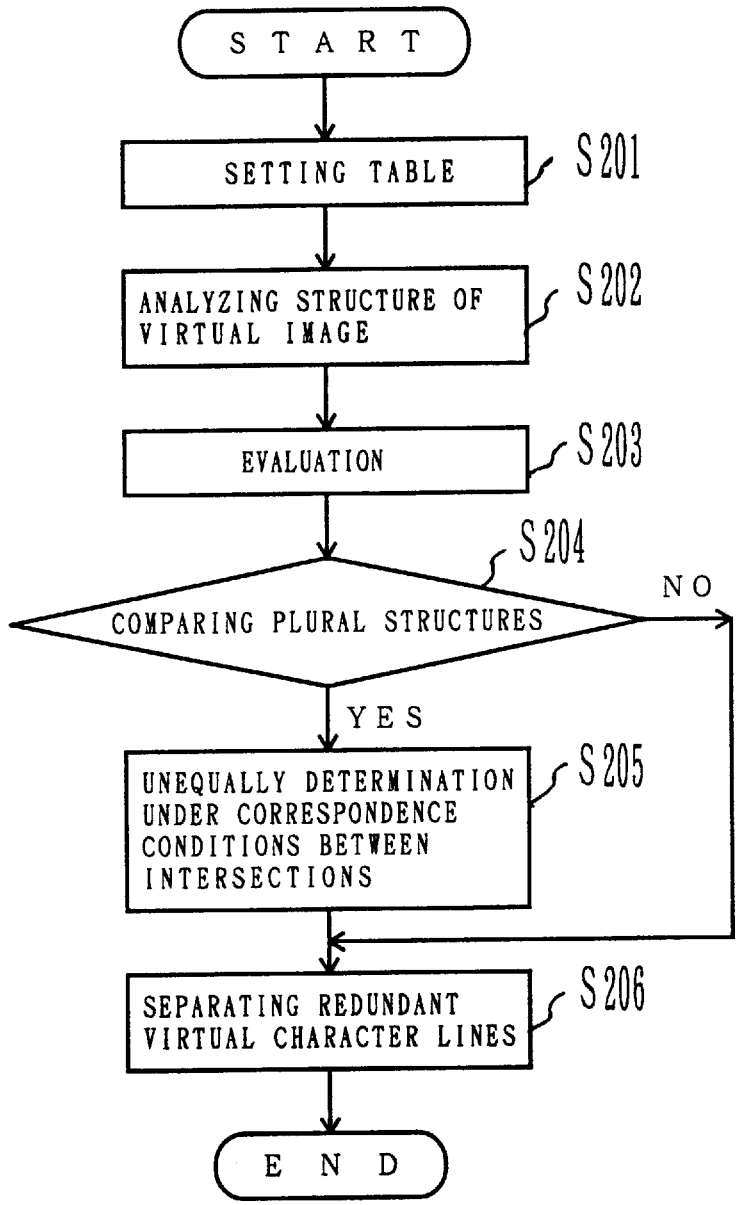
FIG. 58 is a flowchart showing the process performed by the character structure analysis evaluating unit.

FIG. 58 is a flowchart showing the process performed by a character structure analyzing and evaluating unit 108 shown in FIG. 22.

The character structure analyzing and evaluating unit 108 loads a character structure definition table onto the memory (step S201).

The character structure definition table is generated depending on, for example, the character type such as "numerical characters", "alphabetical characters", "Japanese characters", "Chinese characters", etc.

FIG. 59 shows an example of the contents of the character structure definition table.

In this example, the "N-shaped", "inverted-N-shaped", and "8-shaped" are entered as the types forming the structure of a virtual image. Then, the information about the structure of the virtual image formed by a plurality of virtual character lines of these types, and the structure of a true image formed by true character lines corresponding to the virtual character lines is entered.

The structure of the true image corresponding to the virtual images of the N-shaped and inverted-N-shaped is only one type as shown in FIG. 59. By referring to this table for the N or inverted N virtual image, a true image can be successfully obtained after extracting only a true character line from the virtual image. On the other hand, two types of the true image structures exist as shown in FIG. 59. It is determined to which true image the actual 8-shaped virtual image corresponds depending on the information about the directional properties of the virtual character line obtained by the intersection corresponding unit 104.

Figure 60:
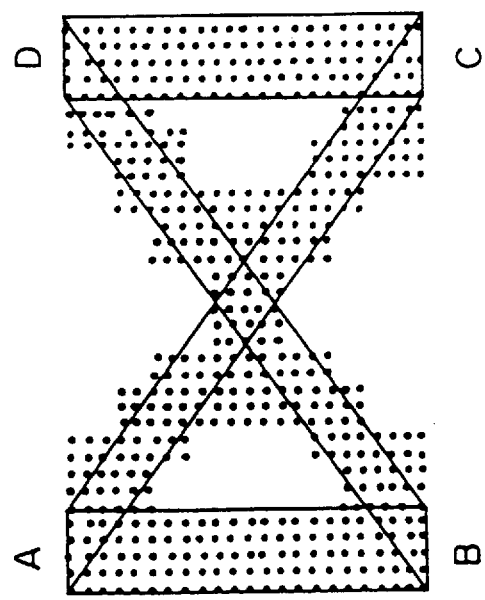
FIG. 60 shows the structure of the virtual line forming part of the character of the 8-shaped virtual image.

The two directional properties of the 8-shaped virtual image type is explained by referring to FIG. 60. In FIG. 60, the dot pattern indicates an in-box extracted picture read by an image scanner, etc. The 8-shaped virtual image is formed by the four virtual character lines AB, AC, BD, and CD. In this case, the virtual character line AB is associated with the intersections A and B. Likewise, the virtual character lines AC, BD, and CD are associated with the intersections A and C, B and D, and C and D respectively. In this example, if the intersections A and B and the intersection B and D are associated according to the directional information obtained by the intersection corresponding unit 104, then the 8-shaped virtual image is defined as being associated in the diagonal direction. Unless the virtual image is associated as described above, that is, if the intersections A and B and the intersections C and D are separately associated, then the 8-shaped virtual image is defined as being associated in the virtual and horizontal directions.

After the process in step S201, the structure of a virtual image is analyzed (step S202) according to the intersection of the virtual character line regarded as being associated by the intersection corresponding unit 104 with the character box and according to the corresponding information (including the information about the directional properties). The virtual image structure analysis process is described later in detail.

The type of the structure of the virtual image is evaluated by comparing the analysis information with the structure information of the virtual image entered in the table set in step S201 (step S203).

Then, it is determined whether or not the structure of the virtual image obtained by the evaluation can be uniquely identified (step S204). That is, if the structure of the virtual image is recognized as of the N-shaped or the inverted-N-shaped as shown in FIG. 59, then the true image structure is uniquely identified (no in step S204). On the other hand, if the structure of the virtual image is recognized as of the 8-shaped as shown in FIG. 59, then the true image structure can be of two types and cannot be uniquely identified (yes in step S204).

If the true image corresponding to the virtual image is uniquely identified from the table in step S204 (no in step S204), then the virtual character line not required by the true image is separated (released) from the virtual image in order to obtain the true image (step S206).

The virtual character line forming a diagonal line is released from the virtual image evaluated as of the N-shaped or inverted-N-shaped shown in FIG. 59. Then, the true image shown in FIG. 59 can be finally obtained.

FIGS. 61A, 61B, 62A, and 62B show practical examples of correctly retrieving characters by extracting the true image from the virtual image in the processes in steps S201 through S204 and S206 when the in-box extracted image extracted by the in-box character extracting unit 105, that is, a virtual image, is of N-shaped and inverted-N-shaped.

Figure 61A:
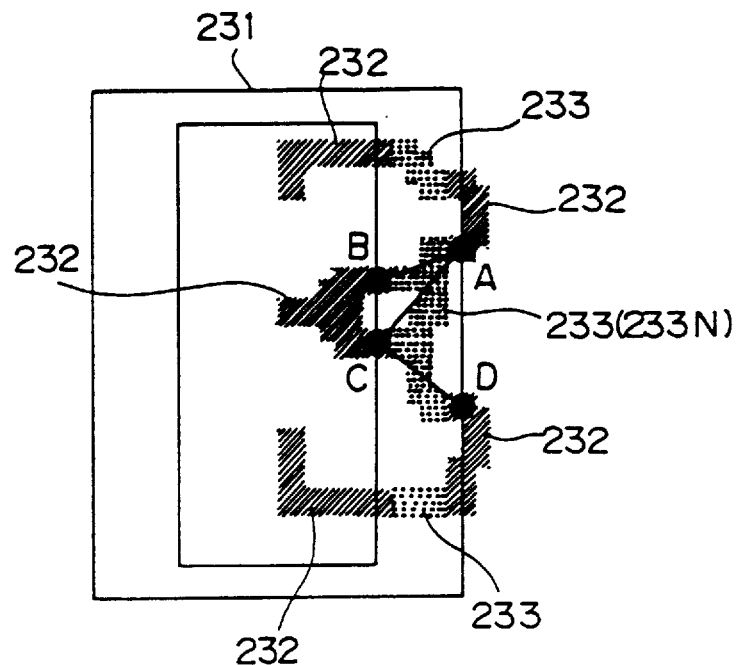
FIGS. 61A and 61B show examples of correctly retrieving characters when the virtual image is N-shaped.
Figure 61B:
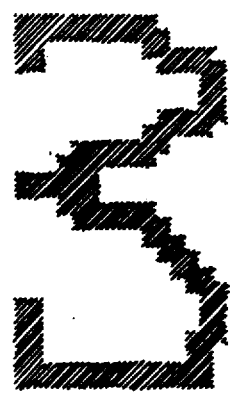
Figure 62A:
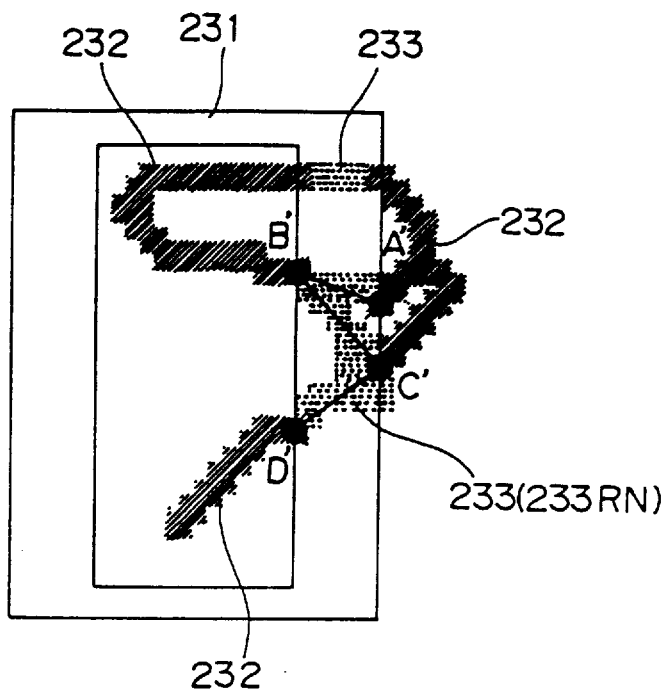
FIGS. 62A and 62B show examples of correctly retrieving characters when the virtual image is inverted-N-shaped.
Figure 62B:
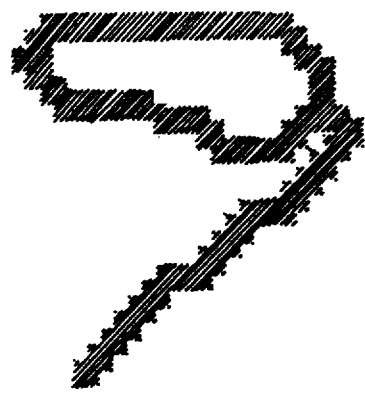

FIGS. 61A and 61B show examples of correctly retrieving "3" written as touching a character box 231. FIGS. 62A and 62B show examples of correctly retrieving "9" written as touching a character box 231. In FIGS. 61A, 61B, 62A, and 62B, a hatching pattern 232 is an image of the true character line. A dot pattern 233 is a virtual character line. Black dots A, B, C, and D, and A', B', C', and D' are intersections of the true character line 232 with the character box 231.

In the examples shown in FIGS. 61A and 61B, a virtual image 233N is recognized as the N-shaped virtual image in the processes in steps S202 and S203. That is, the determination is made according to the information that the intersections A and B, A and C, and C and D obtained by the intersection corresponding unit 104 are associated. By referring to the table set in step S201, only the virtual character line AC, that is, the diagonal line, can be removed from the virtual image 233N shown in FIG. 61A so that the character image "3" shown in FIG. 61B can be correctly retrieved.

In the examples shown in FIGS. 62A and 62B, a virtual image 233RN is recognized as the inverted-N-shaped virtual image in the processes in steps S202 and S203. That is, the determination is made according to the information that the intersections A' and B', B' and C', and C' and D' obtained by the intersection corresponding unit 104 are associated. By referring to the table set in step S201, only the virtual character line B'C', that is, the diagonal line, can be removed from the virtual image 233RN shown in FIG. 62A so that the character image "9" shown in FIG. 62B can be correctly retrieved.

A plurality of true images are entered in step S204 in the table for the corresponding virtual images. If the corresponding true image is not uniquely identified (yes in step S204), then the association condition between the virtual character line and the character box is obtained. The association condition is obtained by, for example, the intersection corresponding unit 104. It compares the association condition with the condition for uniquely identifying a true image entered in the table, thus uniquely identifies the true character line (step S205), and obtains the true image entered in the above described table after releasing (removing) the redundant character line from the virtual image according to the determination (step S206).

If the structure of the virtual image is, for example, 8-shaped as shown in FIG. 63, then it is determined in step S205 whether the direction of the above described virtual character line is a vertical direction or a diagonal direction. Then, the structure of the true image is uniquely determined according to the condition for uniquely determining the true image information entered in the table shown in FIG. 59.

An example of extracting only true character lines from a hand-written line-touching character according to the present embodiment by referring to FIGS. 63A, 63B, 64A, and 64B. In FIGS. 63 and 64, lines 243a and 243b indicate virtual images.

FIG. 63A shows an example in which a hand-written character "8" is touching its character box at its crosspoint. The in-box character extracting unit 105 extracts an 8-shaped virtual image 243a including the redundant virtual character line from the character box. FIG. 63B also shows an example in which a hand-written character "8" is touching its character box at its lower portion. The in-box character extracting unit 105 extracts an 8-shaped virtual image 243b including the redundant virtual character line from the character box.

According to the direction information associating the intersections obtained by the intersection corresponding unit 104 in step S205 shown in the flowchart in FIG. 58, it is determined in the example shown in FIG. 63A that the virtual image 243a is written in the diagonal direction. Then, the 8-shaped character image formed only by the true character line 241 shown in FIG. 64A is retrieved in step S205. According to the direction information associating the intersections obtained by the intersection corresponding unit 104 in step S205, it is determined in the example shown in FIG. 63B that the virtual image 243b is written in the vertical direction. Then, the 8-shaped character image formed only by the true character line 241 shown in FIG. 64B is retrieved in step S205.

Described below in detail is the process in step S202 according to the flowchart shown in FIG. 58.

Figure 65:
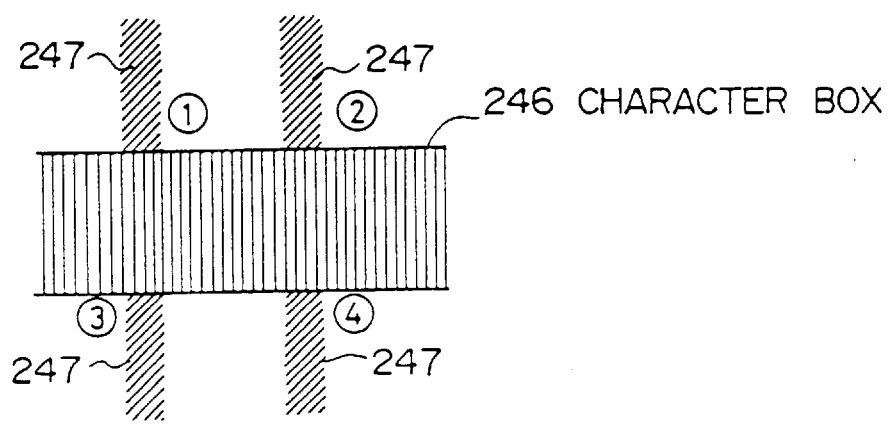
FIG. 65 shows an enlarged drawing of the line-touching portion when the character is touching the character box.
Figure 66:
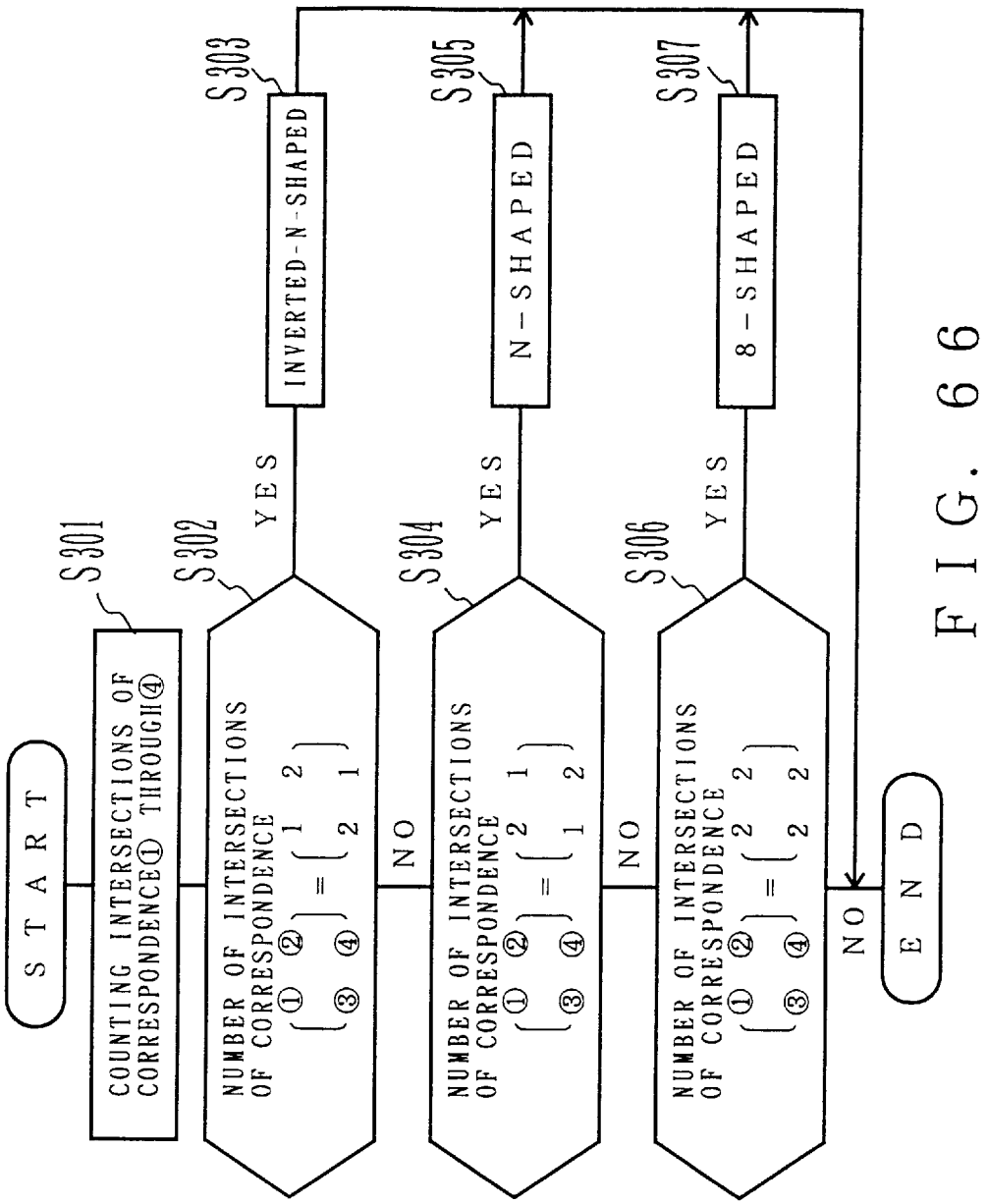
FIG. 66 is a flowchart showing the process of determining the format of the virtual image through the character structure analysis evaluating unit.

FIG. 65 show the enlarged image of the line-touching portion of a character partially overlapping a character box 246. In this case, the four character lines 247 cross the character box 246. 1 through 4 are the intersections of the character lines 247 with the character box 246. In this example, the structure of the virtual image is determined based on the algorithm shown by the flowchart in FIG. 66 according to the association information about the four intersections.

That is, according to the association information about the four intersections, the number of other intersections associated with the intersections 1 through 4 is counted (step S301).

Next, it is determined whether or not the number of intersections associated with the intersections 1 through 4 "1", "2", "3", and "4" indicates 1, 2, 2, and 1 respectively (step S302). If this condition is satisfied (yes in step S302), then the virtual image is defined as an inverted-N-shaped image (step S303).

Unless this condition is satisfied (no i step S302), then it is determined whether or not the number of the intersections associated with the intersections 1, 2, 3, and 4 is 2, 1, 1, and 2 respectively (step S304). If the condition is satisfied (yes in step S304), then the virtual image is considered to be N-shaped (step S305).

Unless the condition in step S304 is satisfied (no in step S304), then it is further determined whether or not the number of the intersections associated with the intersections 1, 2, 3, and 4 is 2, 2, 2, and 2 respectively (step S306). If the condition is satisfied (yes in step S306), then the virtual image is considered to be 8-shaped (step S307).

If the number of intersections is 4, then the virtual image can be identified as a predetermined N-, inverted-N-, or 8-shaped by checking the number of other intersections associated with the present intersection 1, 2, 3, or 4 positioned as shown in FIG. 65.

Figure 67:
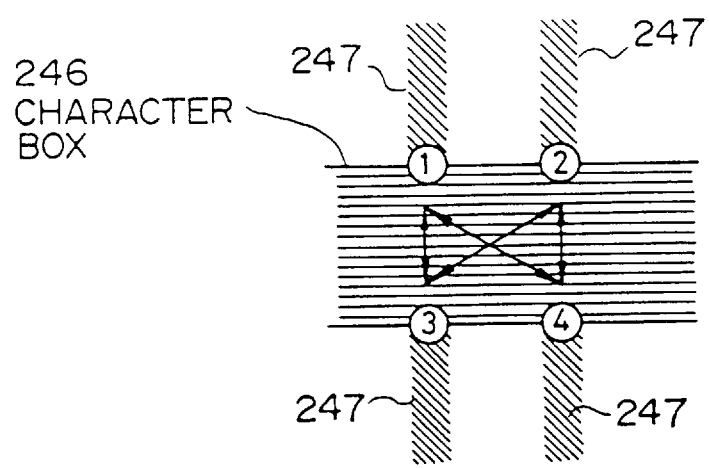
FIG. 67 shows the correspondence among four intersections associated by the intersection corresponding unit as shown in FIG. 65.
Figure 68:
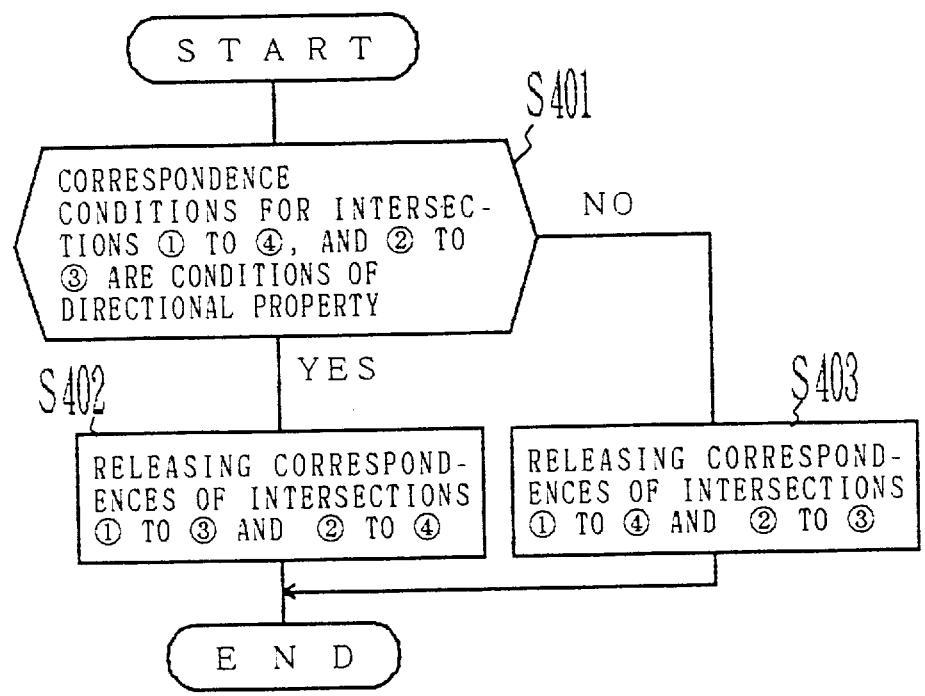
FIG. 68 is a flowchart showing the process of extracting the true line forming part of a character from the 8-shaped virtual image associated as shown in FIG. 67.

Described below in detail by referring to FIGS. 67 and 68 is the process in step S205 according to the flowchart shown in FIG. 58.

FIG. 67 shows the relationship among the 4 intersections 1 through 4 associated by the intersection corresponding unit 104 as shown in FIG. 65.

In FIG. 67, the intersection 1 is associated with the intersection 3, the intersection 1 with 4, the intersection 2 with 3, and the intersection 2 with 4. The association condition in this example relates to a direction or a distance.

FIG. 68 is a flowchart showing the process of extracting the true character line from the 8-shaped virtual image.

First, it is determined whether or not the intersection corresponding unit 104 has associated the intersection 1 with 4, and the intersection 2 with 3 under the directional condition (step S401). If the above described two intersections are associated under the directional conditions (yes in step S401), then the associations between the intersection 1 and 3, and between the intersection 2 and 4 are released (step S402). Thus, the virtual character lines are connecting the intersection 1 with 3 and the intersection 2 with 4 are deleted.

On the other hand, if the above described two intersections are not associated under the directional conditions (no in step S401), then it is determined that the intersections 1 and 3 and the intersections 2 and 4 are associated under the vertical direction, Then, the association between the intersections 1 with 4, and the association between the intersection 2 with 3 are released (step S403). Thus, the virtual character lines connecting the intersection 1 with 4, and the intersection 2 with 3 are deleted.

Described below is a practical example of applying the above described present embodiment to a character partially overlapping its character box.

Figure 69A:
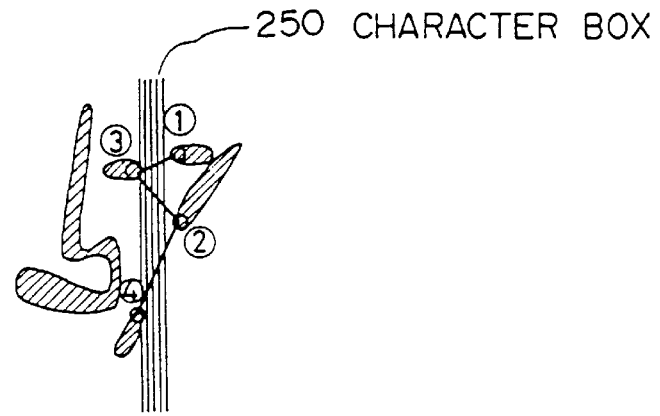
FIGS. 69A, 69B, and 69C show examples of correctly retrieving the characters "5" and "1" handwritten in an overhang state on the character box.
Figure 69B:
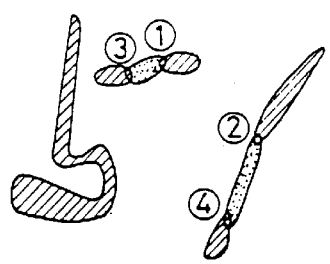
Figure 69C:
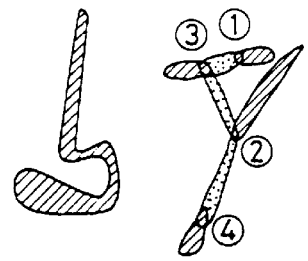
Figure 70A:
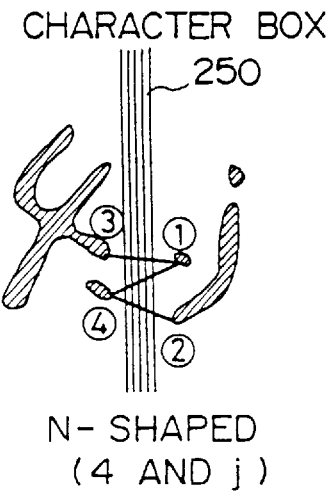
FIGS. 70A, 70B, 70C, and 70D show examples of retrieving two hand-written characters forming part of an N-shaped virtual image in an overhang state.
Figure 70B:
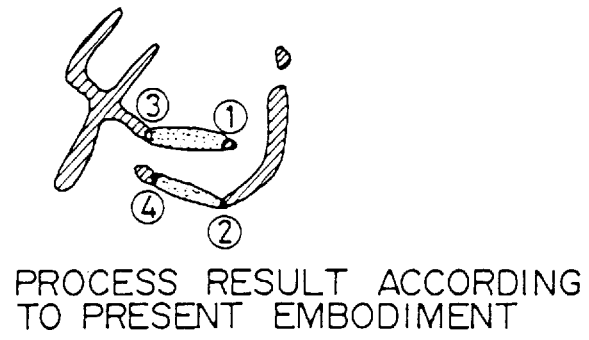
Figure 70C:
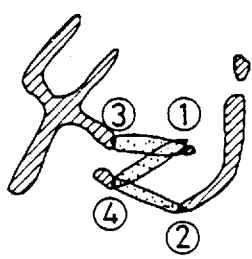
Figure 70D:
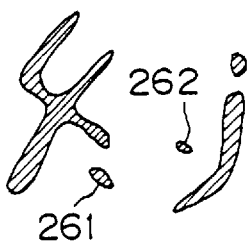
Figure 71A:
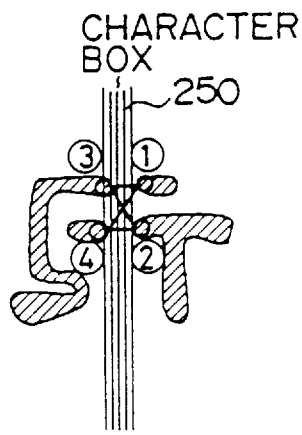
FIGS. 71A, 71B, 71C, and 71D show an example of retrieving two handwritten characters forming part of an 8-shaped virtual image in an overhang state.
Figure 71B:
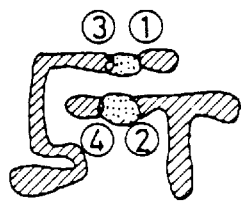
Figure 71C:
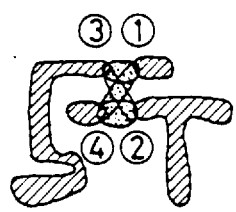
Figure 71D:
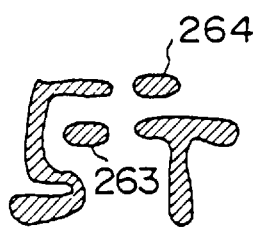

As shown in FIGS. 69A, 69B, and 69C, each of the characters 5 and 1 hand-written partially over the a character box 250 is correctly retrieved according to the present embodiment.

As shown in FIG. 69A, the characters 5 and 1 partially overlapping the character box form four intersections with the character box 250, and the in-box character extracting unit 105 extracts an inverted-N-shaped virtual image. Therefore, in this example, the virtual character lines between the intersections 1 and 3, and between the intersection 2 and 4 are extracted as true character lines, but the virtual character line between intersections 2 and 3 is released as a false character line. As a result, the characters 5 and 1 are correctly extracted as shown in FIG. 69B. Since all virtual character lines are conventionally extracted as true lines, the characters 3 and 9 are mistakenly extracted as shown in FIG. 69C.

FIG. 70 shows an example applying the present embodiment to the retrieval of the two hand-written characters for which an N-shaped virtual image is formed by the characters partially overlapping the character box. In FIG. 70A, the two characters 4 and j are hand-written partially over the character box. The in-box character extracting unit 105 extracts the N-shaped virtual image from the association information about the four intersections 1 through 4 of the characters with the character box 250. Therefore, in this example, the virtual character lines between the intersections 1 and 3, and between the intersection 2 and 4 are extracted as true character lines, but the virtual character line between intersections 1 and 4 is released as a false character line. As a result, the characters 4 and j are correctly extracted as shown in FIG. 70B. Since all virtual character lines are conventionally extracted as true lines and the two characters 4 and j are retrieved as a single character as shown in FIG. 70C. Otherwise, After the character box 250 is extracted as shown in FIG. 70D, the character line hand-written in the character box 250 is not successfully supplemented, but the character line on the character box 250 is deleted, leaving insignificant images 261 and 262 to fail in correctly retrieving 4 and j.

FIG. 71 shows an example of the present embodiment of retrieving two hand-written characters forming an 8-shaped virtual image with the characters written partially over the character box. In FIG. 71A, the two characters 5 and T are hand-written partially over the character box. The in-box character extracting unit 105 extracts an 8-shaped virtual image from the association information about the four intersections 1 through 4 of the characters with the character box 250. Therefore, if the intersection 1 is associated with 3 and the intersection 2 is associated with 4 in, for example, the horizontal direction, then the two characters 5 and T are correctly retrieved as shown in FIG. 71B. Conventionally, since false character lines (the character line connecting the intersections 1 with 4 and the character line connecting the intersections 2 with 3) are also extracted as true character lines as shown in FIG. 71C, the characters 5 and T are linked and extracted as a single character. Otherwise, since the character box 150 is deleted, true character lines 263 and 264 are separated from each other and the two characters 5 and T cannot be correctly retrieved as shown in FIG. 71D.

Figure 74A:
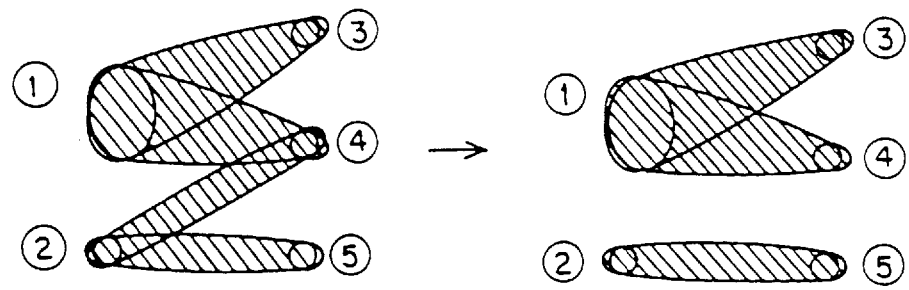
FIGS. 74A and 74B show the unique-determination condition for the case where a plurality of structures are defined on the table shown in FIG. 73.
Figure 74B:
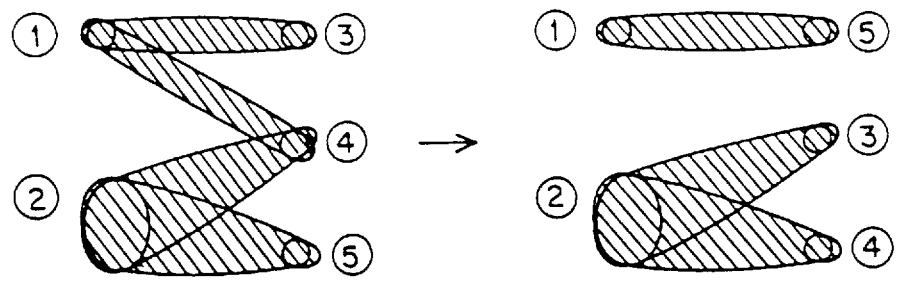

According to the above described embodiments, two characters touching their character box between them at two points on both sides are retrieved. However, the present invention can be further applied to the characters touching their character box between them at two points on one side and three points on the other side as shown in FIGS. 72A and 72B. In this case, the character structure analyzing and evaluating unit 108 preliminarily set a table storing the information shown in FIG. 66. FIG. 73 shows the structures of the 6 types, type 1 through type 6, of virtual images. Of these images, the structures of types 2, 3, 5, and 6 can be uniquely identified as comprising true character lines by searching the table. On the other hand, the structures of types 1 and 4 have alternatives and can be determined depending on the intersections 1 and 2 whichever is thicker in the horizontal direction. If the intersection 1 is thicker with types 1 and 4 as shown in FIG. 74A, then the structure of the true character lines indicated on the left side in the true character line structure storage area shown in FIG. 73 is selected. On the other hand, if the intersection 2 is thicker with types 1 and 4 as shown in FIG. 74B, then the structure of the true character lines indicated on the right side in the true character line structure storage area shown in FIG. 73 is selected. Likewise, in the case of the virtual image shown in FIG. 72B, a table can be generated. In this case, the information about the structure of the virtual image stored in the table and about the structure of the true character line corresponding to the virtual image are symmetrical to the information shown in FIG. 73.

Figure 75:
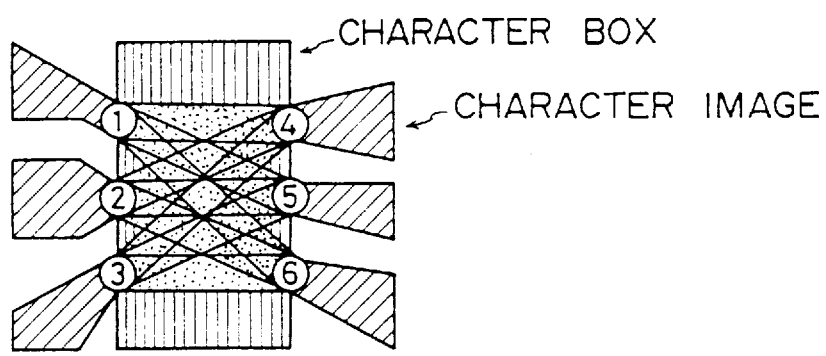
FIG. 75 shows an enlarged drawing of the line-touching character having three intersections of the character with the character box at both borders of the line forming part of the character box.
Figure 78:
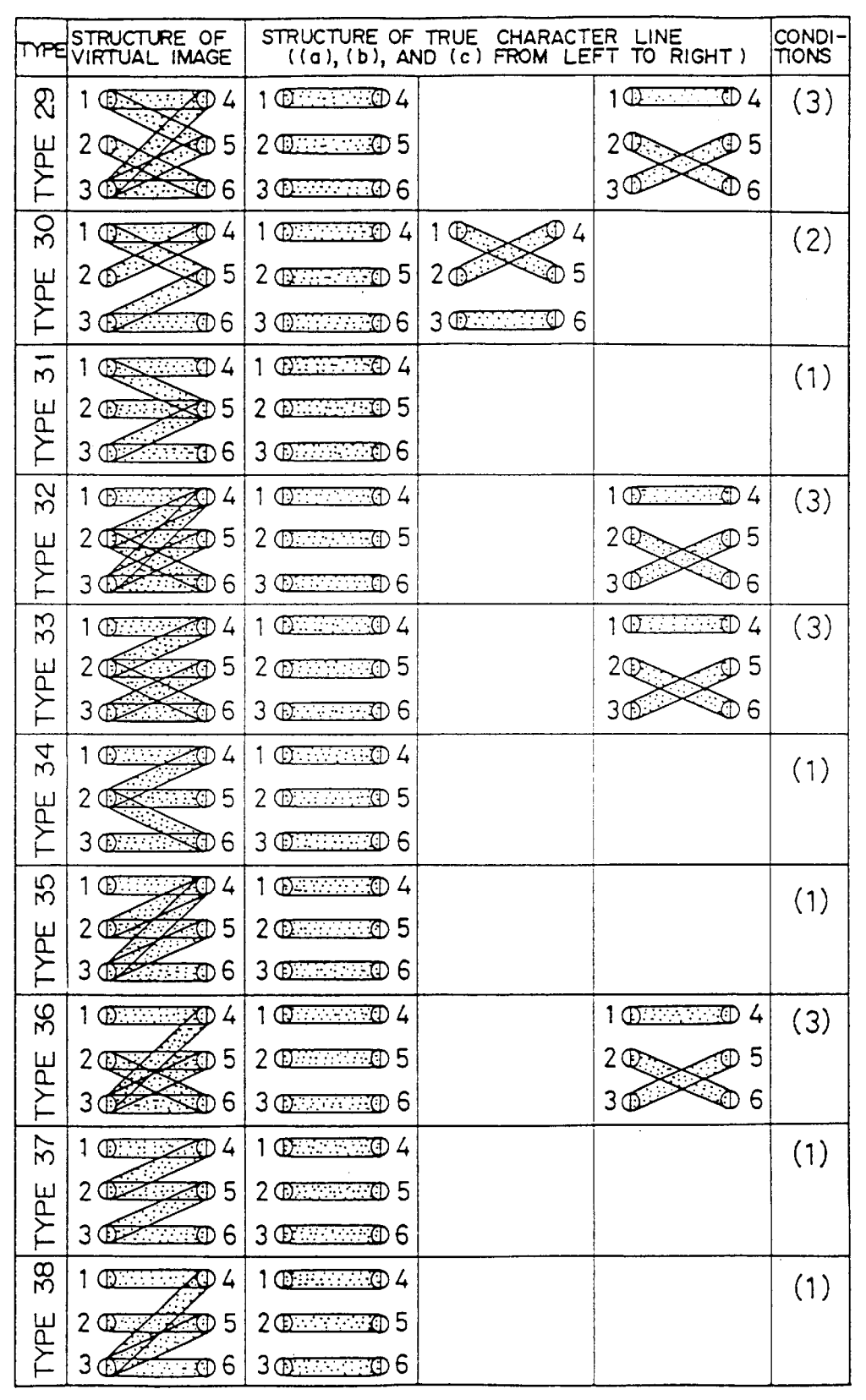

According to the following embodiment, the present invention is applied if a character hand-written partially over the character box forms 3 intersections on both sides (1 through 3 and 4 through 6) as shown in FIG. 75. In this case, the table having the contents shown in FIG. 78 is entered in the character structure analyzing and evaluating unit 108. In FIG. 75, the dotted portions indicate virtual character lines, the portions marked with diagonal lines indicate character images, and the portions marked with vertical lines indicate character boxes.

Figure 76:
FIG. 76 shows the first configuration of the virtual image table of the structure shown in FIG. 75.
Figure 77:
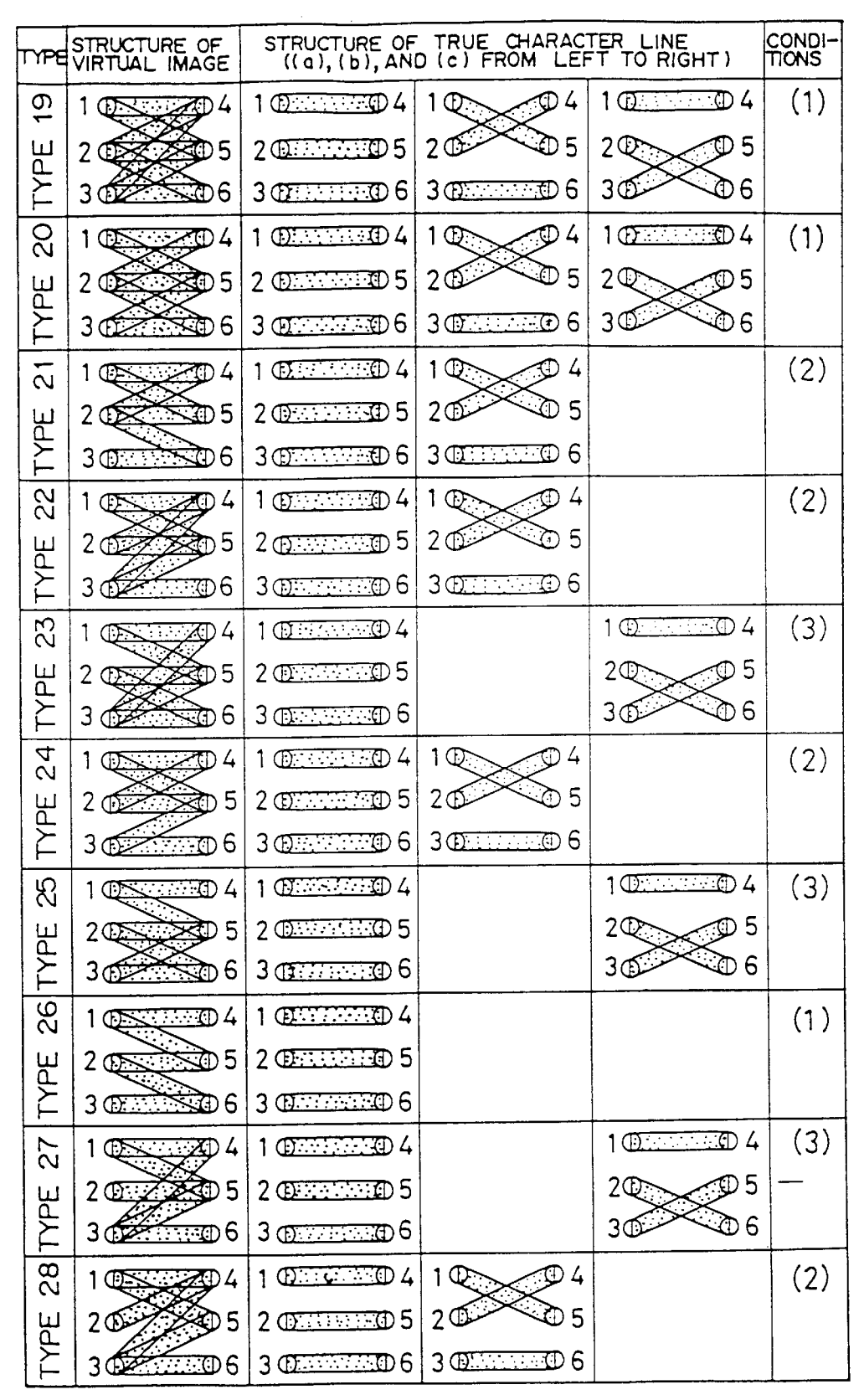

The structure of the virtual images entered in the above described table are 38 types (types 1 through 38). Some of them have the structures of the true character lines uniquely determined, and others have the structures of two or three true character lines from which one structure is selected. The structures of the three character lines stored in the true character line structure storage area shown in FIGS. 76 through 78 are named (a), (b), and (c) from left to right.

The structure of true character lines is selected from the above described table under the conditions (1) through (3).

(1) (b) when the intersections 1 and 5 and the intersections 2 and 4 are associated under the directional association condition.

(c) when the intersection 2 and 6 and the intersections 3 and 5 are associated under the directional association condition.

Otherwise, structure (c) is selected.

(2) (b) when the intersections 1 and 5 and the intersections 2 and 4 are associated under the directional association condition.

Otherwise, structure (a) is selected.

(3) (c) when the intersection 2 and 6 and the intersections 3 and 5 are associated under the directional association condition.

Otherwise, structure (c) is selected.

In the above described embodiment, a true character line is extracted from a virtual image using a table. However, the present invention is not limited to this application. That is, the true character line can be extracted only through algorithm, and the implementing method can be in various formats. In the above described embodiments, hand-written characters are extracted from character boxes of listings and tables, but the present invention is not limited to the application. It can be applied to retrieving (extracting) an object pattern from an image in which a line, character, graphics or symbols are touching one another in an image recognizing device such as a graphics recognizing device.

According to the present embodiment, a line is extracted from an image in which the line crosses a pattern and then the intersection of the line with the pattern is calculated. Then, the image of the above described pattern in the line is estimated according to the intersection information, and the image is extracted as a virtual image. Then, the image of only the pattern is extracted according to the information, etc. obtained from experience.

Therefore, since a character hand-written partially over its character box in a table format can be correctly retrieved in a character recognizing device, the character can be retrieved in an improved precision. Furthermore, object graphics can also be correctly extracted in not only character recognizing devices but also graphics recognizing devices.

According to the embodiment described below, characters can be recognized at an enhanced recognition rate even if a line-touching character which is touching a line of a character box or table or partially overlapping the character or table.

Figure 79:
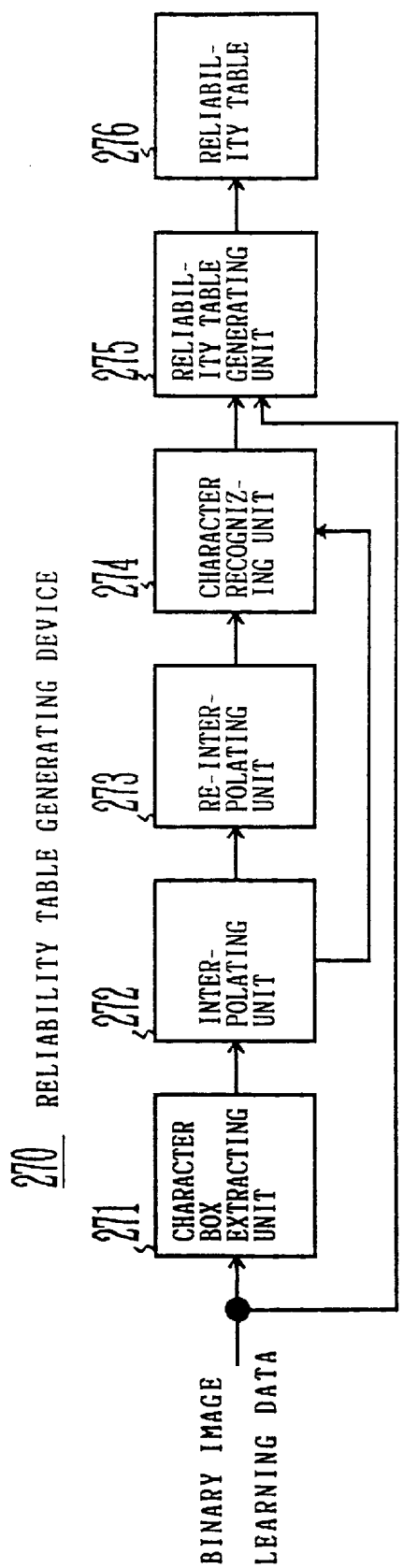
FIG. 79 is a block diagram showing the configuration of the first reliability table generating device according to the embodiment of the present invention.

FIG. 79 is a block diagram showing the embodiment, that is, the configuration of the reliability table generating device (character re-recognizing table generating device) 270.

A character box extracting unit 271 inputs learning data of a plurality of samples for each character category. The learning data is binary image data comprising a character box and a character touching the character box (line-touching character). The character is a commonly known character. Each sample is different from the others in a touching state between the character box and the character. The character box extracting unit 271 extracts the image data of only the character box from the learning data. The image data forming characters is output to an interpolating unit 272.

The interpolating unit 272 supplements the image data of the characters removed by the character box extracting unit 271 (removal area) by, for example, the method similar to that of the interpolating unit 12.

Figure 1:
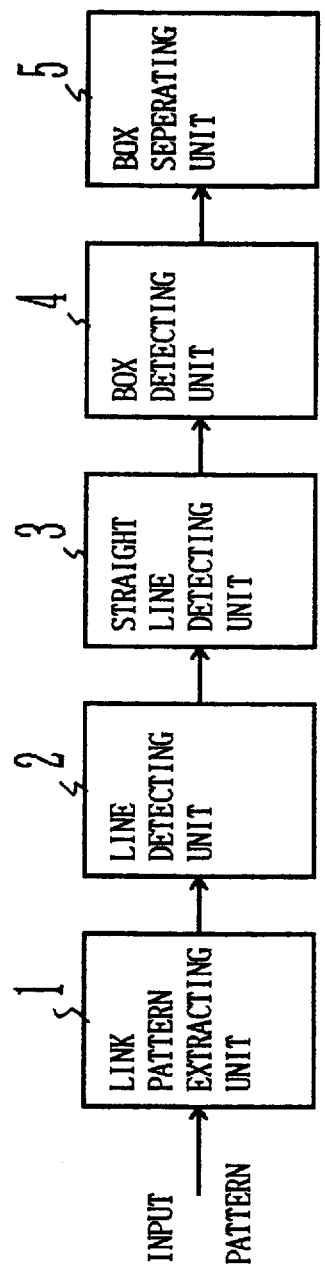
FIG. 1 is a block diagram showing the configuration of the conventional image extracting device.
Figure 2:
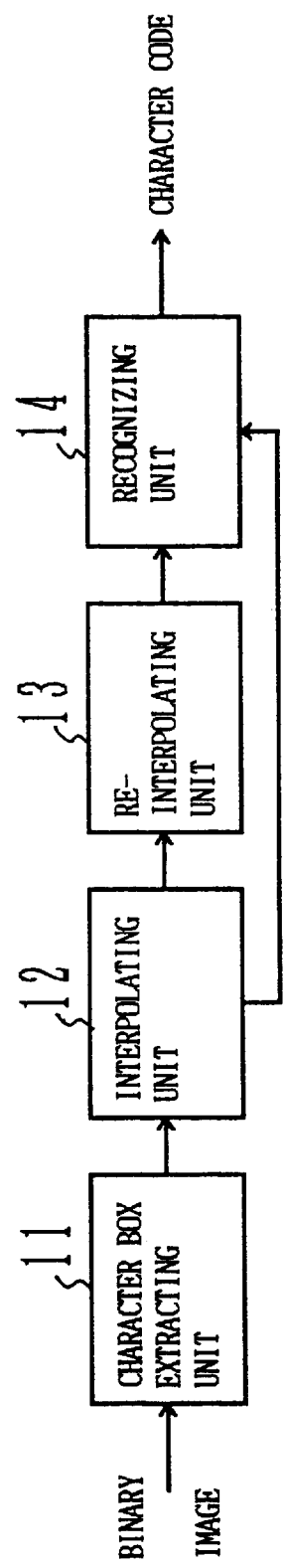
FIG. 2 is a block diagram showing the configuration of the conventional character recognizing device.
Figures 3A, 3B, 3C:
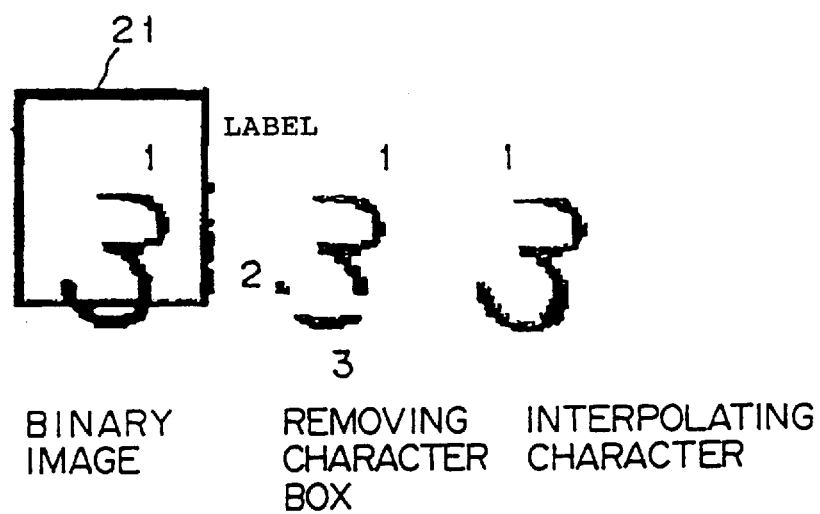
FIGS. 3A, 3B, and 3C show the methods of supplementing a character on the conventional character recognizing device shown in FIG. 2.
Figures 4A, 4B, 4C, 4D:
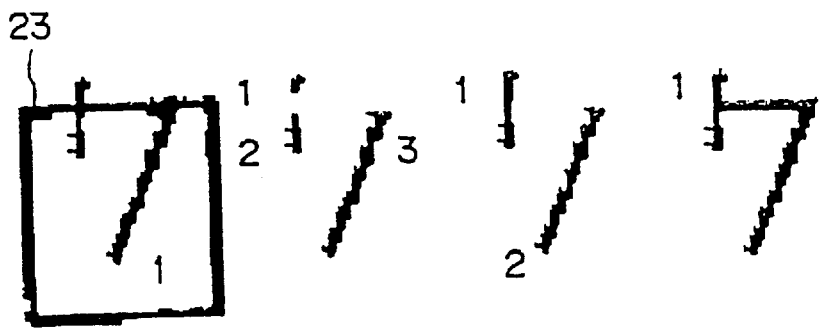
FIGS. 4A, 4B, 4C, and 4D show the method of re-supplementing a character on the conventional character recognizing device shown in FIG. 2.
Figures 5A, 5B:
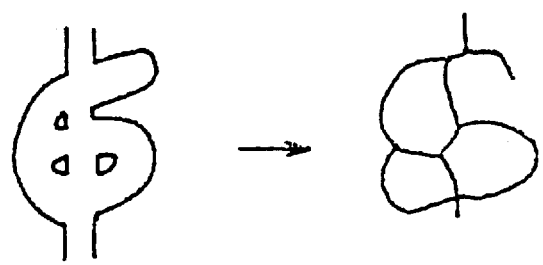
FIGS. 5A and 5B show problems with the fine-line process.
Figure 6:
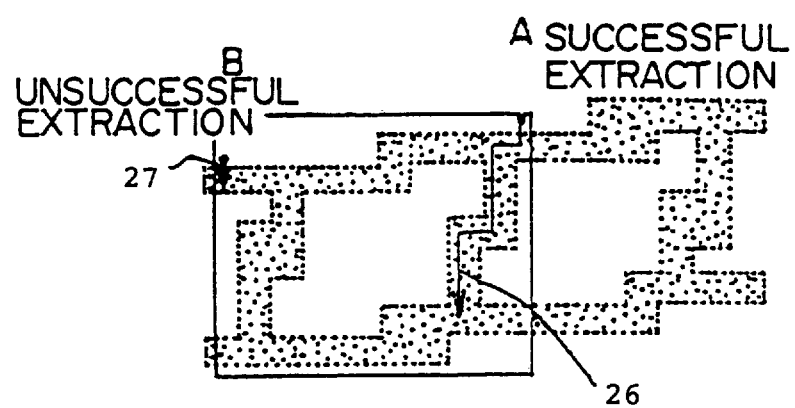
FIG. 6 shows the problems that prevent the prior art from successfully extracting character boxes.
Figure 7A:
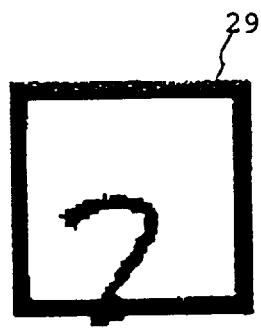
FIGS. 7A, 7B, and 7C show examples of failing to supplementing characters on the conventional character recognizing device shown in FIG. 2.
Figure 7B:
Figure 7C:

A re-interpolating unit 273 interpolates the removal area which was not supplemented by the interpolating unit 272 by a method similar to that of the re-interpolating unit 13 shown in FIG. 2.

The interpolation pattern generated by the interpolating unit 272 and the re-interpolation pattern generated by the re-interpolating unit 273 are input to a character recognizing unit 274.

The character recognizing unit 274 starts recognizing characters when the interpolation pattern and re-interpolation pattern are input for plural samples of learning data in each character category. It then outputs the recognition result for each piece of learning data to a reliability table generating unit 275.

The reliability table generating unit 275 compares the above described recognition result output from the character recognizing unit 274 with predetermined correct data to obtain the recognition rate for the entire sample data. The obtained recognition rate is entered as a reliability level in the reliability table 276. A wrong-and-correct character set (for a mistakenly recognized character) and an expected character is also entered in the reliability table 276 as a wrong character set. The wrong-and-correct character set is entered as, for example, character codes. The reliability table generating unit 275 extracts a parameter indicating the feature of the touching state between a character and its character box from the learning data and enters it in the reliability table 276.

Thus, the reliability table 276 stores, together with the wrong character set, the recognition rate of the character recognizing unit 274 for the character (line-touching character) touching its character box in various states for each character category.

FIG. 80 is a block diagram showing the configuration of a character recognizing device 280 for recognizing a character in a line-touching character using the reliability table 276 generated by the reliability table generating device 270.

In FIG. 80, a character box extracting unit 281 receives unknown binary image data comprising a character and its character box (line-touching character), extracts the image data of the character box from the entire image data, and outputs to an interpolating unit 282 the image data of the character pattern obtained after extracting the image data of the character box.

The interpolating unit 282 supplements the image data of the input character pattern by reconstructing the image data removed when the image data of the character box is extracted as described above, and outputs the image data (interpolation pattern) obtained by this interpolation process to a re-interpolating unit 283.

The re-interpolating unit 283 generates using the linkage of labeling a re-interpolation pattern by interpolating the portion the interpolating unit 282 missed.

A character recognizing device 284 starts recognizing characters on the interpolation pattern generated by the interpolating unit 282 and the re-interpolation pattern generated by the re-interpolating unit 283. The recognition result is output to a re-recognizing unit 285 as being represented by character codes.

The re-recognizing unit 285 receives the unknown binary image data in addition to the above described character codes, extracts the parameter indicating the feature of the touching state between the character and its character box from the binary image data, refers to the reliability table 276 generated by the reliability table generating device 270 using the parameter and the character code as key items, and checks the reliability level of the character code recognized by the character recognizing device 284. If the reliability level is high, the character code is output as the final recognition result. If the reliability level is low, then the re-recognizing unit 285 re-recognizes the line-touching character contained in the unknown binary image data by the method other than the method of the character recognizing device 284 using the above described interpolation pattern, re-interpolation pattern, or unknown binary image data. It then outputs the character code obtained in the re-recognition process.

Figure 81:
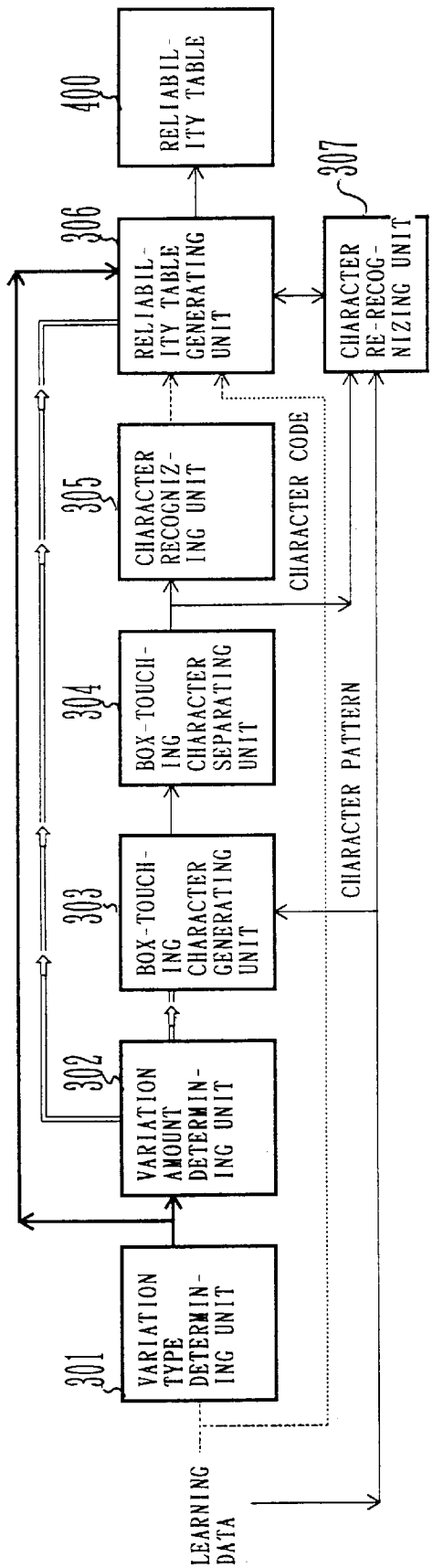
FIG. 81 is a block diagram showing the configuration of the second reliability table generating device according to the embodiment of the present invention.

FIG. 81 is a block diagram showing another embodiment of the present invention, that is, the configuration of a reliability table generating device (character re-recognizing table generating device) 300.

A variation type determining unit 301 receives learning data, that is, a character pattern of a binary image. The learning data comprises a character pattern, which is not touching its character box, and its character code. The variation type determining unit 301 determines the type of the variation to be made to the character pattern of the input learning data, and outputs the determined variation type information to a variation amount determining unit 302 and a reliability table generating unit 306. There are two variation types, that is, a character variation in a character box and a character-box variation as shown in FIGS. 83A through 83F. The character variation in a character box can be, for example, a position error, a variation in size, a variation in obliqueness, etc. The character-box variation can be a variation in obliqueness, a variation in thinness of a character box, a variation in size, the smoothness of a character box, etc.

The variation amount determining unit 302 determines the amount of operations for the variation determined by the variation type determining unit 301, and outputs the variation amount information to a line-touching character generating unit 303 and the reliability table generating unit 306. According to the present embodiment, the following parameters are used to indicate the amount of the variation. The x axis is set in the vertical direction and the y axis is set in the horizontal direction.

1. Character variation in a character box

Position error: Represented by dx and dy. The dx is indicated by the black dot in FIG. 82B, and the dy is indicated by x in FIG. 82B. The dx and dy indicate the difference in the x and y direction respectively for the center of the gravity of a character and that of a character box.

Variation in size: Represented by dsx and dsy. The dsx and dsy indicate the size of a character in the x and y directions respectively.

Variation in obliqueness: Represented by dα. Indicates the obliqueness (angle) of a character to the vertical line.

2. Character-box variation

Variation in obliqueness: Represented by fα. Indicates the obliqueness (angle) of a character box to the vertical line.

Variation in thinness of a character box: Represented by w. Indicates the thinness of a character box.

Variation in size: Represented by fsx and fsy. The fsx and fsy indicate the size of a character box in the x and y directions respectively.

Smoothness of a character box: Represented by fδ. The fδ is a parameter for controlling the smoothness of a character box in consideration of the deterioration in quality of a character box printed on a facsimile device. For example, fδ is represented as the array fδ [L] of the size L where the L indicates the perimeter of a character box. In the array, each element fδ [i] (i=1, 2, 3, . . . ) is represented by an integer in the range from $-\beta$ to $+\beta$.

The line-touching character generating unit 303 performs an operation F (dx, dy, dsx, dsy, dα, w, fsx, fsy, fα, and fδ) on the above described learning data based on the amount of variations of the type determined by the variation type determining unit 301, and generates a line-touching character of the learning data.

FIGS. 82A and 82B show examples of a line-touching character 7 generated by the line-touching character generating unit 303.

The line-touching character generating unit 303 generates a line-touching character 7 which is touching a character box 330 as shown in FIG. 82B by performing a variation operation F (dx, dy, dsx, dsy, dα, w, fsx, fsy, fα, and fδ) on the learning data 320 of "7" shown in FIG. 82A. That is, the line-touching character generating unit 303 generates a line-touching character by performing a variation operation F (dx, dy, dsx, dsy, dα, w, fsx, fsy, fα, and fδ) on the learning data and character box and by positioning the varied learning data in its character box. In this example, the variation operation F (dx, dy, dsx, dsy, dα, w, fsx, fsy, fα, and fδ) is performed with the position of the center of the gravity of the character box fixed.

FIGS. 83A through 83F show examples of each type of line-touching characters generated by the line-touching character generating unit 303 for the learning data of the character "3" (character pattern) wi the fsx and fsy fixed (with the size of a character box fixed).

Figures 83A, 83B, 83C:
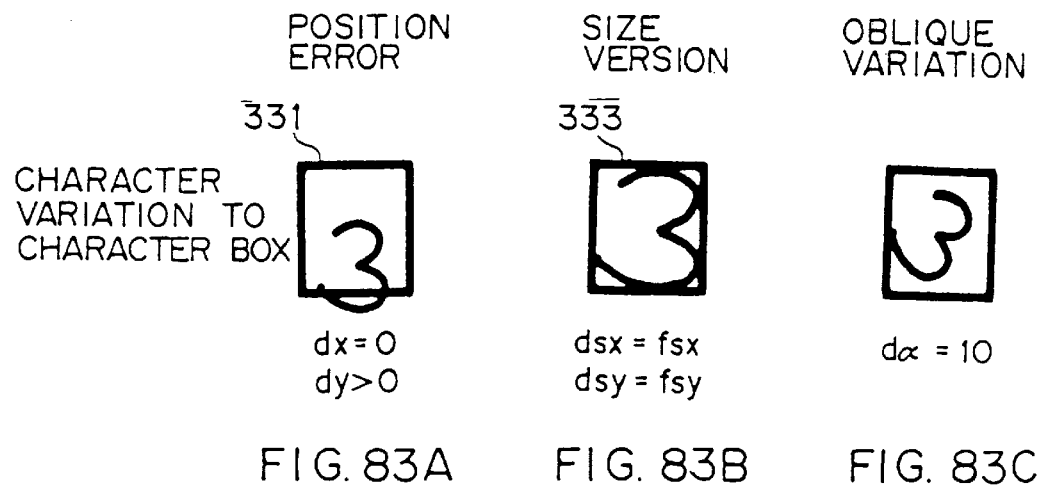
FIGS. 83A, 83B, 83C, 83D, 83E, and 83F show examples of generating line-touching characters.
Figures 83D, 83E, 83F:
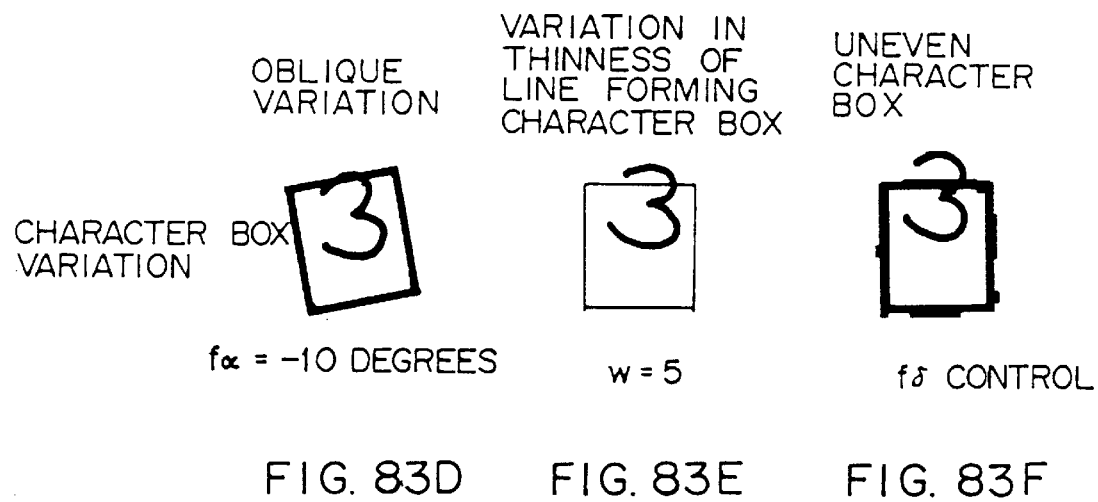

FIG. 83A shows an example of a position error as a variation type where the amount of variation is represented by dx=0 and dy>0. In this example, the character 3 partially overlaps a character box 331 downward (lower position error). FIG. 83B shows an example of a variation in size where the amount of variation is represented by dsx=fsx and dsy=fsy. In this example, the character 3 is touching at the upper, lower, left and right lines forming the character box, thereby making the rectangle encompassing the character 3 equal a character box 333. Furthermore, FIG. 83C shows an example indicating the variation in obliqueness where the amount of variation is dα=10 degrees. FIG. 83D shows an example of the variation in thinness of the line forming a character box where the amount of variation is w=5. FIG. 83E shows an example of the smoothness of a character box where each element fΔ [i] of the variation fδ [i] is controlled.

The amount of variation significant to the position error as shown in FIG. 83A is dx and dy. Similarly, the variation significant to each variation shown in FIGS. 83A, 83B, 83C, 83D, 83E, and 83F is indicated in each figure.

A line-touching character separating unit 304 can reconstruct only the binary image of the character from the binary image of the above described line-touching character by supplementing or re-supplementing the character line broken by extracting and removing its character box from the line-touching character generated by the line-touching character generating unit 303. This process is performed by the method disclosed by the Tokukaihei 6-309498 "Image Extracting System" filed in the Japanese Patent Office. The pattern reconstructed by the interpolation process is referred to as an interpolation pattern and the character pattern reconstructed by the re-interpolation process is referred to as a re-interpolation pattern. The interpolation and re-interpolation patterns are output to a character recognizing unit 305 and a character re-recognizing unit 505.

The character recognizing unit 305 recognizes characters on the character pattern obtained by the line-touching character separating unit 304, and outputs to the reliability table generating unit 306 the code (character code) corresponding to the recognized character. The character recognition is performed by the method described in, for example, "Recognizing a hand-written character by a statistic method" ("Past, Current, and Future Technology of recognizing hand-written characters" in the articles of the lectures by the Electrical Communications Academy, pp38–45 in April, 1993).

The reliability table generating unit 306 compares the character code input by the character recognizing unit 305 with the character code of the learning data (correct character code), and determines whether or not the character recognizing unit 305 has successfully determined the character from the interpolation or re-interpolation pattern output from the line-touching character separating unit 304. Then, it generates a reliability table 400 shown in FIG. 77.

That is, the variation type determining unit 301, variation amount determining unit 302, and line-touching character generating unit 303 automatically generate plural forms of line-touching characters for the learning data of a character pattern in a specific category. The line-touching character separating unit 304 extracts and removes the character box from the line-touching character to generate an interpolation or re-interpolation pattern. The character recognizing unit 305 recognizes a character in the pattern.

The reliability table generating unit 306 calculates the recognition rate for the character recognition results by the character recognizing unit 305 as a reliability level after comparing the character recognition result with the character code correctly recognized for the learning data. Then, it inputs to the reliability table generating device 300 the character pattern and its character code as learning data for each of other categories, performs the above described processes, and calculated the reliability level. In the above described processes, the reliability table generating unit 306 learns for the line-touching character "2" with the variation of "position error" and the amount of variation dy=5 and W=5 that the character recognizing device comprising the line-touching character separating unit 304 and character recognizing unit 305 mistakenly recognizes 2 for 7 at the rate of 23%. Then, it enters in the reliability table 400 the wrong-and-correct character set (2 and 7) and reliability of 77% together with the information such as the variation type of "position error to downward", amount of variation dy=5 and W=5, etc.

That is, even if the character recognizing unit 305 recognizes the character as "7", the reliability is 77%, and the possibility of 22% that the character "2" is correctly recognized is entered in the reliability table 400. Likewise, the reliability table generating unit 306 also enters in the reliability table 400 for other sets of characters easily recognized mistakenly, the variation type, amount of variation, thinness of the line forming the character box, wrong-and-correct character set, and reliability. The wrong-and-correct character set (L1 and 2) indicates that L1 is mistakenly recognized for L2. For the L1 and L2, the character codes corresponding to the characters are entered. Various information such as the variation in obliqueness of a character to its character box (touching at the left side of the character in this example) as shown in FIG. 83 is also entered in the reliability table 400 as shown in FIG. 85 in addition to the "position error to downward" as shown in FIG. 84.

That is, for the "position error to downward" as shown in FIG. 85, dx="−3" through "+3", dy=5, w=5, dsy=1, dα="−10" through "+10", fα="−10" through "+10" are entered in the reliability table 400. Thus, the amount of variation entered in the reliability table 400 is not only dx and dy but also other values when the "position error to downward" is entered. For the "variation in obliqueness of a line-touching character at its left side to its character box", dx="−3" through "+3", dy="−3" through "+3", w=5, dsy=1, dα="−20" through "+20", fα="−10" through "+10" are entered in the reliability table 400. The value indicating the amount of the variation is not limited to a single specified value but can be a value range, for example, the value of dx, dy, dα, fα shown in FIG. 85.

A character re-recognizing unit 307 learns the character recognizing method for the reliability higher than a predetermined threshold on a wrong-and-correct character set (L1 and L2) having the reliability lower than the predetermined threshold (for example 90%) using the interpolation or re-interpolation pattern generated by the line-touching character generating unit 303.

For example, the reliability in character recognition for the line-touching character "2" written as "position error to downward" with dy=5 and w=5 as shown in FIG. 84 is 77%. Since the character is probably recognized as "7" mistakenly, the character re-recognizing unit 307 learns that the recognition rate can be enhanced if the interpolation or re-interpolation pattern obtained by the line-touching character separating unit 304 is re-recognized by, for example, an area-emphasized method.

The area-emphasized method used with a wrong-and-correct character set (2 and 7) is described below by referring to FIGS. 86A and 86B.

Figure 86A:
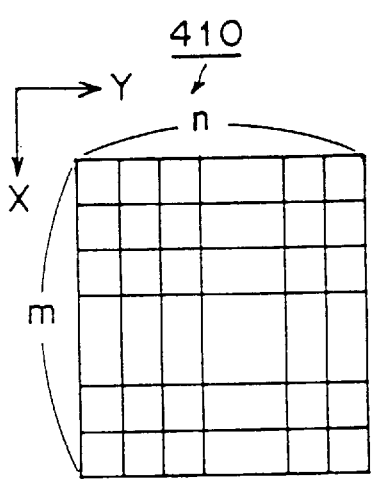
FIGS. 86A and 86B show examples of highlighting an area as a re-recognizing method.

First, as shown in FIG. 86A, a rectangle 810 encompassing the interpolation or re-interpolation pattern is divided into m rows by n columns. As represented as a hatched area as shown in FIG. 86B, the upper m/2×n area of the rectangle is emphasized and the character in the area is processed for recognition. That is, the parameter indicating the feature of the interpolation or re-interpolation pattern in the m/2×n area is extracted, Then, it is checked whether the above described interpolation or re-interpolation pattern refers to 2 or 7. Thus, the recognition rate can be enhanced up to 95%. Then, the character re-recognizing unit 307 enters the wrong-and-correct character set at (2, 7); the "emphasized area" as the re-recognizing method; "m/2×n" as a re-recognition area; and "95%" as the re-recognition reliability as shown in FIG. 85.

Figures 87A, 87B, 87C:
FIGS. 87A, 87B, and 87C show the method of obtaining the rectangle encompassing the interpolation pattern when the character 2 is a line-touching character.

The emphasized area method is also effective for the line-touching character shown in FIG. 87A. FIG. 87A shows an example of the character "2" the lower part of which is touching a character box 420. In this example, the line-touching character generating unit 303 obtains the interpolation pattern 421 similar to "7" shown in FIG. 87B. An encompassing rectangle 422 shown in FIG. 87C is calculated for an interpolation pattern 421. The encompassing rectangle 422 corresponds to the encompassing rectangle 410 shown in FIG. 86A.

Figure 86B:
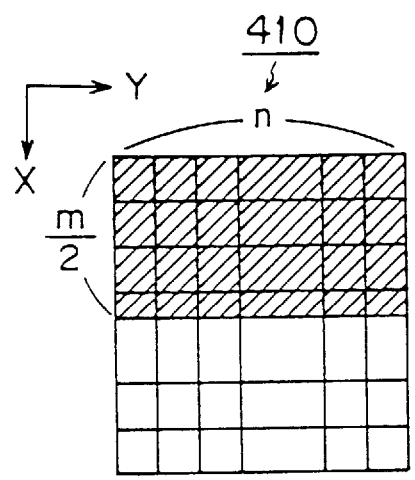

If the character recognizing unit 305 divides the encompassing rectangle 422 into m×n areas as shown in FIG. 86B and recognizes a character by emphasizing the upper half m/2×n area, then there is a high possibility that the interpolation pattern 421 is recognized as "2", that is, the recognition rate (reliability) can be enhanced. Then, it enters in the reliability table 400 through the reliability table generating unit 306 the above described emphasized area method as a re-recognizing method for the wrong-and-correct character set (2 and 7) prepared for a line-touching character.

The character re-recognizing unit 307 also learns the reliability-enhancing recognizing method for other wrong-and-correct character sets having the reliability lower than the threshold. The re-recognizing method, re-recognition reliability, etc. obtained by the learning process are also entered in the reliability table 400 through the reliability table generating unit 306.

If the line-touching character separating unit 304 obtains both interpolation and re-interpolation patterns for a line-touching character, then the information as to which should be used, the interpolation pattern or re-interpolation pattern, in re-recognizing a character can be initially entered in the reliability table 400 based on the learning result of the character re-recognizing unit 307. If the information can be entered, the re-recognizing process can be efficiently performed at a high speed.

If the re-recognition reliability obtained as a result of learning a wrong-and-correct character set is lower than a threshold, then the character re-recognizing unit 307 removes the wrong-and-correct character set from the objects entered in the reliability table 400. Thus, the capacity of the reliability table 400 can be saved and the research time with the reliability table 400 can be shortened with a character recognizing device 500 when a character having low recognition reliability is re-recognized.

Figure 88:
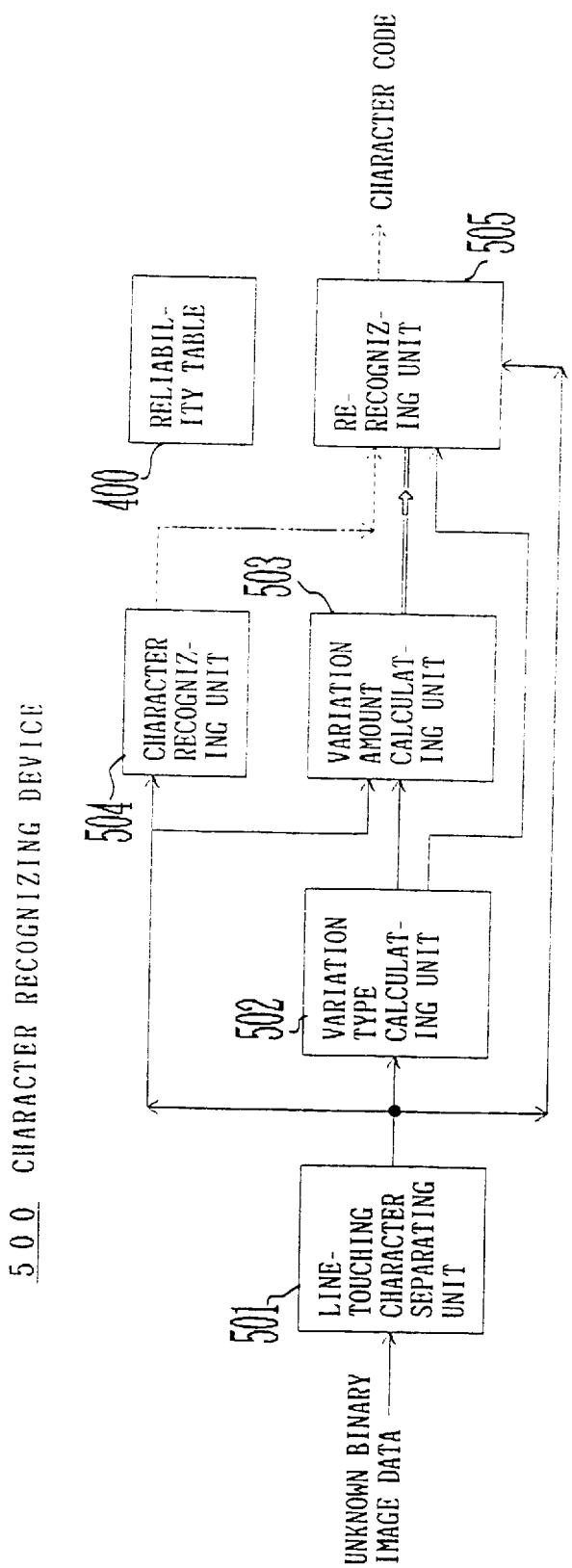
FIG. 88 is a block diagram showing the configuration of the second character recognizing device according to the embodiment of the present invention.
Figure 89:
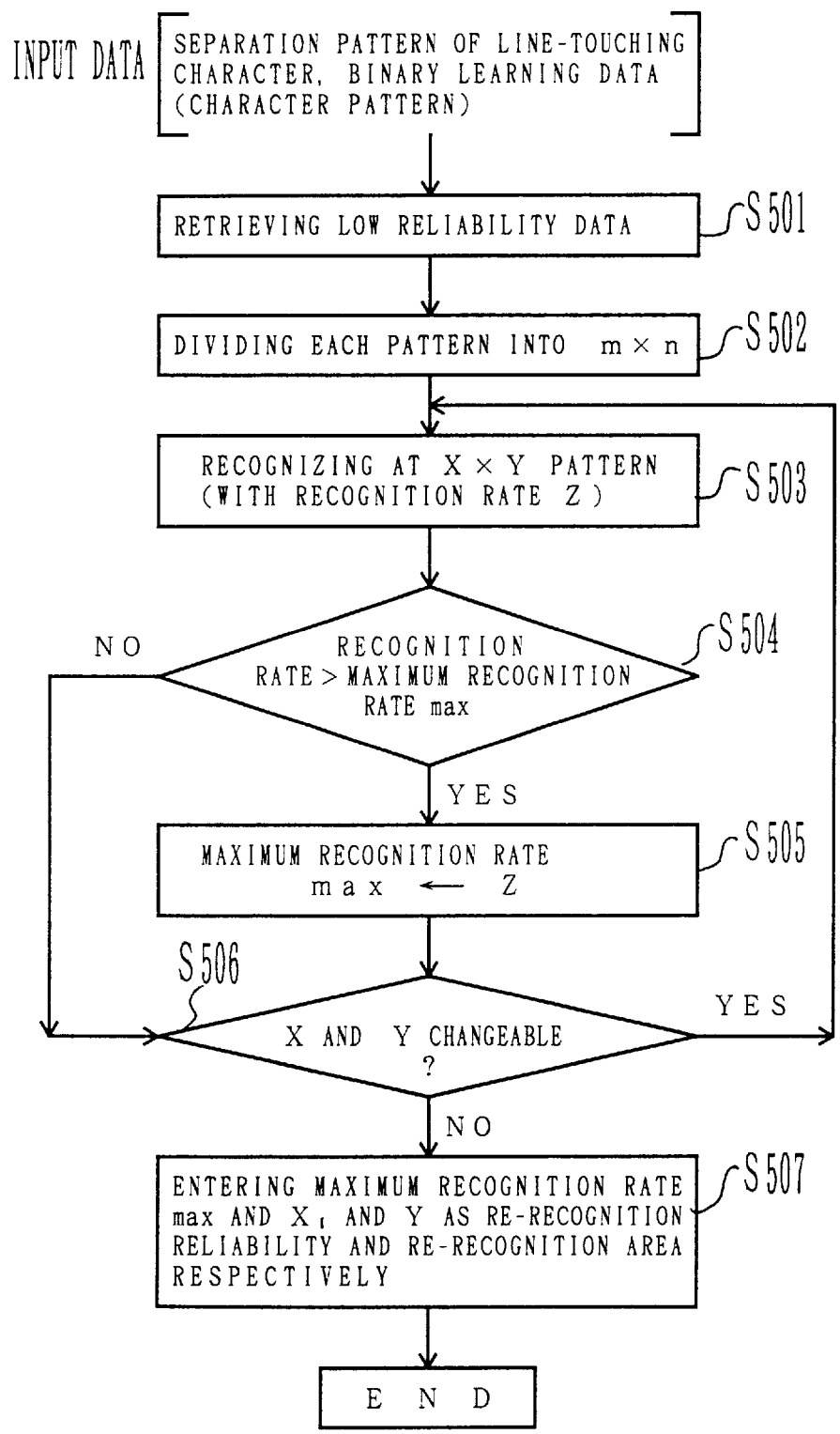
FIG. 89 is a flowchart showing an example of the operation of the character re-recognizing unit shown in FIG. 81.

FIG. 88 is a block diagram showing the configuration of the character recognizing device 500 for recognizing an expected character from an unknown line-touching character using the reliability table 400 generated by the reliability table generating device 300.

A line-touching character separating unit 501 receives binary data of a character box and a character hand-written partially over the character box (line-touching character), extracts the character box from the line-touching character, and interpolates or re-interpolates the character line removed by the extraction, thereby reconstructing the original hand-written character. This process is performed by the method disclosed by the Applicant of the present invention in Tokukaihei 6-309498 filed in the Japanese Patent Office. The interpolation or re-interpolation pattern obtained by the interpolation or re-interpolation are output to a variation type calculating unit 502, character recognizing unit 504, and re-recognizing unit 505.

The variation type calculating unit 502 obtains a variation type according to the position information about the rectangle encompassing the interpolation or re-interpolation pattern reconstructed by the line-touching character separating unit 501, the position information about the character box, and the information about the thinness of the line forming the character box. That is, the variation type calculating unit 502 obtains the character variation such as a position error, a variation in size, a variation in obliqueness; and the character-box variation such as a variation in obliqueness, a variation in thinness of a character box, a variation in size, the smoothness of a character box, etc.

A variation amount calculating unit 503 calculates the amount of variation dx, dy, dsx, dsy, de, fsx, fsy, fα, and fδ of each variation obtained by the variation type calculating unit 502 based on the interpolation or re-interpolation pattern and the related character box obtained by the line-touching character separating unit 501. For example, dx and dy are calculated according to the center-of-gravity information about the interpolation or re-interpolation pattern and the center-of-gravity information about the character box. Dx and dy are calculated according to the information about the interpolation or re-interpolation pattern of the encompassing rectangle. Fα can be calculated by the method disclosed by the Applicant of the present invention in "the Character Retrieving Circuit and the Character Retrieving Method" filed on Feb. 28, 1994. W can be calculated when the line-touching character separating unit 501 extracts the character box, and is input to the variation amount calculating unit 503. The fα can also be calculated based on the position coordinates of the four peaks of the character box. The fδ is calculated according to the binary image information of the character box.

The character recognizing unit 504 recognizes the character using the interpolation or re-interpolation pattern reconstructed by the line-touching character separating unit 501. The recognition result (character code) is output to the re-recognizing unit 505. The character recognition is performed by the method disclosed by Kimura, Wakabayashi, Ohashi, et al in the "Recognition of a handwritten numerical character by the statistical method".

The re-recognizing unit 505 searches the reliability table 400 using, as keys, a character code input from the character recognizing unit 504, the variation type information input from the variation type calculating unit 502, and the variation amount information input from the variation amount calculating unit 503. Then, it checks whether or not a line containing the variation type information, variation amount information, and a wrong-and-correct character set corresponding to the keys is entered in the reliability table 400. At this time, it is checked whether or not the character code is entered for the wrong-and-correct character set. If the row corresponding to the key exists, then it is determined whether or not the reliability level entered in the row is higher than the above described threshold. If it is lower than the threshold, then the character in the interpolation or re-interpolation pattern reconstructed by the line-touching character separating unit 501 is re-recognized according to the re-recognizing method entered in the row.

Assume that the character recognizing unit 504 recognizes the line-touching character of the unknown binary image data as "7", that the variation type calculating unit 502 outputs the "position error to downward" as the variation type, and that the variation amount calculating unit 503 obtains dy=5 as the amount of the position error to downward. The re-recognizing unit 505 searches the reliability table 400 using the information as keys, and is informed that the recognition reliability of "7" in this example is 77% and is lower than the threshold. It then re-recognizes a character according to the re-recognizing method entered in the reliability table 400 by emphasizing only the upper half area (m/2×n) of the interpolation or re-interpolation pattern reconstructed by the line-touching character separating unit 501. Thus, the line-touching character of the unknown binary image data is re-recognized as 2.

If the re-recognizing unit 505 searches the reliability table 400 and is informed that the reliability of the character recognized by the character recognizing unit 504 is higher than the threshold, then the character is not re-recognized, but a character code input from the character recognizing unit 504 is output.

The operations of the character re-recognizing unit 307 of the reliability table generating device 300 shown in FIG. 81 are described below by referring to the flowchart shown in FIG. 81. The flowchart shows the operations performed when the character re-recognizing unit 307 enters the emphasized area re-recognizing method in the reliability table 400.

The character re-recognizing unit 307 retrieves the data of the wrong-and-correct character set having a low reliability level from the reliability table 400 through the reliability table generating unit 306. For the character entered to the left of the wrong-and-correct character set, it then receives the binary learning data (character pattern) and the pattern (interpolation or re-interpolation pattern) generated by the line-touching character separating unit 304 (step S501).

The interpolation or re-interpolation pattern is prescribed by the variation amount parameter entered in the reliability table 400, and can be in various forms even in the same category.

Next, the character pattern of the above described learning data (hereinafter referred to as the first pattern) and the pattern generated by the line-touching character separating unit 304 (hereinafter referred to as the second pattern) are divided into m×n areas (step S502).

Then, the character recognition is performed on the pattern of the X×Y portion in the m×n area, and the recognition rate z is obtained (step S503).

The pattern of the X×Y portion is a re-recognized area where X and Y are variables indicating the size in the x and y directions of the m×n area (X≦m, Y≦n). The recognition rate z refers to the probability that a character can be correctly recognized when it is recognized using the pattern of the X×Y portion. That is, the recognition rate z of the partial pattern of the second pattern can be obtained by recognizing the character recognition result of the partial pattern of the first pattern as a correct result, comparing the character recognition results of the partial patterns of a plurality of second patterns with the character recognition result of the partial pattern of the first pattern.

Then, it is determined whether or not the recognition rate z is larger than the maximum recognition rate max (step S504). The maximum recognition rate max is a variable storing the maximum value of the recognition rate when the pattern of the X×Y portion varies. Initially, an initial value (for example, 0) is set.

If the recognition rate z is larger than the maximum recognition rate max (yes in step S504), then the recognition rate z is substituted for the maximum recognition rate max (step S505) and it is determined whether or not the value X and Y can be changed (step S506). If the recognition rate z is smaller than the maximum recognition rate max in step S504, control is immediately passed to step S506.

The values X and Y can be changed in size. The positions can be changed in the X×Y portion in the m×n area.

If it is determined that X and Y can be changed (yes in step S506) in step S506, then control is returned to step S503 to change X and Y, the X and Y are changed, a new partial pattern is determined for the X and Y, and a character is recognized in the partial pattern.

The processes in steps S503 through S506 are repeated until it is determined in step S506 that the X and Y cannot be changed (no in step S506). If it is determined in step S506 that the X and Y cannot be changed (no in step S506), then the maximum recognition rate max and the partial pattern of the X×Y portion, for which the maximum recognition rate max has been obtained, are entered in the reliability table 400 as the re-recognition reliability and re-recognition area respectively.

If, in step S507, the maximum recognition rate max is lower than a threshold or lower than the recognition rate of the character recognizing unit 305 (reliability entered in the reliability table 400) and the effect of the re-recognition is not outstanding, then the entry in the reliability table 400 can be stopped.

The algorithm shown in the flowchart in FIG. 82 is an example of learning the character re-recognizing method using the area emphasizing technology. The character re-recognizing unit 307 can also learn the character re-recognizing method for the technology other than the area emphasizing technology.

Figure 90:
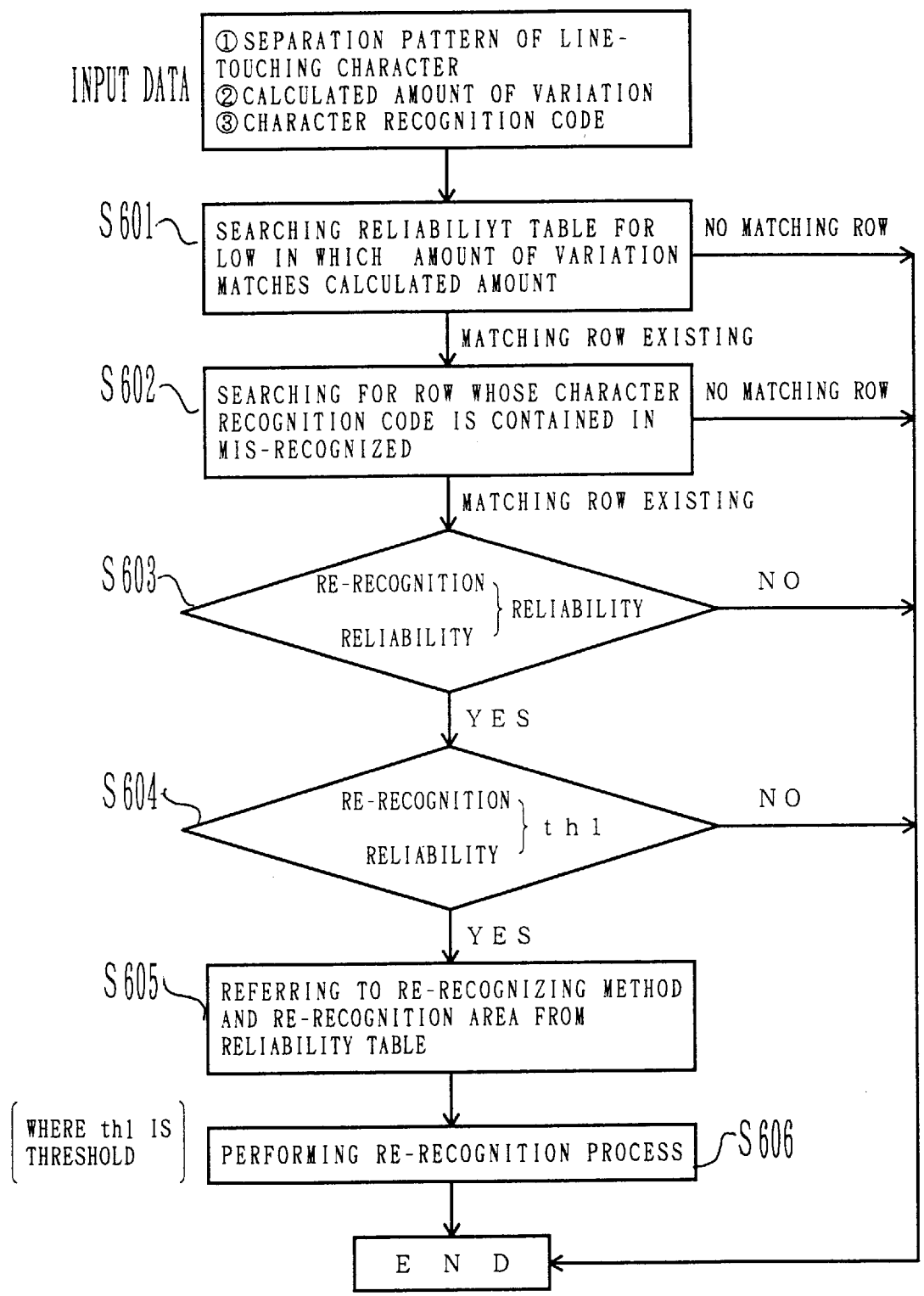
FIG. 90 is a flowchart showing an example of the re-recognizing unit shown in FIG. 88.

FIG. 90 is a flowchart showing the operations of the re-recognizing unit 505 of the character recognizing device 500.

The re-recognizing unit 505 receives the following data 1 through 3 to perform the processes shown in the above described flowchart.

1. The separation pattern of a line-touching character entered from the line-touching character separating unit 501 (interpolation or re-interpolation pattern)
2. The amount of variation entered from the variation amount calculating unit 503
3. A character code entered from the character recognizing unit 504 (character recognition code)

The re-recognizing unit 505 first receives the amount of variation from the variation amount calculating unit 503, searches the reliability table 400, and checks whether or not there is a row in which the amount of variation matching that received from the variation amount calculating unit 503 is entered (step S601).

If the amount of variation dx=5 and w=5 for the character 2 indicating the position error to downward is entered, the highest order row of the reliability table 400 is detected.

If there are rows indicating the matching amount of variation, then it is further determined whether or not any of the rows has a wrong-and-correct character set containing a character code (character recognition code) entered from the character recognizing unit 504 (step S602).

Thus, the above described higher order row is detected for the character 2 indicating the position error to downward.

If the above described row exists, then the re-recognition reliability entered in the row is compared with the reliability and it is determined whether or not the re-recognition reliability is higher than the reliability (step S603).

As a result, it is determined for the character 2 indicating the position error to downward that the re-recognition reliability and the reliability entered in the highest order row are 95% and 77% respectively and that the re-recognition reliability is higher than the reliability.

If the re-recognition reliability is higher than the reliability (yes in step S603), then it is further determined whether or not the re-recognition reliability is higher than the predetermined threshold th1 (step S604). If it is higher than the threshold th1 (yes in step S604), then the re-recognizing method and re-recognition area entered in the row detected on the reliability table 400 in step S602 are referred to (step S605).

Then, the re-recognition area is retrieved from the separation pattern (interpolation pattern of a re-recognition pattern) input from the line-touching character separating unit 501, and the character recognition process is performed on the retrieved area by the above described re-recognizing method. The character code obtained in the character recognizing process is output (step S606).

If the above described threshold th1 is lower than 95%, then the character recognition process is performed again by the area emphasizing technology using the upper half m/2×n area for the interpolation pattern, which is received from the line-touching character separating unit 501, of the character 2 indicating the position error to downward. Finally, the character code of the character 2 is output.

As described above, the line-touching character recognition rates in various forms of each character category is entered as a reliability level in the reliability table 400 together with the information about the pattern indicating the state of touching between a character and its character box, and also with the recognizing method to enhance the recognition rates according to the present embodiment.

Therefore, the reliability of the recognition result for an input unknown line-touching character can be obtained by referring to the reliability table 400. When the reliability level is low, the precision of the character recognition can be improved by re-recognizing the unknown line-touching character by the re-recognizing method entered in the reliability table 400.

When the value of the parameter is entered in the reliability table 400, the capacity of the reliability table 400 can be saved and the retrieval process can be performed at a high speed by entering the value with its range, not a specified value, specified. Since the type of the entered parameter can be optionally selected, most unknown line-touching characters can be processed by the present embodiment. This system does not require a very large capacity of the reliability table 400.

The above described embodiment is an example in which the present invention is applied to a character recognizing device. However, the present invention is not limited to this application, but can be applied to various technologies related to image recognizing systems such as a pattern extracting device for correctly extracting an object image from an image containing various patterns formed by lines touching graphics, symbols, etc., and a pattern recognizing device for recognizing a pattern extracted by the pattern extracting device.

Furthermore, according to the present embodiment, the reliability of the recognition of a line-touching character touching a line of a character box, table, etc. in various formats can be preliminarily learned and the reliability is entered in a table. Therefore, the reliability of an unknown line-touching character can be obtained when the unknown line-touching character is recognized.

Wrong recognition can be reduced on an unknown box-touching character whose recognition reliability is low by referring to the table and re-recognizing it by another method. Furthermore, by learning the re-recognizing method for improving the reliability and entering the method with the reliability in the table, the recognition reliability of a line-touching character having a low reliability level can be exactly enhanced by re-recognizing the character by a re-recognizing method entered in the table.

The above described effect can be realized using a small-capacity table. The recognition rate can be enhanced for various patterns such as graphics, symbols, etc. in addition to character patterns.

What is claimed is:

1. A pattern extracting apparatus for extracting a pattern from an image made up of a straight line and a pattern touching the straight line, comprising:

line extracting means for extracting the straight line from the image made up of the straight line and the pattern touching the straight line;

intersection calculating means for calculating an intersection of the straight line extracted by said line extracting means with the pattern;

virtual image extracting means for extracting a virtual image that corresponds to a portion of the pattern in the straight line based on the intersection information obtained by said intersection calculating means; and true image extracting means for extracting a true image that is the portion of the pattern from the virtual image extracted by said virtual image extracting means.

2. The pattern extracting apparatus according to claim 1, wherein said true extracting means comprises:

true image determining means for determining the true image corresponding to the portion of the pattern contained in the virtual image; and area removing means for removing from the virtual image an area other than the true image determined by said true image determining means.

3. The pattern extracting apparatus according to claim 2, wherein said true image determining means comprises:

a table for storing information for use in extracting from a structure of the virtual image only the true image corresponding to the portion of the pattern in the virtual image; and selecting means for determining the structure of the virtual image and selecting true image corresponding to the portion of the pattern contained in the virtual image by referring to said table.

4. The pattern extracting apparatus according to claim 3, wherein the pattern is a character pattern; and said table is provided for each type of a character.

5. The pattern extracting apparatus according to claim 2, wherein said true image determining means determines the structure of the virtual image and determines a true image corresponding to the portion of the pattern contained in the virtual image on the basis of the determined structure.

6. The pattern extracting apparatus according to claim 2, wherein the pattern is a character pattern, said true image determining means comprises:

average character size calculating means for calculating an average character size of a 1-character pattern from a character string having the character pattern including the virtual image;

first determining means for determining a true character segment image forming part of the character pattern from the character pattern including the virtual image in the character string based on the average character size calculated by said average character size calculating means;

a table for storing information for use in extracting the true character segment image forming the character pattern in the virtual image from a structure of a virtual image made up of a virtual character segment image; and second determining means for determining the structure of the virtual image, referring to said table, and determining based on the virtual image the true image made up of the true character segment image.

7. The pattern extracting apparatus according to claim 1, wherein the pattern is a character pattern.

8. The pattern extracting apparatus according to claim 7, wherein said true image extracting means comprises:

average character size calculating means for calculating an average character size of a 1-character pattern from a character string having the character pattern including the virtual image; and selecting means for selecting the true image for a segment forming part of the character pattern from the virtual image based on the average character size calculated by said average character size calculating means.

9. The pattern extracting apparatus according to claim 8, wherein said selecting means comprises:

threshold setting means for setting as thresholds a maximum and a minimum character size determined on the basis of average character size calculated by said average character size calculating means; and determining means for determining that a plurality of partial patterns and the virtual image are the true image when the character pattern locally corresponding to the virtual image is larger in size than the maximum character size set by said threshold setting means and at least one of the plurality of partial patterns obtained by removing the virtual image is smaller in size than the minimum character size.

10. The pattern extracting apparatus according to claim 8, wherein said selecting means comprises:

threshold setting means for setting as thresholds the maximum character size determined on the basis of average character size calculated by said average character size calculating means; and determining means for determining that the character pattern refers to one true character image when the character pattern in the character string is larger than the maximum character size set by said threshold setting means.

11. The pattern extracting apparatus according to claim 7, wherein said true image extracting means comprises:

average character size calculating means for calculating an average character size of a 1-character pattern from a character string having the character pattern including the virtual image; and area removing means for removing an area other than the true image of the character pattern from the character pattern including the virtual image in the character string based on the average character size calculated by said average character size calculating means.

12. The pattern extracting apparatus according to claim 11, wherein threshold setting means for setting as thresholds a maximum and minimum character size determined on the basis of the average character size calculated by said average character size calculating means; and virtual image removing means for removing the virtual image when the character pattern locally corresponding to the virtual image is larger in size than the maximum character size set by said threshold setting means, wherein all of a plurality of partial patterns obtained when the virtual image is removed from the character pattern are larger in size than the minimum character size.

13. A method of extracting a pattern from an image including straight lines and a portion of the pattern touching the lines, comprising the steps of:

extracting the straight lines from the image made up of the straight lines and the portion of the pattern touching the lines;

calculating an intersection of the straight line extracted by said line extracting means with the pattern;

extracting as a virtual image a portion corresponding to the pattern according to intersection information obtained by said intersection calculating means; and extracting a true image of the pattern from the virtual image extracted.

14. The method according to claim 13, wherein said extracting an image of the pattern from the virtual image extracted step comprises the steps of:

determining the true image corresponding to the image of the pattern in the virtual image, and removing from the virtual image an area other than the portion determined to be the true image.

15. The method according to claim 14, wherein said determining a true image step comprises the steps of:

storing information in a table for use in extracting from a structure of the virtual image the true image corresponding to the portion of the pattern in the virtual image, and determining the structure of the virtual image and selecting the true image corresponding to the portion of the pattern contained in the virtual image by referring to said table.

16. The method according to claim 14, wherein the determining a true image step further comprises the steps of determining the structure of the virtual image and determining a true image corresponding to the image of the pattern contained in the virtual image on the basis of the determined structure.

17. The method according to claim 14, wherein said determining a true image step further comprises the steps of:

calculating an average character size of a 1-character pattern from a character string of the character pattern including the virtual image, and selecting a true image for a segment forming part of the character pattern from the virtual image based on the average character size calculated.

18. The method according to claim 17, wherein said selecting a true image step comprises the steps of:

setting maximum and minimum character sizes based on the average character size, and determining that a plurality of partial patterns and the virtual image are the true image when the character pattern locally corresponding to the virtual image is larger in size than the maximum character size set by said setting step and at least one of the plurality of partial patterns obtained by removing the virtual image is smaller in size than the minimum character size.

19. The method according to claim 17, wherein said selecting a true image comprises the steps of:

setting as thresholds the maximum character size determined on the basis of average character size; and determining that the character pattern refers to one true character image when the character pattern in the character string is larger than the maximum character size.

20. The method according to claim 13, wherein said extracting a true image comprises the steps of:

calculating an average character size of a 1-character pattern from a character string having the character pattern including the virtual image; and removing an area other than the true image of the character pattern from the character pattern including the virtual image in the character string based on the average character size.

21. The method according to claim 20, further comprising the steps of:

setting maximum and minimum character sizes based on the average character size; and removing the virtual image when the character pattern locally corresponding to the virtual image is larger in size than the maximum character size.

22. A pattern extracting apparatus for extracting only a pattern from an image made up of straight lines and a portion of the pattern touching the lines, comprising:

a line extracting unit extracting the straight lines from the image made up of the straight lines and the portion of the pattern touching the lines;

an intersection calculating unit calculating an intersection of the straight line extracted by said line extracting unit with the pattern;

a virtual image extracting unit extracting as a virtual image a portion corresponding to the pattern according to intersection information obtained by said intersection calculating unit; and a true image extracting unit extracting only an image of the pattern from the virtual image extracted by said virtual image extracting unit.

\* \* \* \* \*